United States Patent
Yamaga et al.

(10) Patent No.: US 11,749,305 B2
(45) Date of Patent: Sep. 5, 2023

(54) MAGNETIC RECORDING MEDIUM, TAPE CARTRIDGE, AND DATA PROCESSING METHOD

(71) Applicant: Sony Group Corporation, Tokyo (JP)

(72) Inventors: Minoru Yamaga, Miyagi (JP); Kazuya Hashimoto, Miyagi (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/649,206

(22) PCT Filed: Oct. 18, 2019

(86) PCT No.: PCT/JP2019/041188
§ 371 (c)(1),
(2) Date: Mar. 20, 2020

(87) PCT Pub. No.: WO2021/033340
PCT Pub. Date: Feb. 25, 2021

(65) Prior Publication Data
US 2022/0165301 A1 May 26, 2022

(30) Foreign Application Priority Data

Aug. 16, 2019 (JP) ................. 2019-149509

(51) Int. Cl.
*G11B 5/71* (2006.01)
*G11B 5/66* (2006.01)
*G11B 5/714* (2006.01)

(52) U.S. Cl.
CPC ............... *G11B 5/71* (2013.01); *G11B 5/674* (2021.05); *G11B 5/714* (2013.01)

(58) Field of Classification Search
CPC ........... G11B 5/674; G11B 5/71; G11B 5/714; G11B 15/43; G11B 23/30
See application file for complete search history.

(56) References Cited

U.S. PATENT DOCUMENTS

| | | | | |
|---|---|---|---|---|
| 7,910,234 | B2* | 3/2011 | Brodd | G11B 5/733 |
| | | | | 427/127 |
| 2007/0230054 | A1* | 10/2007 | Takeda | G11B 5/70 |
| 2009/0046396 | A1* | 2/2009 | Nagata | G11B 5/70 |

FOREIGN PATENT DOCUMENTS

| | | |
|---|---|---|
| JP | 2002-208130 | 7/2002 |
| JP | 2005-199724 | 7/2005 |

(Continued)

OTHER PUBLICATIONS

English Machine Translation: Okubo et al. (JP 2000-264984) (Year: 2000).*

(Continued)

*Primary Examiner* — Holly Rickman
*Assistant Examiner* — Linda N Chau
(74) *Attorney, Agent, or Firm* — K&L Gates LLP

(57) ABSTRACT

To provide a magnetic recording medium that has excellent traveling stability in spite of having a thin total thickness and a thin thickness of an underlayer, and is suitable for use in a recording/reproducing device for adjusting the width of the magnetic recording medium by adjusting a tension of the magnetic recording medium in a longitudinal direction thereof.

The present technology provides a tape-shaped magnetic recording medium including: a magnetic layer; an underlayer; a base layer; and a back layer, in which the underlayer has a thickness of 0.5 μm or more and 0.9 μm or less, the magnetic recording medium has an average thickness $t_T$ of 5.6 μm or less, the magnetic recording medium includes a lubricant, the magnetic recording medium has pores, and the pores have an average diameter of 6 nm or more and 11 nm or less when the diameters of the pores are measured in a state where the lubricant has been removed from the mag- (Continued)

netic recording medium and the magnetic recording medium has been dried, and the Young's modulus in a longitudinal direction is 7.90 GPa or less.

14 Claims, 10 Drawing Sheets

(56) References Cited

FOREIGN PATENT DOCUMENTS

| | | |
|---|---|---|
| JP | 2005-332510 | 12/2005 |
| JP | 2006-065953 | 3/2006 |
| JP | 2006-099919 | 4/2006 |
| JP | 2007-273036 | 10/2007 |
| JP | 2011-138566 | 7/2011 |
| JP | 2011-170944 | 9/2011 |
| JP | 2017-228328 | 12/2017 |
| WO | 2015/198514 | 4/2017 |
| WO | 2019/159466 | 8/2019 |

OTHER PUBLICATIONS

Japanese Notice of Reasons for Refusal dated Nov. 15, 2019 in corresponding Japanese Application No. 2019-185511.
Japanese Decision to Grant a Patent dated Dec. 3, 2019 in in corresponding Japanese Application No. 2019-185511.

* cited by examiner

MAGNETIC RECORDING MEDIUM, TAPE CARTRIDGE, AND DATA PROCESSING METHOD

TECHNICAL FIELD

The present technology relates to a magnetic recording medium, a tape cartridge, and a data processing method.

BACKGROUND ART

For example, with development of IoT, big data, and artificial intelligence, the amount of data collected and stored has increased significantly. A magnetic recording medium is often used as a medium for recording a large amount of data.

Various techniques relating to a magnetic recording medium have been proposed so far. For example, Patent Document 1 below discloses a technique relating to a magnetic recording medium having a magnetic layer containing at least a binder and magnetic powder on at least one main surface of a nonmagnetic support. In the magnetic recording medium, the thickness of the magnetic layer is 0.12 m or less, the root mean square surface roughness (Rq) of the surface of the magnetic layer formation surface is 4.0 nm or less, and skewness (Sk) in the surface profile of the magnetic layer formation surface is −1 or more and +1 or less.

Furthermore, in recent years, in a magnetic recording medium used as a data storage for a computer, a track width and a distance between adjacent tracks are very narrow in order to improve a data recording density. When the track width and the distance between tracks are narrow in this way, a maximum allowable amount of change as the amount of dimensional change of the tape itself due to an environmental factor such as changes in temperature and humidity is smaller.

Several techniques for reducing the amount of dimensional change have been proposed so far. For example, in a magnetic tape medium disclosed in Patent Document 2 below, when the Young's modulus of a nonmagnetic support in a width direction thereof is represented by X and the Young's modulus of a back layer in a width direction thereof is represented by Y, X is 850 kg/mm$^2$ or more. Alternatively, in a case where X is less than 850 kg/mm$^2$, X×Y is 6×105 or more. When the Young's modulus of a layer including a magnetic layer in a width direction thereof is represented by Z, Y/Z is 6.0 or less.

CITATION LIST

Patent Document

Patent Document 1: Japanese Patent Application Laid-Open No. 2006-65953
Patent Document 2: Japanese Patent Application Laid-Open No. 2005-332510

SUMMARY OF THE INVENTION

Problems to be Solved by the Invention

A main object of the present technology is to provide a magnetic recording medium that has excellent traveling stability in spite of having a thin total thickness and a thin thickness of an underlayer, and is suitable for use in a recording/reproducing device for adjusting the width of a magnetic recording medium by adjusting a tension of the magnetic recording medium in a longitudinal direction thereof.

Solutions to Problems

The present technology provides a tape-shaped magnetic recording medium including: a magnetic layer; an underlayer; a base layer; and a back layer, in which the underlayer has a thickness of 0.5 µm or more and 0.9 µm or less, the magnetic recording medium has an average thickness $t_T$ of 5.6 µm or less, the magnetic recording medium includes a lubricant, the magnetic recording medium has pores, and the pores have an average diameter of 6 nm or more and 11 nm or less when the diameters of the pores are measured in a state where the lubricant has been removed from the magnetic recording medium and the magnetic recording medium has been dried, and the Young's modulus in a longitudinal direction is 7.90 GPa or less.

The magnetic recording medium can have a squareness ratio of 65% or more in a perpendicular direction thereof.

The magnetic layer side surface of the magnetic recording medium can have arithmetic average roughness $R_a$ of 2.5 nm or less.

The magnetic layer can have an average thickness $t_m$ of 80 nm or less.

The base layer can include a polyester as a main component.

The ratio of the total thickness of the magnetic layer, the underlayer, and the back layer to the thickness of the base layer can be 0.3 or less.

The amount of dimensional change of the magnetic recording medium in a width direction thereof between a state in which a tension of 0.5 N is applied to the magnetic recording medium in a longitudinal direction thereof and a state in which a tension of 1.0 N is applied to the magnetic recording medium in the longitudinal direction can be 4.0 m or more and 5.0 µm or less.

The magnetic layer includes magnetic powder, and the magnetic powder can contain hexagonal ferrite, ε iron oxide, or Co iron oxide.

The hexagonal ferrite can contain at least one of Ba or Sr, and the ε iron oxide can contain at least one of Al or Ga.

The magnetic recording medium can have a friction coefficient ratio ($\mu_B/\mu_A$) of 1.0 to 2.0, in which $\mu_A$ represents a coefficient of dynamic friction between a magnetic layer side surface of the magnetic recording medium and a magnetic head in a state where a tension of 0.4 N is applied to the magnetic recording medium in a longitudinal direction thereof, and $\mu_B$ represents a coefficient of dynamic friction between the magnetic layer side surface of the magnetic recording medium and the magnetic head in a state where a tension of 1.2 N is applied to the magnetic recording medium in the longitudinal direction.

The magnetic recording medium can have a friction coefficient ratio ($\mu_{C(1000)}/\mu_{C(5)}$) of 1.0 to 2.0, in which $\mu_{C(5)}$ represents a coefficient of dynamic friction at fifth reciprocation in a case where the magnetic recording medium in a state where a tension of 0.6 N is applied to the magnetic recording medium in a longitudinal direction thereof is reciprocatedly slid five times on a magnetic head, and $\mu_{C(1000)}$ represents a coefficient of dynamic friction at 1000th reciprocation in a case where the magnetic recording medium is reciprocated 1000 times on the magnetic head.

The pores can have an average diameter of 6 nm or more and 10 nm or less.

The pores can have an average diameter of 7 nm or more and 9 nm or less.

The base layer can have an average thickness of 4.2 µm or less.

The back layer can have an average thickness of 0.5 µm or less.

The magnetic layer includes magnetic powder, and the magnetic powder can have an average aspect ratio of 1.0 or more and 3.5 or less.

Furthermore, the present technology also provides a tape cartridge including:

the tape-shaped magnetic recording medium according to the present technology;

a communication unit that communicates with a recording/reproducing device;

a storage unit; and a control unit that stores information received from the recording/reproducing device through the communication unit in the storage unit, reads the information from the storage unit according to a request from the recording/reproducing device, and transmits the information to the recording/reproducing device through the communication unit, in which the information includes adjustment information for adjusting a tension applied to the magnetic recording medium in a longitudinal direction thereof.

The adjustment information can include dimensional information in the width direction at a plurality of positions in the longitudinal direction of the magnetic recording medium.

Furthermore, the present technology also provides a data processing method, including:

a dimensional information acquiring step of acquiring dimensional information in a width direction at a plurality of positions in a longitudinal direction of the tape-shaped magnetic recording medium according to the present technology while the magnetic recording medium is caused to travel with a tension applied in the longitudinal direction; and a data processing step of recording data on the magnetic recording medium and/or reproducing the data recorded on the magnetic recording medium while the magnetic recording medium is caused to travel with a tension applied in the longitudinal direction, in which in the data processing step, a tension applied to the magnetic recording medium in the longitudinal direction is adjusted on the basis of the dimensional information.

In the data processing step, a tension applied to the magnetic recording medium in a longitudinal direction thereof can be adjusted on the basis of the dimensional information and initial dimensional information acquired in advance before the dimensional information acquiring step is performed.

In the data processing step, a tension applied to the magnetic recording medium in a longitudinal direction thereof can be adjusted such that the dimensional information corresponds to the initial dimensional information.

The data processing method may further include an information acquiring step of acquiring at least one of environmental information around the magnetic recording medium or traveling condition information.

In the data processing step, a tension applied to the magnetic recording medium in a longitudinal direction thereof can be adjusted on the basis of the dimensional information and at least one of the environmental information or the traveling condition information.

MODE FOR CARRYING OUT THE INVENTION

Figure 1:
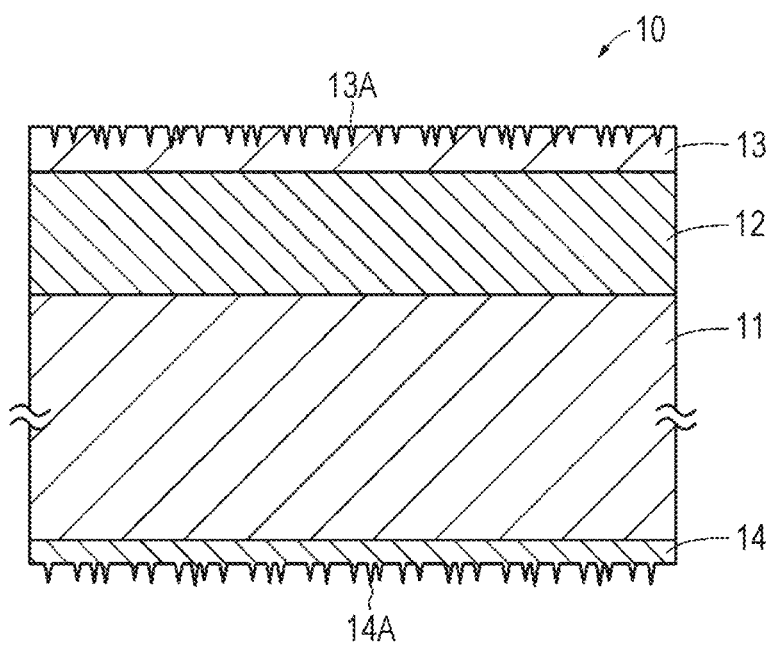
FIG. 1 is a schematic cross-sectional view of an example of a magnetic recording medium according to the present technology.

Hereinafter, a preferred embodiment for carrying out the present technology will be described. Note that the embodiments described below exemplify representative embodiments of the present technology, and the scope of the present technology is not limited only to the embodiments.

The present technology will be described in the following order.

1. Description of the present technology
2. Embodiment of the present technology (example of application type magnetic recording medium)
    (1) Configuration of magnetic recording medium
    (2) Description of each layer
    (3) Physical properties and structure
    (4) Method for manufacturing magnetic recording medium
    (5) Recording/reproducing device
    (6) Cartridge
    (7) Data processing method
    (8) Effect
    (9) Modification
3. Examples

1. DESCRIPTION OF THE PRESENT TECHNOLOGY

A magnetic recording medium is housed in, for example, a magnetic recording cartridge. In order to further increase the recording capacity per magnetic recording cartridge, it is considered to make a magnetic recording medium (for example, magnetic recording tape) housed in the magnetic recording cartridge thinner (to reduce the total thickness), and to increase the tape length per magnetic recording cartridge. Therefore, the total thickness of the magnetic recording medium is desirably thin.

Furthermore, for recording or reproduction in the magnetic recording medium, a recording/reproducing device that can keep the width of the long magnetic recording medium constant or substantially constant by adjusting a tension of the magnetic recording medium in a longitudinal direction thereof may be used. The recording/reproducing device detects, for example, dimensions or a dimensional change of the magnetic recording medium in a width direction thereof, and adjusts the tension in the longitudinal direction on the basis of a detection result. For example, in a case where a servo track width is wider than a predetermined width, the device increases the tension in the longitudinal direction and keeps the servo track width constant, and in a case where the servo track width is narrower than the predetermined width, the device decreases the tension in the longitudinal direction and keeps the servo track width constant. In this way, the width of the magnetic recording medium is kept constant. In order to adjust the width of the magnetic recording medium by adjusting a tension of the magnetic recording medium in a longitudinal direction thereof, for example, the Young's modulus of the magnetic recording medium is desirably low.

Therefore, the present inventors have studied a magnetic recording medium that is suitable for use in a recording/reproducing device that adjusts the width of a magnetic recording medium by adjusting a tension of the magnetic recording medium in a longitudinal direction thereof and has a thin total thickness.

In order to reduce the total thickness of the magnetic recording medium, it is conceivable to reduce the thickness of the base layer constituting the majority of the total thickness of the magnetic recording medium. However, in general, in a magnetic recording medium, a base layer often contains a material that is softer and has a lower Young's modulus than a layer other than the base layer (for example, a polyester-based resin such as PET or PEN). For this reason, when the thickness of the base layer is reduced, the constituent ratio of layers other than the base layer increases, and the Young's modulus of the entire magnetic recording medium increases.

Therefore, it is conceivable to reduce the thickness of the underlayer in order to reduce the total thickness of the magnetic recording medium while reducing the Young's modulus of the entire magnetic recording medium. However, in a case where the thickness of the underlayer is reduced, traveling stability may be adversely affected. For example, in a case where the underlayer includes a lubricant, an effect of improving traveling stability due to the lubricant is reduced by making the underlayer thinner, and for example, a frictional force between the magnetic recording medium and a head can be increased.

The present inventors have found that a magnetic recording medium having a specific configuration has excellent traveling stability in spite of having a thin total thickness and a thin thickness of an underlayer, and is suitable for use in a recording/reproducing device for adjusting the width of the magnetic recording medium by adjusting a tension of the magnetic recording medium in a longitudinal direction thereof.

Specifically, the present inventors have studied various magnetic recording media each having a thin total thickness.

As a result, the present inventors have found that a magnetic recording medium having a specific configuration has excellent traveling stability in spite of having a thin total thickness. That is, the magnetic recording medium according to the present technology provides a tape-shaped magnetic recording medium including: a magnetic layer; an underlayer; a base layer; and a back layer, in which the underlayer has a thickness of 0.5 μm or more and 0.9 μm or less, the magnetic recording medium has an average thickness $t_T$ of 5.6 μm or less, the magnetic recording medium includes a lubricant, the magnetic recording medium has pores, the pores have an average diameter of 6 nm or more and 11 nm or less when the diameters of the pores are measured in a state where the lubricant has been removed from the magnetic recording medium and the magnetic recording medium has been dried, and the Young's modulus in a longitudinal direction is 7.90 GPa or less.

The Young's modulus of the magnetic recording medium according to the present technology in a longitudinal direction thereof is 7.90 GPa or less, more preferably 7.85 or less, and still more preferably 7.80 GPa or less. The Young's modulus may be, for example, 3.00 GPa or more, preferably 4.00 Gpa or more, more preferably 5.00 Gpa or more, still more preferably 6.00 GPa or more, and further still more preferably 7.00 GPa or more. The Young's modulus within the above numerical range contributes to achieving a magnetic recording medium that has a thin total thickness and can adjust the dimensions in a width direction thereof by adjusting a tension applied to the magnetic recording medium in a longitudinal direction thereof. For example, due to the Young's modulus within the above numerical range, the magnetic recording medium according to the present technology is suitable for use in a recording/reproducing device for adjusting the dimensions in the width direction by adjusting a tension in the longitudinal direction.

The magnetic recording medium according to the present technology has pores, and the pores have an average diameter of 6 nm or more and 11 nm or less when the diameters of the pores are measured in a state where the lubricant has been removed from the magnetic recording medium and the magnetic recording medium has been dried. The average diameter is preferably 10 nm or less, and more preferably 9 nm or less. The average diameter is preferably 6.5 nm or more, more preferably 7 nm or more, still more preferably 7.5 nm or more, and particularly preferably 8 nm or more. The average diameter is more preferably 6 nm or more and 10 nm or less, still more preferably 6.5 nm or more and 10 nm or less, and further still more preferably 7 nm or more and 9 nm or less. The average pore diameter within the numerical range described above can suppress an increase in the coefficient of dynamic friction after repeated recording or reproduction is performed. In a case where the average pore diameter is outside the numerical range described above, friction between the magnetic recording medium and the head gradually increases as the magnetic recording medium travels, and traveling stability may deteriorate. It is considered that an appropriate amount of lubricant appears on the magnetic layer side surface due to the average diameter within the numerical range described above, and this contributes to improvement in traveling stability of the magnetic recording medium having a thin total thickness. The pores may be formed, for example, on a surface of the magnetic recording medium, more particularly on a surface of the magnetic layer side. The pores may be present, for example, in the magnetic layer. The pores present in the magnetic layer may be formed only in the magnetic layer, or the pores formed in the magnetic layer may extend to another layer, for example, to the underlayer.

The thickness of the underlayer of the magnetic recording medium according to the present technology is 0.5 µm or more and 0.9 µm or less, and preferably 0.6 µm or more and 0.8 µm or less. The thickness of the underlayer within the above numerical range contributes to both lowering the Young's modulus while reducing the total thickness and stably supplying the lubricant to the magnetic layer side surface. That is, in the magnetic recording medium, the thickness of the underlayer within the above numerical range improves the suitability for use in the above recording/reproducing device and traveling stability.

The average thickness $t_T$ of the magnetic recording medium according to the present technology can be 5.6 µm or less, more preferably 5.3 µm or less, and still more preferably 5.2 µm or less, 5.0 µm or less, or 4.6 µm or less. Since the magnetic recording medium according to the present technology has such a thin total thickness, for example, a tape length wound around one magnetic recording cartridge can be made longer, thereby increasing the recording capacity per magnetic recording cartridge.

The width of the magnetic recording medium according to the present technology can be, for example, 5 mm to 30 mm, particularly 7 mm to 25 mm, more particularly 10 mm to 20 mm, and still more particularly 11 mm to 19 mm. The length of the tape-shaped magnetic recording medium according to the present technology can be, for example, 500 m to 1500 m. For example, the tape width according to the LTO8 standard is 12.65 mm and the length according thereto is 960 m.

The magnetic recording medium according to the present technology has a tape shape, and can be, for example, a long magnetic recording tape. The tape-shaped magnetic recording medium according to the present technology may be housed in a magnetic recording cartridge, for example. More specifically, the magnetic recording medium may be housed in the cartridge while being wound around a reel in the magnetic recording cartridge.

The magnetic recording medium according to the present technology includes a magnetic layer, an underlayer, a base layer, and a back layer. These four layers may be laminated in this order. In addition to these layers, the magnetic recording medium according to the present technology may include another layer. The other layer may be appropriately selected according to the type of the magnetic recording medium. The magnetic recording medium according to the present technology can be, for example, an application type magnetic recording medium. The application type magnetic recording medium will be described in more detail in the following column 2.

According to a preferred embodiment of the present technology, in the magnetic recording medium, a squareness ratio in a perpendicular direction can be 65% or more, a surface roughness $R_a$ of the magnetic layer side surface of the magnetic recording medium can be 2.5 nm or less, and an average thickness $t_m$ of the magnetic layer can be 80 nm or less. As a result, recording/reproducing characteristics in the thin magnetic recording medium are improved.

The tape-shaped magnetic recording medium according to the present technology includes: a magnetic layer; an underlayer; a base layer; and a back layer, in which the underlayer has a thickness of 0.5 µm or more and 0.9 µm or less, the magnetic recording medium has an average thickness $t_T$ of 5.6 µm or less, the magnetic recording medium includes a lubricant, the magnetic recording medium has pores, the pores have an average diameter (pore diameter when the pore volume is maximum at the time of gas desorption to the pores) of 6 nm or more and 11 nm or less when the diameters of the pores are measured in a state where the lubricant has been removed from the magnetic recording medium and the magnetic recording medium has been dried, the Young's modulus in the longitudinal direction is 7.90 GPa or less, and the ratio of the total thickness of the magnetic layer, the underlayer, and the back layer to the thickness of the base layer may be 0.38 or less.

The magnetic recording medium has excellent traveling stability in spite of having a thin total thickness and a thin thickness of an underlayer, and is suitable for use in a recording/reproducing device for adjusting the width of the magnetic recording medium by adjusting the tension of the magnetic recording medium in a longitudinal direction thereof.

Moreover, it has been found that a ratio between the total thickness of relatively hard coating layers (magnetic layer, underlayer, and back layer) and the thickness of the relatively soft base layer is important for suitability for use in a recording/reproducing device for adjusting the width of the magnetic recording medium by adjusting a tension of the magnetic recording medium in a longitudinal direction thereof. By adjusting the ratio within the above numerical range, it is easier to achieve both traveling stability and ease of tension adjustment.

The tape-shaped magnetic recording medium according to the present technology includes: a magnetic layer; an underlayer; a base layer; and a back layer, in which the underlayer has a thickness of 0.5 µm or more and 0.9 µm or less, the magnetic recording medium has an average thickness $t_T$ of 5.6 µm or less, the magnetic recording medium includes a lubricant, the magnetic recording medium has pores, the pores have an average diameter (pore diameter when the pore volume is maximum at the time of gas desorption to the pores) of 6 nm or more and 11 nm or less when the diameters of the pores are measured in a state where the lubricant has been removed from the magnetic recording medium and the magnetic recording medium has been dried, the Young's modulus in a longitudinal direction is 7.90 GPa or less, and a friction coefficient ratio ($\mu_B/\mu_A$) may be 1.0 to 2.0, in which $\mu_A$ represents a coefficient of dynamic friction between a magnetic layer side surface of the magnetic recording medium and a magnetic head in a state where a tension of 0.4 N is applied to the magnetic recording medium in a longitudinal direction thereof, and $\mu_B$ represents a coefficient of dynamic friction between the magnetic layer side surface of the magnetic recording medium and the magnetic head in a state where a tension of 1.2 N is applied to the magnetic recording medium in the longitudinal direction.

The magnetic recording medium has excellent traveling stability in spite of having a thin total thickness and a thin thickness of an underlayer, and is suitable for use in a recording/reproducing device for adjusting the width of the magnetic recording medium by adjusting the tension of the magnetic recording medium in a longitudinal direction thereof. Moreover, due to the friction coefficient ratio ($\mu_B/\mu_A$) within the above numerical range, the magnetic recording medium has a friction coefficient with the head within a certain range even if a tension that affects a contact state with the head is changed, and has excellent traveling stability.

The tape-shaped magnetic recording medium according to the present technology includes: a magnetic layer; an underlayer; a base layer; and a back layer, in which the underlayer has a thickness of 0.5 µm or more and 0.9 µm or less, the magnetic recording medium has an average thickness $t_T$ of 5.6 μm or less, the magnetic recording medium includes a lubricant, the magnetic recording medium has pores, the pores have an average diameter (pore diameter when the pore volume is maximum at the time of gas desorption to the pores) of 6 nm or more and 11 nm or less when the diameters of the pores are measured in a state where the lubricant has been removed from the magnetic recording medium and the magnetic recording medium has been dried, the Young's modulus in a longitudinal direction is 7.90 GPa or less, a friction coefficient ratio ($\mu_B/\mu_A$) is 1.0 to 2.0, in which $\mu_A$ represents a coefficient of dynamic friction between a magnetic layer side surface of the magnetic recording medium and a magnetic head in a state where a tension of 0.4 N is applied to the magnetic recording medium in a longitudinal direction thereof, and $\mu_B$ represents a coefficient of dynamic friction between the magnetic layer side surface of the magnetic recording medium and the magnetic head in a state where a tension of 1.2 N is applied to the magnetic recording medium in the longitudinal direction, and a friction coefficient ratio ($\mu_{C(1000)}/\mu_{C(5)}$) may be 1.0 to 2.0, in which $\mu_{C(5)}$ represents a coefficient of dynamic friction at the fifth reciprocation in a case where the magnetic recording medium in a state where a tension of 0.6 N is applied to the magnetic recording medium in a longitudinal direction thereof is reciprocatedly slid five times on a magnetic head, and $\mu_{C(1000)}$ represents a coefficient of dynamic friction at the 1000th reciprocation in a case where the magnetic recording medium is reciprocated 1000 times on the magnetic head.

The magnetic recording medium has excellent traveling stability in spite of having a thin total thickness and a thin thickness of an underlayer, and is suitable for use in a recording/reproducing device for adjusting the width of the magnetic recording medium by adjusting the tension of the magnetic recording medium in a longitudinal direction thereof. Moreover, due to the friction coefficient ratios ($\mu_B/\mu_A$) and ($\mu_{C(1000)}/\mu_{C(5)}$) within the above numerical ranges, the magnetic recording medium has a friction coefficient with the head within a certain range even if travel is repeated and a tension that affects a contact state with the head is changed, and can exhibit stable traveling performance all the time.

2. EMBODIMENT OF THE PRESENT TECHNOLOGY (EXAMPLE OF APPLICATION TYPE MAGNETIC RECORDING MEDIUM)

(1) Configuration of Magnetic Recording Medium

First, a configuration of a magnetic recording medium 10 according to a first embodiment will be described with reference to FIG. 1. The magnetic recording medium 10 is, for example, a magnetic recording medium that has been perpendicularly orientated, and as illustrated in FIG. 1, includes a long base layer (also referred to as a substrate) 11, an underlayer (nonmagnetic layer) 12 disposed on one main surface of the base layer 11, a magnetic layer (also referred to as a recording layer) 13 disposed on the underlayer 12, and a back layer 14 disposed on the other main surface of the base layer 11. Here, out of both main surfaces of the magnetic recording medium 10, the surface on which the magnetic layer 13 is disposed is also referred to as a magnetic surface or a magnetic layer side surface, and the surface opposite to the magnetic surface (surface on which the back layer 14 is disposed) is also referred to as a back surface.

The magnetic recording medium 10 has a tape shape and travels in a longitudinal direction thereof during recording and reproduction. Furthermore, the magnetic recording medium 10 may be able to record a signal at the shortest recording wavelength of preferably 100 nm or less, more preferably 75 nm or less, still more preferably 60 nm or less, particularly preferably 50 nm or less, and can be used, for example, for a recording/reproducing device having the shortest recording wavelength within the range described above. This recording/reproducing device may include a ring type head as a recording head. The recording track width can be, for example, 2 m or less.

(2) Description of Each Layer (Base Layer)

The base layer 11 can function as a support for the magnetic recording medium 10, and is, for example, a long nonmagnetic substrate having flexibility, and in particular, can be a nonmagnetic film. The thickness of the base layer 11 is, for example, 8 μm or less, preferably 7 μm or less, more preferably 6 μm or less, still more preferably 5 μm or less, and particularly preferably 4.2 μm or less. The thickness of the base layer 11 can be, for example, 2 μm or more, preferably 2.2 μm or more, more preferably 2.5 μm or more, and still more preferably 2.6 μm or more.

The average thickness of the base layer 11 can be determined as follows. First, the magnetic recording medium 10 having a width of ½ inches is prepared and cut into a length of 250 mm to manufacture a sample. Subsequently, layers of the sample other than the base layer 11 (that is, the underlayer 12, the magnetic layer 13, and the back layer 14) are removed with a solvent such as methyl ethyl ketone (MEK) or dilute hydrochloric acid. Next, the thickness of the sample (base layer 11) is measured at five or more points using a laser hologage (LGH-110C) manufactured by Mitutoyo Corporation as a measuring device, and the measured values are simply averaged (arithmetically averaged) to calculate the average thickness of the base layer 11. Note that the measurement points are randomly selected from the sample. Here, a value calculated by the measuring device is described to the first decimal place by rounding off the second decimal place.

In one embodiment of the present technology, the base layer 11 can include, for example, a polyester as a main component. The polyester makes it easy to adjust the Young's modulus of the magnetic recording medium 10 in a longitudinal direction thereof within the above numerical range. The polyester may be, for example, one of polyethylene terephthalate (PET), polyethylene naphthalate (PEN), polybutylene terephthalate (PBT), polybutylene naphthalate (PBN), polycyclohexylenedimethylene terephthalate (PCT), polyethylene-p-oxybenzoate (PEB), polyethylene bisphenoxycarboxylate, and polyether ether ketone (PEEK), or a mixture of two or more thereof. Here, the "main component" means a component having the highest content ratio among the components constituting the base layer. For example, inclusion of a polyester in the base layer 11 as a main component may mean that the content ratio of the polyester in the base layer 11 is, for example, 50% by mass or more, 60% by mass or more, 70% by mass or more, 80% by mass or more, 90% by mass or more, 95% by mass or more, or 98% by mass or more with respect to the mass of the base layer 11, or may mean that the base layer 11 includes only a polyester.

In this embodiment, the base layer 11 may include a resin other than the polyester, described below, in addition to a polyester.

According to a preferred embodiment of the present technology, the base layer 11 may include PET or PEN.

In another embodiment of the present technology, the base layer 11 may include a resin other than the polyester-based resin. The resin forming the base layer 11 can contain, for example, at least one of a polyolefin-based resin, a cellulose derivative, a vinyl-based resin, or another polymer resin. In a case where the base layer 11 includes two or more of these resins, the two or more materials may be mixed, copolymerized, or laminated.

The polyolefin-based resin includes, for example, at least one of polyethylene (PE) or polypropylene (PP). The cellulose derivative includes, for example, at least one of cellulose diacetate, cellulose triacetate, cellulose acetate butyrate (CAB), or cellulose acetate propionate (CAP). The vinyl-based resin includes, for example, at least one of polyvinyl chloride (PVC) or polyvinylidene chloride (PVDC).

The other polymer resin includes, for example, at least one of polyether ether ketone (PEEK), polyamide or nylon (PA), aromatic polyamide or aramid (aromatic PA), polyimide (PI), aromatic polyimide (aromatic PI), polyamide imide (PAI), aromatic polyamide imide (aromatic PAI), polybenzoxazole (PBO) such as ZYLON (registered trademark), polyether, polyether ketone (PEK), polyether ester, polyether sulfone (PES), polyether imide (PEI), polysulfone (PSF), polyphenylene sulfide (PPS), polycarbonate (PC), polyarylate (PAR), or polyurethane (PU). According to a preferred embodiment of the present technology, the base layer 11 may include PEEK.

(Magnetic Layer)

The magnetic layer 13 can be, for example, a perpendicular recording layer. The magnetic layer 13 can include magnetic powder and a lubricant. The magnetic layer 13 may include, for example, a binder in addition to the magnetic powder and the lubricant, and may further include a binder and conductive particles, in particular. The magnetic layer 13 may further include an additive such as an abrasive or a rust preventive as necessary.

The magnetic layer 13 has pores. That is, the magnetic layer 13 has a surface having a large number of pores. Preferably, in the magnetic layer 13, pores are formed in an area in contact with a magnetic head in recording and/or reproduction of the magnetic recording medium 10, and particularly preferably, pores may be formed over the entire area.

The pores may be opened perpendicularly to the surface of the magnetic layer 13. The pores can be formed, for example, by pressing a large number of protrusions formed on the back layer side surface of the magnetic recording medium 10. In this case, the pores can correspond to the protrusions.

Note that in FIG. 1, the pores are indicated by reference numeral 13A, but FIG. 1 is a schematic diagram for better understanding of the present technology. The shapes of the pores 13A illustrated in FIG. 1 do not necessarily indicate the actual shapes.

The average thickness $t_m$ of the magnetic layer 13 can satisfy preferably 35 nm≤$t_m$≤120 nm, more preferably 35 nm≤$t_m$≤100 nm, particularly preferably 35 nm≤$t_m$≤90 nm. The average thickness $t_m$ of the magnetic layer 13 within the above numerical range contributes to improvement in electromagnetic conversion characteristics.

The average thickness $t_m$ of the magnetic layer is particularly preferably 80 nm or less. The average thickness $t_m$ of the magnetic layer within this numerical range contributes to improvement in the recording/reproducing characteristics of the magnetic recording medium 10.

The average thickness $t_m$ of the magnetic layer 13 is determined as follows, for example.

The magnetic recording medium 10 is processed to be thinned by a focused ion beam (FIB) method and the like. In a case where the FIB method is used, as a pretreatment for observing a TEM image of a cross section described later, a carbon film and a tungsten thin film are formed as protective films. The carbon film is formed on the magnetic layer side surface and the back layer side surface of the magnetic recording medium 10 by a vapor deposition method, and the tungsten thin film is further formed on the magnetic layer side surface by a vapor deposition method or a sputtering method. The thinning is performed in a length direction (longitudinal direction) of the magnetic recording medium 10. That is, by the thinning, a cross section parallel to both the longitudinal direction and the thickness direction of the magnetic recording medium 10 is formed.

The cross section of the obtained thinned sample is observed with a transmission electron microscope (TEM) under the following conditions to obtain a TEM image. Note that the magnification and the acceleration voltage may be appropriately adjusted according to the type of device.

Device: TEM (H9000NAR manufactured by Hitachi, Ltd.)
Acceleration voltage: 300 kV
Magnification: 100,000 times Next, using the obtained TEM image, the thickness of the magnetic layer 13 is measured at 10 or more points in the longitudinal direction of the magnetic recording medium 10. An average value obtained by simply averaging (arithmetically averaging) the obtained measurement values is defined as the average thickness $t_m$ [nm] of the magnetic layer 13. Note that the points where the measurement is performed are randomly selected from a test piece.

The magnetic layer 13 is preferably a perpendicularly oriented magnetic layer. Here, the perpendicular orientation means that a squareness ratio S1 measured in the longitudinal direction (traveling direction) of the magnetic recording medium 10 is 35% or less. A method for measuring the squareness ratio S1 will be separately described below.

Note that the magnetic layer 13 may be a magnetic layer that is in-plane oriented (longitudinally oriented). That is, the magnetic recording medium 10 may be a horizontal recording type magnetic recording medium. However, the perpendicular orientation is more preferable in terms of increasing the recording density.

(Servo Pattern)

Figure 2:
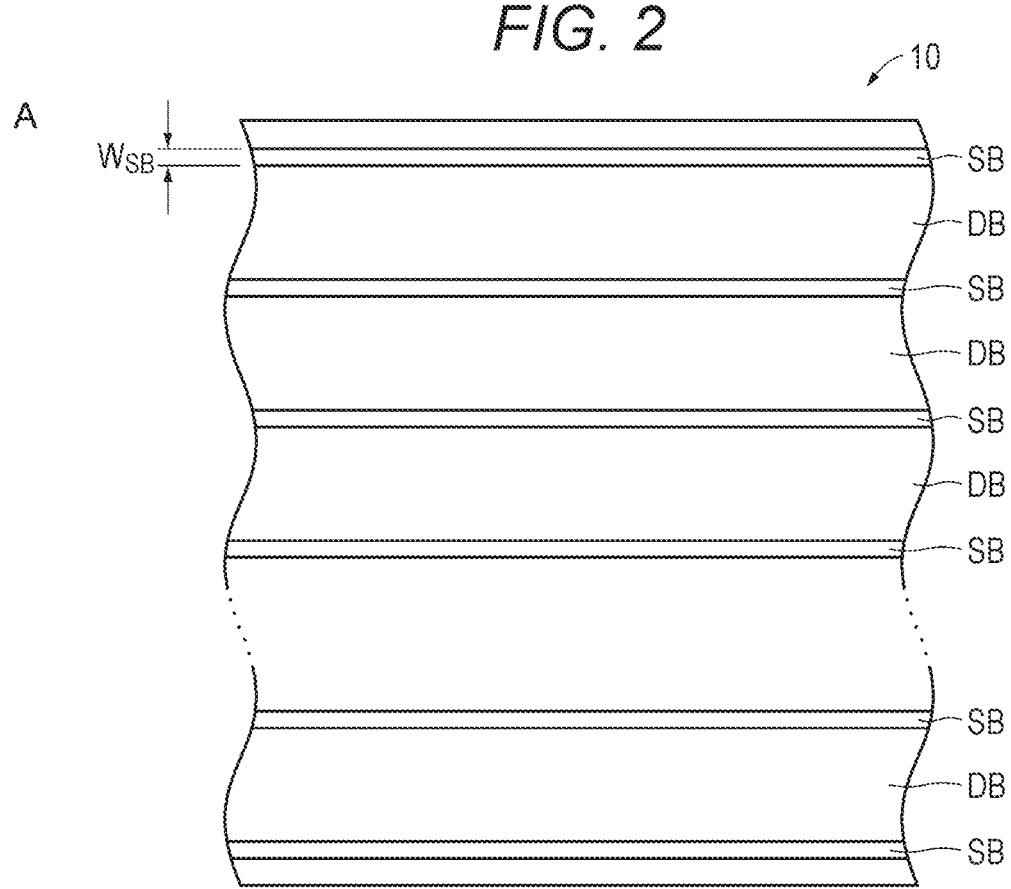
FIG. 2 is a diagram illustrating an example of data bands and servo bands disposed in a magnetic recording medium.
Figure 2:
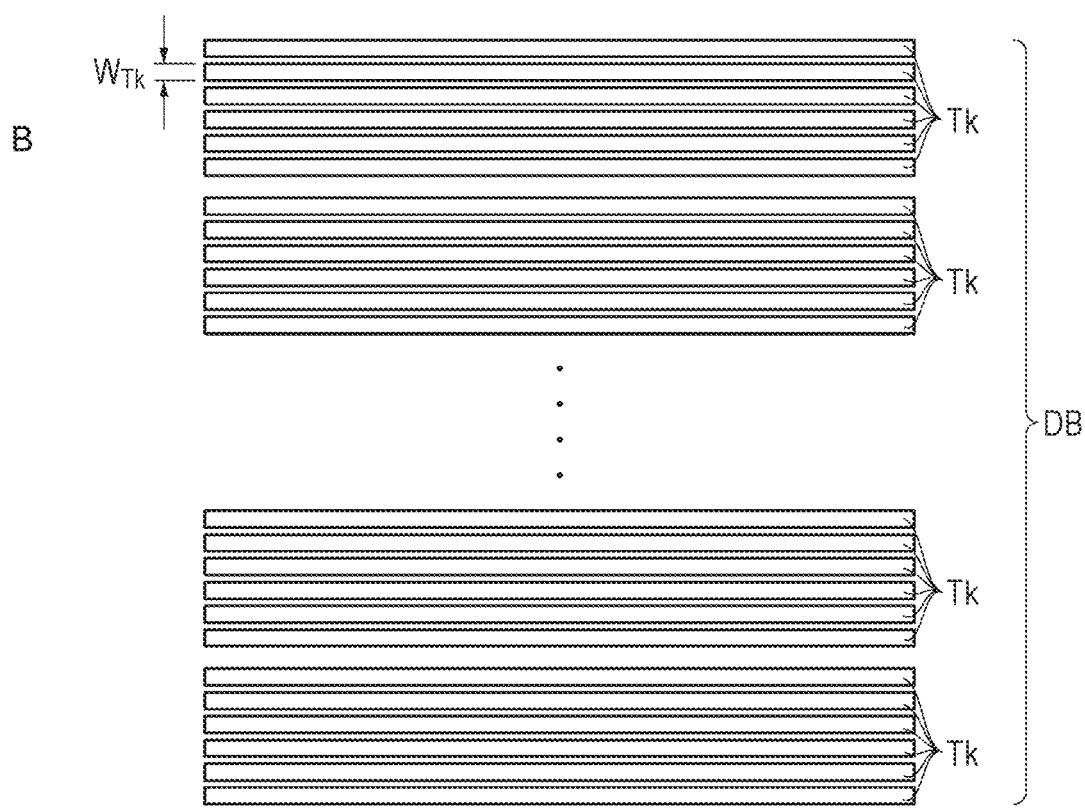

A servo pattern is recorded on the magnetic layer 13. For example, as illustrated in FIG. 2A, the magnetic layer may have a plurality of servo bands SB and a plurality of data bands DB. The plurality of servo bands SB is disposed at regular intervals in a width direction of the magnetic recording medium 10. A data band DB is disposed between adjacent servo bands SB. In each of the servo bands SB, a servo signal for performing tracking control of a magnetic head may be written in advance. User data can be recorded in the data band DB.

The magnetic layer 13 can have, for example, at least one data band and at least two servo bands. The number of data bands can be, for example 2 to 10, particularly 3 to 6, and more particularly 4 or 5. The number of servo bands can be, for example, 3 to 11, particularly 4 to 7, and more particularly 5 or 6. These servo bands and data bands may be disposed, for example, so as to extend in the longitudinal direction of a tape-shaped magnetic recording medium (particularly, a long magnetic recording tape), in particular, so as to be in substantially parallel to each other. Examples of such a magnetic recording medium having a data band and a servo band include a magnetic recording tape according to the linear tape-open (LTO) standard. That is, the magnetic recording medium according to the present technology may be a magnetic recording tape according to the LTO standard. For example, the magnetic recording medium according to the present technology may be a magnetic recording tape according to LTO8 or a later standard.

A ratio RS(=(SSB/S)×100) of a total area SSB of the servo bands SB with respect to an area S of the entire surface of the magnetic layer 13 is preferably 4.0% or less, more preferably 3.0% or less, and still more preferably 2.0% or less from a viewpoint of securing a high recording capacity.

Note that a servo bandwidth WSB of each of the servo bands SB is preferably 95 m or less, more preferably 60 μm or less, and still more preferably 30 μm or less from a viewpoint of securing a high recording capacity. The servo bandwidth WSB is preferably 10 μm or more from a viewpoint of manufacturing a recording head.

The magnetic layer 13 can have, for example, five or more servo bands. The ratio RS of the total area SSB of the servo bands SB with respect to the area S of the surface of the magnetic layer 13 can be preferably 0.8% or more in order to secure five or more servo tracks.

The ratio RS of the total area SSB of the servo bands SB with respect to the area S of the entire surface of the magnetic layer 13 is determined as follows. For example, the magnetic recording medium 10 is developed using a ferricolloid developer (Sigmarker Q manufactured by Sigma Hi-Chemical Inc.), then the developed magnetic recording medium 10 is observed with an optical microscope, and the servo bandwidth WSB and the number of servo bands SB are measured. Next, the ratio $R_S$ is determined from the following formula.

Ratio RS[%]=(((servo bandwidth WSB)×(number of servo bands))/(width of magnetic recording medium 10))×100

As illustrated in FIG. 2B, the magnetic layer 13 can form a plurality of data tracks Tk in a data band DB. In this case, a data track width WTk is preferably 2.0 m or less, more preferably 1.5 m or less, and still more preferably 1.0 m or less from a viewpoint of securing a high recording capacity. The data track width WTk is preferably 0.02 m or more from a viewpoint of a magnetic particle size. The data track width WTk is determined as follows. For example, a data recording pattern of a data band portion of the magnetic layer 13 on the entire surface of which data is recorded is observed using a magnetic force microscope (MFM) to obtain an MFM image. As the MFM, Dimension 3100 manufactured by Digital Instruments and analysis software thereof are used. A measurement area of the MFM image is set to 10 μm×10 μm, and the measurement area of 10 μm×10 μm is divided into 512×512 (=262,144) measurement points. Measurement is performed with the MFM on three 10 μm×10 μm measurement areas at different locations, that is, three MFM images are obtained. From the three obtained MFM images, using the analysis software attached to Dimension 3100, the track width is measured at 10 locations and an average value (simple average) is taken. The average value is the data track width WTk. Note that the MFM measurement conditions are: sweep speed: 1 Hz, chip used: MFMR-20, lift height: 20 nm, and correction: Flatten order 3.

The magnetic layer 13 can record data such that a minimum value of the distance L between magnetization inversions is preferably 48 nm or less, more preferably 44 nm or less, and still more preferably 40 nm or less from a viewpoint of securing a high recording capacity. The minimum value of the distance L between magnetization inversions is considered depending on a magnetic particle size. The minimum value of the distance L between magnetization inversions is determined as follows. For example, a data recording pattern of a data band portion of the magnetic layer 13 on the entire surface of which data is recorded is observed using a magnetic force microscope (MFM) to obtain an MFM image. As the MFM, Dimension 3100 manufactured by Digital Instruments and analysis software thereof are used. The measurement area of the MFM image is set to 2 μm×2 μm, and the measurement area of 2 μm×2 μm is divided into 512×512 (=262,144) measurement points. Measurement is performed with the MFM on three 2 μm×2 μm measurement areas at different locations, that is, three MFM images are obtained. 50 distances between bits are measured from a two-dimensional uneven chart of a recording pattern of the obtained MFM image. The distance between bits is measured using the analysis software attached to Dimension 3100. A value that is approximately the greatest common divisor of the measured 50 distances between bits is defined as the minimum value of the distance L between magnetization inversions. Note that the measurement conditions are: sweep speed: 1 Hz, chip used: MFMR-20, lift height: 20 nm, and correction: Flatten order 3.

Figure 3:
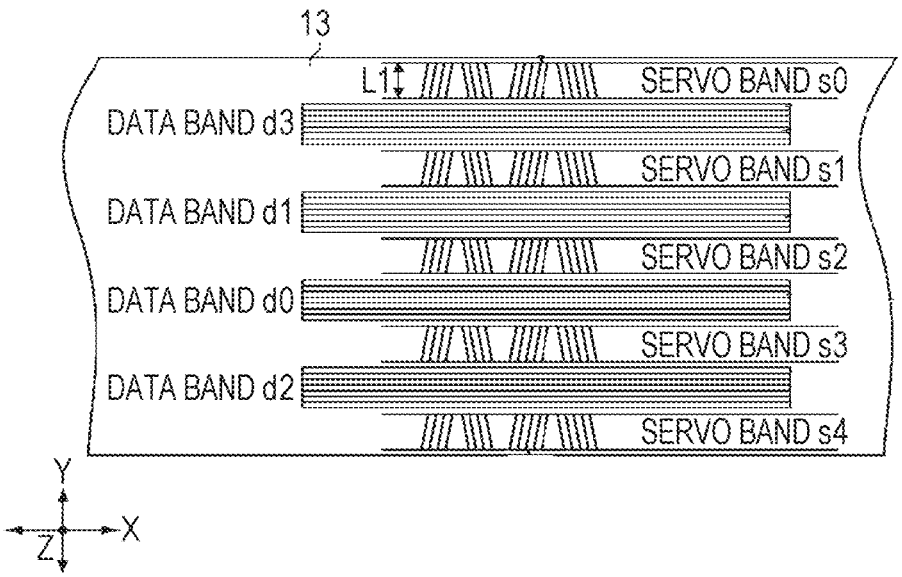
FIG. 3 is a diagram illustrating an example of a servo pattern in a servo band.
Figure 4:
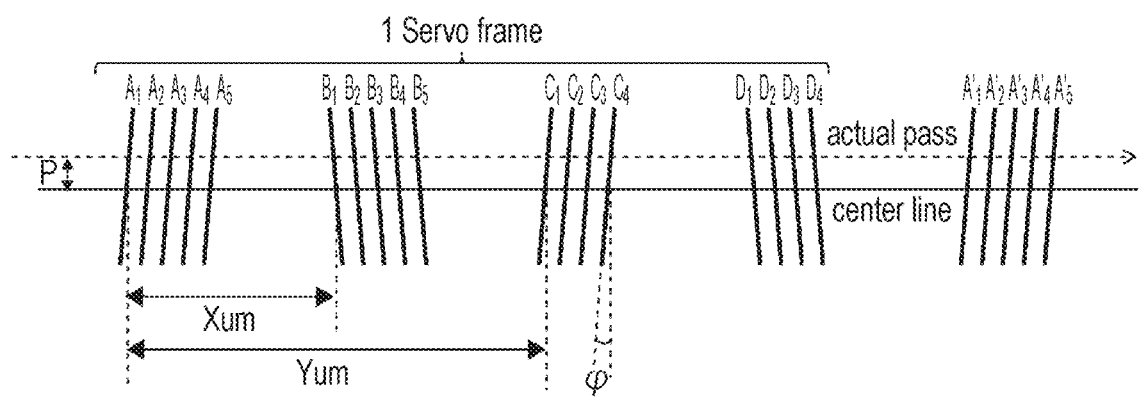
FIG. 4 is a diagram illustrating an example of a servo pattern in a servo band.

More specific examples of the servo pattern recorded on the magnetic layer 13 of the magnetic recording medium of the present technology will be described below with reference to FIGS. 3 and 4. FIG. 3 is a schematic diagram of a data band and a servo band formed in the magnetic layer 13 of the magnetic recording medium 10. FIG. 4 is a diagram illustrating a servo pattern included in each servo band.

As illustrated in FIG. 3, the magnetic layer 13 has four data bands d0 to d3. The magnetic layer 13 has five servo bands S0 to S4 in total such that each data band is sandwiched between two servo bands.

As illustrated in FIG. 4, each servo band repeatedly has a frame unit (one servo frame) including five linear servo patterns inclined at a predetermined angle φ (for example, servo patterns A1 to A5), five linear servo patterns inclined at the same angle in the opposite direction to this signal (for example, servo patterns B1 to B5), four linear servo patterns inclined at a predetermined angle φ (for example, servo patterns C1 to C4), and four linear servo patterns inclined at the same angle in the opposite direction to this signal (for example, servo patterns D1 to D4). The predetermined angle φ can be, for example, 5° to 25°, and particularly 11° to 25°.

A servo bandwidth L1 (see FIG. 3) of each of the servo bands S0 to S4 may be, for example, 100 μm or less, particularly 60 μm or less, more particularly 50 μm or less, and further 40 μm or less. The servo bandwidth L1 may be, for example, 15 μm or more, and particularly 25 μm or more.

(Magnetic Powder)

Examples of a magnetic particle forming the magnetic powder included in the magnetic layer 13 include hexagonal ferrite, epsilon-type iron oxide (ε iron oxide), Co-containing spinel ferrite, gamma hematite, magnetite, chromium dioxide, cobalt-coated iron oxide, and metal, but are not limited thereto. The magnetic powder may be one of these or a combination of two or more thereof. Preferably, the magnetic powder can contain hexagonal ferrite, ε iron oxide, or Co-containing spinel ferrite. Particularly preferably, the magnetic powder is hexagonal ferrite. The hexagonal ferrite can particularly preferably contain at least one of Ba or Sr. The ε iron oxide can particularly preferably contain at least one of Al or Ga. These magnetic particles may be appropriately selected by those skilled in the art on the basis of factors such as a method for manufacturing the magnetic layer 13, the standard of the tape, and the function of the tape.

The shape of the magnetic particle depends on the crystal structure of the magnetic particle. For example, the barium ferrite (BaFe) and the strontium ferrite can each have a hexagonal plate shape. The ε iron oxide can be spherical. The cobalt ferrite can be cubic. The metal can be spindle-shaped. In a step of manufacturing the magnetic recording medium 10, these magnetic particles are oriented.

The average particle size of the magnetic powder can be preferably 50 nm or less, more preferably 40 nm or less, and still more preferably 30 nm or less, 25 nm or less, 22 nm or less, 21 nm or less, or 20 nm or less. The average particle size can be, for example, 10 nm or more, and preferably 12 nm or more.

The aspect ratio of the magnetic powder can be preferably 1.0 or more and 3.5 or less, more preferably 1.0 or more and 3.1 or less, still more preferably 1.0 or more and 2.8 or less, and particularly preferably 1.1 or more and 2.5 or less.

(Embodiment in which Magnetic Powder Contains Hexagonal Ferrite)

According to a preferred embodiment of the present technology, the magnetic powder can contain hexagonal ferrite, and more particularly can contain powder of nanoparticles containing hexagonal ferrite (hereinafter referred to as "hexagonal ferrite particles"). The hexagonal ferrite particle has, for example, a hexagonal plate shape or a substantially hexagonal plate shape. The hexagonal ferrite can preferably contain at least one of Ba, Sr, Pb, or Ca, more preferably at least one of Ba or Sr. Specifically, the hexagonal ferrite may be, for example, barium ferrite or strontium ferrite. The barium ferrite may further contain at least one of Sr, Pb, or Ca in addition to Ba. The strontium ferrite may further contain at least one of Ba, Pb, or Ca in addition to Sr.

More specifically, the hexagonal ferrite can have an average composition represented by a general formula $MFe_{12}O_{19}$. Here, M represents, for example, at least one metal of Ba, Sr, Pb, and Ca, preferably at least one metal of Ba and Sr. M may represent a combination of Ba and one or more metals selected from the group including Sr, Pb, and Ca. Furthermore, M may represent a combination of Sr and one or more metals selected from the group including Ba, Pb, and Ca. In the above general formula, some of Fe atoms may be replaced with another metal element.

In a case where the magnetic powder contains powder of hexagonal ferrite particles, the average particle size of the magnetic powder can be preferably 50 nm or less, more preferably 40 nm or less, and still more preferably 30 nm or less, 25 nm or less, 22 nm or less, 21 nm or less, or 20 nm or less. The average particle size can be, for example, 10 nm or more, preferably 12 nm or more, and more preferably 15 nm or more. For example, the average particle size of the magnetic powder can be 10 nm or more and 50 nm or less, 10 nm or more and 40 nm or less, 12 nm or more and 30 nm or less, 12 nm or more and 25 nm or less, or 15 nm or more and 22 nm or less. In a case where the average particle size of the magnetic powder is the upper limit value described above or less (for example, 50 nm or less, particularly 30 nm or less), in the magnetic recording medium 10 having a high recording density, good electromagnetic conversion characteristics (for example, C/N) can be obtained. In a case where the average particle size of the magnetic powder is the lower limit value described above or more (for example, 10 nm or more, preferably 12 nm or more), the dispersibility of the magnetic powder is further improved, and better electromagnetic conversion characteristics (for example, C/N) can be obtained.

In a case where the magnetic powder contains powder of hexagonal ferrite particles, the average aspect ratio of the magnetic powder can be preferably 1 or more and 3.2 or less, more preferably 1 or more and 2.5 or less, still more preferably 1 or more and 2.1 or less, and further still more preferably 1 or more and 1.8 or less. When the average aspect ratio of the magnetic powder is within the above numerical range, aggregation of the magnetic powder can be suppressed, and moreover, resistance applied to the magnetic powder can be suppressed when the magnetic powder is perpendicularly oriented in a step of forming the magnetic layer 13. This can improve the perpendicular orientation of the magnetic powder.

In a case where the magnetic powder contains powder of hexagonal ferrite particles, the average particle size and average aspect ratio of the magnetic powder are determined as follows.

First, the magnetic recording medium 10 to be measured is processed to be thinned by a focused ion beam (FIB) method and the like. In a case where the FIB method is used, as a pretreatment for observing a TEM image of a cross section described later, a carbon film and a tungsten thin film are formed as protective films. The carbon film is formed on the magnetic layer side surface and the back layer side surface of the magnetic recording medium 10 by a vapor deposition method, and the tungsten thin film is further formed on the magnetic layer side surface by a vapor deposition method or a sputtering method. The thinning is performed in a length direction (longitudinal direction) of the magnetic recording medium 10. That is, by the thinning, a cross section parallel to both the longitudinal direction and the thickness direction of the magnetic recording medium 10 is formed.

Cross-sectional observation is performed for the cross section of the obtained thin sample such that the entire magnetic layer 13 is included with respect to the thickness direction of the magnetic layer 13 using a transmission electron microscope (H-9500 manufactured by Hitachi High-Technologies) with an acceleration voltage of 200 kV and an overall magnification of 500,000 times, and a TEM photograph is imaged.

Figure 10:
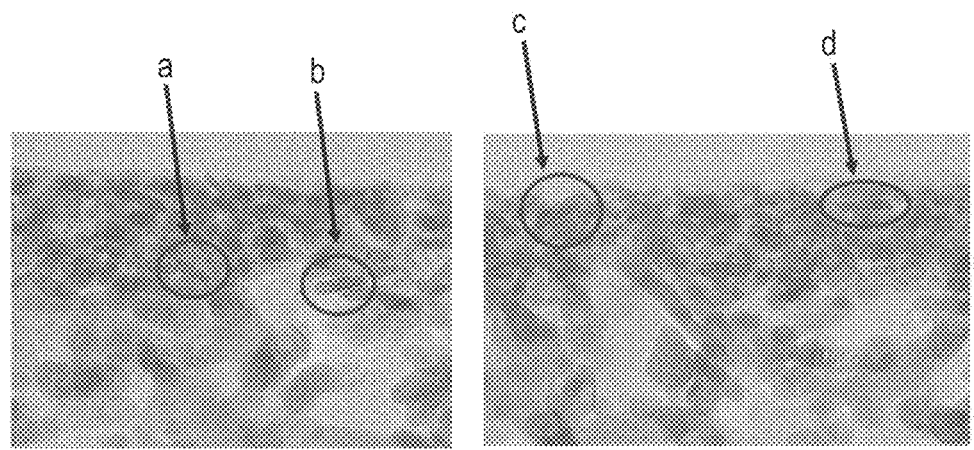
FIG. 10 is an example of a TEM photograph of a magnetic layer.

Next, from the imaged TEM photograph, 50 particles which have side surfaces directed to an observation surface and the thicknesses of which can be clearly confirmed are selected. For example, FIG. 10 illustrates an example of the TEM photograph. In FIG. 10, for example, particles indicated by a and d are selected because their thicknesses can be clearly confirmed. A maximum plate thickness DA of each of the 50 selected particles is measured. The maximum plate thicknesses DA thus determined are simply averaged (arithmetically averaged) to determine an average maximum plate thickness $DA_{ave}$.

Subsequently, the plate diameter DB of each particle of the magnetic powder is measured. In order to measure the particle plate diameter DB, 50 particles the plate diameters of which can be clearly confirmed are selected from the imaged TEM photograph. For example, in FIG. 10, for example, particles indicated by b and c are selected because their plate diameters can be clearly confirmed. The plate diameter DB of each of the 50 selected particles is measured.

The plate diameters DB thus determined are simply averaged (arithmetically averaged) to determine an average plate diameter $DB_{ave}$. The average plate diameter $DB_{ave}$ is the average particle size.

Then, an average aspect ratio ($DB_{ave}/DA_{ave}$) of the particles is determined from the average maximum plate thickness $DA_{ave}$ and the average plate diameter $DB_{ave}$.

In a case where the magnetic powder contains powder of hexagonal ferrite particles, the average particle volume of the magnetic powder is preferably 5900 nm³ or less, more preferably 500 nm³ or more and 3400 nm³ or less, and still more preferably 1000 nm³ or more and 2500 nm³ or less.

In a case where the average particle volume of the magnetic powder is the upper limit value described above or less (for example, 5900 nm³ or less), good electromagnetic conversion characteristics (for example, C/N) can be obtained in the magnetic recording medium 10 having a high recording density. In a case where the average particle volume of the magnetic powder is the lower limit value described above or more (for example, 500 nm³ or more), the dispersibility of the magnetic powder is further improved, and better electromagnetic conversion characteristics (for example, C/N) can be obtained.

The average particle volume of the magnetic powder is determined as follows. First, the average maximum plate thickness $DA_{ave}$ and the average plate diameter $DB_{ave}$ are determined as described regarding the above-described method for calculating the average particle size of the magnetic powder. Next, an average volume V of the magnetic powder is determined by the following formula.

$$V = \frac{3\sqrt{3}}{8} \times DA_{ave} \times DB_{ave} \times DB_{ave}$$

According to a particularly preferred embodiment of the present technology, the magnetic powder can be barium ferrite magnetic powder or strontium ferrite magnetic powder, and more preferably barium ferrite magnetic powder. The barium ferrite magnetic powder includes iron oxide magnetic particles having barium ferrite as a main phase (hereinafter referred to as "barium ferrite particles"). The barium ferrite magnetic powder has high data recording reliability, for example, does not decrease a coercive force even in a high-temperature and high-humidity environment. The barium ferrite magnetic powder is preferable as the magnetic powder from such a viewpoint.

The average particle size of the barium ferrite magnetic powder is 50 nm or less, more preferably 10 nm or more and 40 nm or less, and still more preferably 12 nm or more and 25 nm or less.

In a case where the magnetic layer 13 contains barium ferrite magnetic powder as the magnetic powder, the average thickness $t_m$ [nm] of the magnetic layer 13 preferably satisfies 35 nm ≤ $t_m$ ≤ 100 nm, and is particularly preferably 80 nm or less.

Furthermore, the coercive force Hc measured in a thickness direction (perpendicular direction) of the magnetic recording medium 10 is preferably 160 kA/m or more and 280 kA/m or less, more preferably 165 kA/m or more and 275 kA/m or less, and still more preferably 170 kA/m or more and 270 kA/m or less.

(Embodiment in which Magnetic Powder Contains ε Iron Oxide)

According to another preferred embodiment of the present technology, the magnetic powder can preferably contain powder of nanoparticles containing ε iron oxide (hereinafter referred to as "ε iron oxide particles"). Even if the ε iron oxide particles are fine particles, a high coercive force can be obtained. ε iron oxide contained in the ε iron oxide particles is preferably crystal-oriented preferentially in a thickness direction (perpendicular direction) of the magnetic recording medium 10.

The ε iron oxide particle has a spherical shape or a substantially spherical shape, or has a cubic shape or a substantially cubic shape. Since the ε iron oxide particle has the shape as described above, in a case where the E iron oxide particles are used as magnetic particles, a contact area between the particles in a thickness direction of the medium can be reduced, and aggregation of the particles can be suppressed as compared to a case where hexagonal plate-shaped barium ferrite particles are used as the magnetic particles. Therefore, dispersibility of the magnetic powder can be enhanced, and a better signal-to-noise ratio (SNR) can be obtained.

Figure 5:
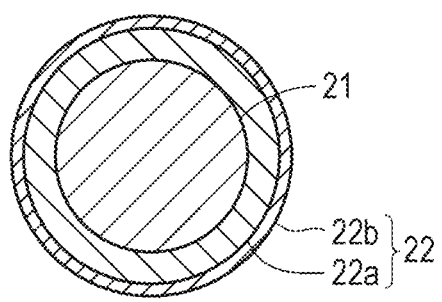
FIG. 5 is a cross-sectional view illustrating a configuration of a magnetic particle.

The ε iron oxide particle has a core-shell type structure. Specifically, the ε iron oxide particle has a core portion 21 and a two-layered shell portion 22 disposed around the core portion 21 as illustrated in FIG. 5. The two-layered shell portion 22 includes a first shell portion 22a disposed on the core portion 21 and a second shell portion 22b disposed on the first shell portion 22a.

The core portion 21 contains ε iron oxide. ε iron oxide contained in the core portion 21 preferably contains an ε-Fe$_2$O$_3$ crystal as a main phase, and more preferably contains ε—Fe$_2$O$_3$ as a single phase.

The first shell portion 22a covers at least a part of the periphery of the core portion 21. Specifically, the first shell portion 22a may partially cover the periphery of the core portion 21 or may cover the entire periphery of the core portion 21. The first shell portion 22a preferably covers the entire surface of the core portion 21 from a viewpoint of making exchange coupling between the core portion 21 and the first shell portion 22a sufficient and improving magnetic characteristics.

The first shell portion 22a is a so-called soft magnetic layer, and can include, for example, a soft magnetic material such as α-Fe, a Ni—Fe alloy, or a Fe—Si—Al alloy. α-Fe may be obtained by reducing ε iron oxide contained in the core portion 21.

The second shell portion 22b is an oxide film as an antioxidant layer. The second shell portion 22b contains α iron oxide, aluminum oxide, or silicon oxide. α-iron oxide can contain, for example, at least one iron oxide of Fe$_3$O$_4$, Fe$_2$O$_3$, and FeO. In a case where the first shell portion 22a contains α-Fe (soft magnetic material), α-iron oxide may be obtained by oxidizing α-Fe contained in the first shell portion 22a.

By inclusion of the first shell portion 22a in the ε iron oxide particle as described above, thermal stability can be secured. As a result, the coercive force Hc of the entire ε iron oxide particles (core-shell particles) can be adjusted to a coercive force Hc suitable for recording while the coercive force Hc of the core portion 21 alone is maintained at a large value. Furthermore, by inclusion of the second shell portion 22b in the ε iron oxide particle as described above, it is possible to suppress deterioration of the characteristics of the ε iron oxide particles due to generation of a rust or the like on surfaces of the particles by exposure of the ε iron oxide particles to the air during a step of manufacturing the magnetic recording medium 10 and before the step. Therefore, characteristic deterioration of the magnetic recording medium 10 can be suppressed.

Figure 6:
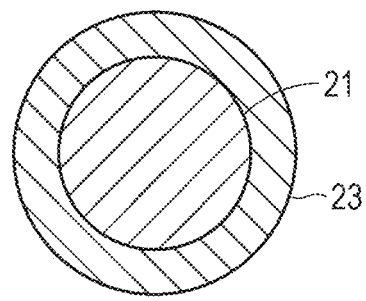
FIG. 6 is a cross-sectional view illustrating a configuration of a magnetic particle in Modification.

The ε iron oxide particle may have a shell portion 23 having a single layer structure as illustrated in FIG. 6. In this case, the shell portion 23 has a similar configuration to the first shell portion 22a. However, the ε iron oxide particle preferably has a two-layered shell portion 22 from a viewpoint of suppressing characteristic deterioration of the ε iron oxide particle.

The ε iron oxide particle may contain an additive instead of the core-shell structure, or may contain an additive while having the core-shell structure. In these cases, some of Fe atoms in the ε iron oxide particles are replaced with an additive. Even by inclusion of an additive in the ε iron oxide particle, the coercive force He of the entire ε iron oxide particles can be adjusted to a coercive force He suitable for recording. Therefore, recordability can be improved. The additive is a metal element other than iron, preferably a trivalent metal element, and more preferably at least one selected from the group including aluminum (Al), gallium (Ga), and indium (In).

Specifically, the ε iron oxide containing an additive is an ε-$Fe_{2-x}M_xO_3$ crystal (in which M represents a metal element other than iron, preferably a trivalent metal element, and more preferably at least one of Al, Ga, or In, and x satisfies, for example, 0<x<1).

The average particle size (average maximum particle size) of the magnetic powder is preferably 22 nm or less, more preferably 8 nm or more and 22 nm or less, and still more preferably 12 nm or more and 22 nm or less. In the magnetic recording medium 10, an area having a half size of a recording wavelength is an actual magnetization area. Therefore, by setting the average particle size of the magnetic powder to a half or less of the shortest recording wavelength, it is possible to obtain good S/N. Therefore, when the average particle size of the magnetic powder is 22 nm or less, in the magnetic recording medium 10 having a high recording density (for example, the magnetic recording medium 10 that can record a signal at the shortest recording wavelength of 44 nm or less), good electromagnetic conversion characteristics (for example, SNR) can be obtained. Meanwhile, when the average particle size of the magnetic powder is 8 nm or more, dispersibility of the magnetic powder is further improved, and better electromagnetic conversion characteristics (for example, SNR) can be obtained.

The average aspect ratio of the magnetic powder is preferably 1.0 or more and 3.5 or less, more preferably 1.0 or more and 3.1 or less, and still more preferably 1.0 or more and 2.5 or less. When the average aspect ratio of the magnetic powder is within a range of 1.0 or more and 3.5 or less, aggregation of the magnetic powder can be suppressed, and resistance applied to the magnetic powder can be suppressed when the magnetic powder is perpendicularly oriented in a step of forming the magnetic layer 13. Therefore, perpendicular orientation of the magnetic powder can be improved.

In a case where the magnetic powder contains ε iron oxide particles, the average particle size and average aspect ratio of the magnetic powder are determined as follows.

First, the magnetic recording medium 10 to be measured is processed to be thinned by a focused ion beam (FIB) method and the like. In a case where the FIB method is used, as a pretreatment for observing a TEM image of a cross section described later, a carbon film and a tungsten thin film are formed as protective films. The carbon film is formed on the magnetic layer side surface and the back layer side surface of the magnetic recording medium 10 by a vapor deposition method, and the tungsten thin film is further formed on the magnetic layer side surface by a vapor deposition method or a sputtering method. Thinning is performed in a length direction (longitudinal direction) of the magnetic recording medium 10. That is, by the thinning, a cross section parallel to both the longitudinal direction and the thickness direction of the magnetic recording medium 10 is formed.

Cross-sectional observation is performed for the cross section of the obtained thin sample such that the entire magnetic layer 13 is included with respect to the thickness direction of the magnetic layer 13 using a transmission electron microscope (H-9500 manufactured by Hitachi High-Technologies) with an acceleration voltage of 200 kV and an overall magnification of 500,000 times, and a TEM photograph is imaged.

Next, 50 particles the shapes of which can be clearly confirmed are selected from the imaged TEM photograph, and the long axis length DL and the short axis length DS of each of the particles are measured. Here, the long axis length DL means the largest distance among distances between two parallel lines drawn from all angles so as to come into contact with an outline of each of the particles (so-called maximum Feret diameter). Meanwhile, the short axis length DS means the largest length among the lengths of a particle in a direction orthogonal to the long axis (DL) of the particle.

Subsequently, the long axis lengths DL of the measured 50 particles are simply averaged (arithmetically averaged) to determine an average long axis length $DL_{ave}$. The average long axis length $DL_{ave}$ determined in this manner is taken as an average particle size of the magnetic powder. Furthermore, the short axis lengths DS of the measured 50 particles are simply averaged (arithmetically averaged) to determine an average short axis length $DS_{ave}$. Then, an average aspect ratio ($DL_{ave}/DS_{ave}$) of the particles is determined from the average long axis length $DL_{ave}$ and the average short axis length $DS_{ave}$.

The average particle volume of the magnetic powder is preferably 5500 $nm^3$ or less, more preferably 270 $nm^3$ or more and 5500 $nm^3$ or less, and still more preferably 900 $nm^3$ or more and 5500 $nm^3$ or less. When the average particle volume of the magnetic powder is 5500 $nm^3$ or less, a similar effect to that in a case where the average particle size of the magnetic powder is 22 nm or less can be obtained. Meanwhile, when the average particle volume of the magnetic powder is 270 $nm^3$ or more, a similar effect to a case where the average particle size of the magnetic powder is 8 nm or more can be obtained.

In a case where the ε iron oxide particle has a spherical shape or a substantially spherical shape, the average particle volume of the magnetic powder is determined as follows. First, an average long axis length $DL_{ave}$ is determined in a similar manner to the above method for calculating the average particle size of the magnetic powder. Next, an average volume V of the magnetic powder is determined by the following formula.

$$V=(\pi/6) \times DL_{ave}^3$$

In a case where the ε iron oxide particle has a cubic shape, the average volume of the magnetic powder is determined as follows.

The magnetic recording medium 10 is processed to be thinned by a focused ion beam (FIB) method and the like. In a case where the FIB method is used, as a pretreatment for observing a TEM image of a cross section described later, a carbon film and a tungsten thin film are formed as protective films. The carbon film is formed on the magnetic layer side surface and the back layer side surface of the magnetic recording medium 10 by a vapor deposition method, and the tungsten thin film is further formed on the magnetic layer side surface by a vapor deposition method or a sputtering method. The thinning is performed in a length direction (longitudinal direction) of the magnetic recording medium 10. That is, by the thinning, a cross section parallel to both the longitudinal direction and the thickness direction of the magnetic recording medium 10 is formed.

Cross-sectional observation is performed for the obtained thin sample such that the entire magnetic layer 13 is included with respect to the thickness direction of the magnetic layer 13 using a transmission electron microscope (H-9500 manufactured by Hitachi High-Technologies) with an acceleration voltage of 200 kV and an overall magnification of 500,000 times, and a TEM photograph is obtained. Note that the magnification and the acceleration voltage may be appropriately adjusted according to the type of device.

Next, 50 particles the shapes of which are clear are selected from the imaged TEM photograph, and the side length DC of each of the particles is measured. Subsequently, the side lengths DC of the measured 50 particles are simply averaged (arithmetically averaged) to determine an average side length $DC_{ave}$. Next, the average volume $V_{ave}$ (particle volume) of the magnetic powder is determined from the following formula using the average side length $DC_{ave}$.

$$V_{ave} = DC_{ave}^3$$

(Embodiment in which Magnetic Powder Contains Co-Containing Spinel Ferrite)

According to still another preferred embodiment of the present technology, the magnetic powder can contain powder of nanoparticles containing Co-containing spinel ferrite (hereinafter also referred to as "cobalt ferrite particles"). That is, the magnetic powder can be cobalt ferrite magnetic powder. The cobalt ferrite particle preferably has uniaxial crystal anisotropy. The cobalt ferrite magnetic particle has, for example, a cubic shape or a substantially cubic shape. The Co-containing spinel ferrite may further contain at least one selected from the group including Ni, Mn, Al, Cu, and Zn in addition to Co.

Cobalt ferrite has, for example, an average composition represented by the following formula (1).

$$Co_xM_yFe_2O_z \quad (1)$$

(Provided that in formula (1), M represents one or more metals selected from the group including Ni, Mn, Al, Cu, and Zn, for example. x represents a value within a range of 0.4≤x≤1.0. y represents a value within a range of 0≤y≤0.3. Provided that x and y satisfy a relationship of (x+y)≤1.0. z represents a value within a range of 3≤z≤4. Some of Fe atoms may be replaced with another metal element.)

The average particle size of the cobalt ferrite magnetic powder is preferably 25 nm or less, and more preferably 23 nm or less. The coercive force Hc of the cobalt ferrite magnetic powder is preferably 2500 Oe or more, and more preferably 2600 Oe or more and 3500 Oe or less.

In a case where the magnetic powder contains powder of cobalt ferrite particles, the average particle size of the magnetic powder is preferably 25 nm or less, and more preferably 10 nm or more and 23 nm or less. When the average particle size of the magnetic powder is 25 nm or less, good electromagnetic conversion characteristics (for example, SNR) can be obtained in the magnetic recording medium 10 having a high recording density. Meanwhile, when the average particle size of the magnetic powder is 10 nm or more, dispersibility of the magnetic powder is further improved, and better electromagnetic conversion characteristics (for example, SNR) can be obtained. In a case where the magnetic powder contains powder of cobalt ferrite particles, the average aspect ratio and average particle size of the magnetic powder are determined by the same method as that in a case where the magnetic powder contains ε iron oxide particles.

The average particle volume of the magnetic powder is preferably 15000 $nm^3$ or less, and more preferably 1000 $nm^3$ or more and 12000 $nm^3$ or less. When the average particle volume of the magnetic powder is 15000 $nm^3$ or less, a similar effect to that in a case where the average particle size of the magnetic powder is 25 nm or less can be obtained. Meanwhile, when the average particle volume of the magnetic powder is 1000 $nm^3$ or more, a similar effect to a case where the average particle size of the magnetic powder is 10 nm or more can be obtained. Note that the average particle volume of the magnetic powder is determined by the same calculation method as that in a case where the ε iron oxide particle has a cubic shape.

(Lubricant)

The magnetic layer includes a lubricant. The lubricant may be, for example, one or more selected from fatty acids and/or fatty acid esters, and preferably includes both a fatty acid and a fatty acid ester. Inclusion of the lubricant in the magnetic layer, particularly inclusion of both a fatty acid and a fatty acid ester in the magnetic layer contributes to improvement in traveling stability of the magnetic recording medium. More particularly, inclusion of the lubricant in the magnetic layer and presence of pores in the magnetic layer achieve good traveling stability. The improvement in the traveling stability is considered to be because the coefficient of dynamic friction of the magnetic layer side surface of the magnetic recording medium is adjusted to a value suitable for traveling of the magnetic recording medium by the lubricant.

The fatty acid may preferably be a compound represented by the following general formula (1) or (2). For example, the lubricant may contain, as the fatty acid, one or both of a compound represented by the following general formula (1) and a compound represented by the general formula (2).

Furthermore, the fatty acid ester may preferably be a compound represented by the following general formula (3) or (4). For example, the lubricant may contain, as the fatty acid ester, one or both of a compound represented by the following general formula (3) and a compound represented by the general formula (4).

By inclusion of one or both of a compound represented by general formula (1) and a compound represented by general formula (2), and inclusion of one or both of a compound represented by general formula (3) and a compound represented by general formula (4) in the lubricant, an increase in the coefficient of dynamic friction due to repeated recording or reproduction in the magnetic recording medium can be suppressed.

$$CH_3(CH_2)_kCOOH \quad (1)$$

(Provided that in the general formula (1), k is an integer selected from a range of 14 or more and 22 or less, more preferably a range of 14 or more and 18 or less)

$$CH_3(CH_2)_nCH=CH(CH_2)_mCOOH \quad (2)$$

(Provided that in the general formula (2), the sum of n and m is an integer selected from a range of 12 or more and 20 or less, more preferably a range of 14 or more and 18 or less)

$$CH_3(CH_2)_pCOO(CH_2)_qCH_3 \quad (3)$$

(Provided that in the general formula (3), p is an integer selected from a range of 14 or more and 22 or less, more preferably a range of 14 or more and 18 or less, and q is an integer selected from a range of 2 or more and 5 or less, more preferably a range of 2 or more and 4 or less)

$$CH_3(CH_2)_rCOO\text{---}(CH_2)_sCH(CH_3)_2 \qquad (4)$$

(Provided that in the general formula (4), r is an integer selected from a range of 14 or more and 22 or less, and s is an integer selected from a range of 1 or more and 3 or less.)

(Binder)

As the binder, a resin having a structure in which a polyurethane-based resin, a vinyl chloride-based resin, or the like has been subjected to a crosslinking reaction is preferable. However, the binder is not limited to these resins, and other resins may be blended appropriately according to physical properties and the like required for the magnetic recording medium 10. Usually, a resin to be blended is not particularly limited as long as being generally used in the application type magnetic recording medium 10.

As the binder, for example, one or a combination of two or more selected from polyvinyl chloride, polyvinyl acetate, a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinyl chloride-vinylidene chloride copolymer, an acrylate-vinylidene chloride copolymer, a methacrylate-vinylidene chloride copolymer, a methacrylate-vinyl chloride copolymer, a methacrylate-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, and nitrocellulose), a styrene-butadiene copolymer, a polyester resin, an amino resin, and a synthetic rubber can be used.

Furthermore, a thermosetting resin or a reactive resin may be used as the binder. Examples of the thermosetting resin or the reactive resin include a phenol resin, an epoxy resin, a urea resin, a melamine resin, an alkyd resin, a silicone resin, a polyamine resin, and a urea formaldehyde resin.

Furthermore, in order to improve dispersibility of the magnetic powder, a polar functional group such as —$SO_3M$, —$OSO_3M$, —COOM, or $P=O(OM)_2$ may be introduced into each of the above-described binders. Here, in the formulae, M represents a hydrogen atom or an alkali metal such as lithium, potassium, or sodium.

Moreover, examples of the polar functional group include a side chain type group having a terminal group of —NR1R2 or —NR1R2R3$^+$X$^-$, and a main chain type group of >NR1R2$^+$X$^-$. Here, R1, R2, and R3 in the formula each independently represent a hydrogen atom or a hydrocarbon group, and X$^-$ represents an ion of a halogen element such as fluorine, chlorine, bromine, or iodine, or an inorganic or organic ion. Furthermore, examples of the polar functional group include —OH, —SH, —CN, and an epoxy group.

(Additive)

As nonmagnetic reinforcing particles, the magnetic layer 13 may further contain aluminum oxide (α, β, or γ alumina), chromium oxide, silicon oxide, diamond, garnet, emery, boron nitride, titanium carbide, silicon carbide, titanium carbide, titanium oxide (rutile type or anatase type titanium oxide), and the like.

(Underlayer)

The underlayer 12 is a nonmagnetic layer containing nonmagnetic powder and a binder as main components. The underlayer 12 further contains a lubricant. The description regarding the binder and lubricant contained in the magnetic layer 13 described above also applies to the binder and lubricant contained in the underlayer 12. The underlayer 12 may further contain at least one additive selected from conductive particles, a curing agent, a rust preventive, and the like as necessary.

The underlayer 12 has an average thickness of 0.5 μm or more and 0.9 μm or less. The average thickness of the underlayer 12 may be preferably 0.88 μm or less, more preferably 0.85 μm or less, and still more preferably 0.80 μm or less. Furthermore, the average thickness of the underlayer 12 may be preferably 0.52 μm or more, more preferably 0.55 μm or more, and still more preferably 0.60 μm or more. Note that the average thickness of the underlayer 12 is determined in a similar manner to the average thickness $t_m$ of the magnetic layer 13. However, a magnification of a TEM image is appropriately adjusted according to the thickness of the underlayer 12.

The underlayer 12 may have pores, that is, the underlayer 12 may have a large number of pores. The pores of the underlayer 12 may be formed, for example, along with formation of pores in the magnetic layer 13, and in particular, can be formed by pressing a large number of protrusions formed on the back layer side surface of the magnetic recording medium 10 against the magnetic layer side surface. That is, by forming a recess corresponding to the shape of a protrusion on the magnetic layer side surface, pores can be formed in the magnetic layer 13 and the underlayer 12.

Furthermore, pores may be formed as a solvent volatilizes in a step of drying a magnetic layer forming coating material. Furthermore, when the magnetic layer forming coating material is applied to a surface of the underlayer 12 in order to form the magnetic layer 13, a solvent in the magnetic layer forming coating material passes through the pores of the underlayer 12 formed when the lower layer is applied and dried, and can permeate the underlayer 12. Thereafter, when the solvent that has permeated the underlayer 12 volatilizes in a step of drying the magnetic layer 13, the solvent that has permeated the underlayer 12 moves from the underlayer 12 to the surface of the magnetic layer 13, thereby pores may be formed. The pores formed in this way can communicate, for example, the magnetic layer 13 with the underlayer 12. The average diameter of the pores can be adjusted by changing the solid content of the magnetic layer forming coating material or the type of a solvent thereof and/or drying conditions of the magnetic layer forming coating material.

By forming pores in both the magnetic layer 13 and the underlayer 12, a particularly suitable amount of lubricant for good traveling stability appears on the magnetic layer side surface, and an increase in the coefficient of dynamic friction due to repeated recording or reproduction can be further suppressed.

(Nonmagnetic Powder)

The nonmagnetic powder contained in the underlayer 12 can contain, for example, at least one selected from inorganic particles and organic particles. One kind of nonmagnetic powder may be used singly, or two or more kinds of nonmagnetic powder may be used in combination. The inorganic particles include, for example, one or a combination of two or more selected from a metal, a metal oxide, a metal carbonate, a metal sulfate, a metal nitride, a metal carbide, and a metal sulfide. More specifically, the inorganic particles can be one or more selected from, for example, iron oxyhydroxide, hematite, titanium oxide, and carbon black. Examples of the shape of the nonmagnetic powder include various shapes such as an acicular shape, a spherical shape, a cubic shape, and a plate shape, but are not limited thereto.

(Back Layer)

The back layer 14 can contain a binder and nonmagnetic powder. The back layer 14 may contain various additives such as a lubricant, a curing agent, and an antistatic agent as necessary. The above description regarding the binder and nonmagnetic powder contained in the underlayer 12 also applies to the binder and nonmagnetic powder contained in the back layer 14.

The average thickness tb of the back layer 14 satisfies preferably tb≤0.6 μm, more preferably tb≤0.5 μm. By setting the average thickness tb of the back layer 14 within the above range, even in a case where the average thickness $t_T$ of the magnetic recording medium 10 satisfies $t_T$≤5.6 μm, the thicknesses of the underlayer 12 and the base layer 11 can be kept large. This makes it possible to maintain traveling stability of the magnetic recording medium 10 in the recording/reproducing device.

The average thickness tb of the back layer 14 is determined as follows. First, the average thickness $t_T$ of the magnetic recording medium 10 is measured. A method for measuring the average thickness $t_T$ is as described in "(3) Physical properties and structure" below. Subsequently, the back layer 14 of the sample is removed with a solvent such as methyl ethyl ketone (MEK) or dilute hydrochloric acid. Next, the thickness of the sample is measured at five or more points using a laser hologage (LGH-110C) manufactured by Mitutoyo Corporation, and the measured values are simply averaged (arithmetically averaged) to calculate an average thickness $t_B$ [μm]. Thereafter, the average thickness $t_b$ (μm) of the back layer 14 is determined by the following formula. Note that the measurement points are randomly selected from the sample.

$$t_b[\mu m]=t_T[\mu m]-t_B[\mu m]$$

Here, a value calculated by the measuring device is described to the first decimal place by rounding off the second decimal place.

Out of the two surfaces of the back layer 14, the surface forming the back layer side surface of the magnetic recording medium 10 preferably has a large number of protrusions. By winding the magnetic recording medium 10 in a roll shape, the large number of protrusions can form a large number of pores in the magnetic layer 13.

The protrusions can be formed, for example, by inclusion of particles in the back layer forming coating material. The particles can be inorganic particles such as carbon black, for example. The particle diameters of the particles can be appropriately selected according to the sizes of the pores to be formed in the magnetic layer 13.

The average particle size of particles (particularly inorganic particles) contained in the back layer 14 is preferably 10 nm or more and 150 nm or less, and more preferably 15 nm or more and 110 nm or less. The average particle size of the inorganic particles can be determined in a similar manner to an average particle size of the above ε iron oxide magnetic powder.

(3) Physical Properties and Structure (Amount of Width Change)

The amount of dimensional change of the magnetic recording medium 10 in a width direction thereof between a state in which a tension of 0.5 N is applied to the magnetic recording medium in a longitudinal direction thereof and a state in which a tension of 1.0 N is applied to the magnetic recording medium in the longitudinal direction (hereinafter referred to as the amount of width change) can be preferably 4.0 or more, more preferably 4.1 μm or more, and still more preferably 4.2 μm or more. Furthermore, the amount of width change may be preferably 6.0 μm or less, for example, 5.0 μm or less. The amount of width change can be, for example, 4.0 μm or more and 6.0 μm or less, and particularly 4.2 μm or more and 6.0 μm or less.

The amount of width change within the above range improves ease of dimensional adjustment in the width direction by adjusting a tension applied to the magnetic recording medium 10 in a longitudinal direction thereof (hereinafter, also referred to as controllability of the dimensions in the width direction or width controllability).

The dimensions of the magnetic recording medium 10 in a width direction thereof can change after its manufacture due to an elapse of time (particularly due to long-term storage) and/or a change in environment around the magnetic recording medium 10 (for example, temperature and/or humidity). Although the dimensional change in the width direction is very small, the dimensional change can affect a magnetic recording medium having a narrow servo bandwidth and/or data bandwidth in order to improve recording density. For example, a dimensional change in the width direction may cause a phenomenon undesirable for magnetic recording, such as an off-track phenomenon. Therefore, the above-described recording/reproducing device for adjusting the width of the magnetic recording medium by adjusting a tension of the magnetic recording medium in a longitudinal direction thereof can be used. The amount of width change within the above range makes it easy to adjust the dimensions in the width dimension by the recording/reproducing device, for example. Note that the off-track phenomenon means that a target track does not exist at a track position to be read by the magnetic head, or the magnetic head reads a wrong track position.

The amount of width change can be measured as follows.

First, the magnetic recording medium 10 having a width of ½ inches is prepared and cut into a length of 250 mm to manufacture a sample 10S. Next, a load is applied to the sample 10S in a longitudinal direction thereof in the order of 0.5 N and 1.0 N, and the widths Wa and Wb of the sample 10S in a case where loads of 0.5 N and 1.0 N are applied are measured, respectively. A difference between measured Wa and Wb (Wa−Wb) is defined as the amount of width change when a load of 0.5 N is additionally applied.

Figure 11A:
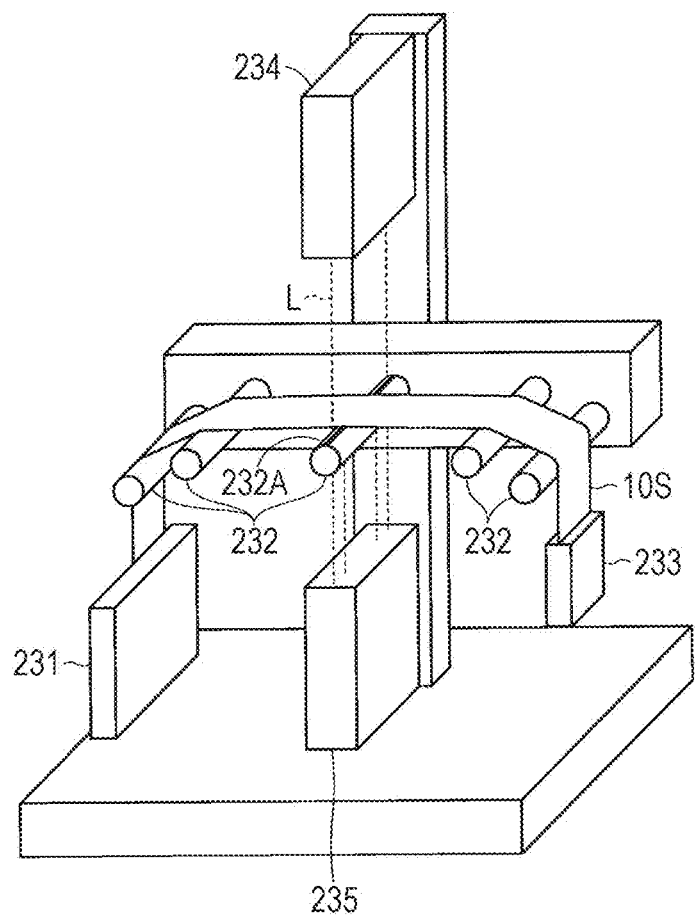
FIG. 11A is a perspective view illustrating a configuration of a measuring device.

The width of the sample 10S when each load is applied is measured as follows. First, a measuring device incorporating a digital dimension measuring instrument LS-7000 manufactured by Keyence Corporation, illustrated in FIG. 11A, is prepared as a measuring device, and the sample 10S is set in this measuring device. Specifically, one end of the long sample (magnetic recording medium) 10S is fixed by a fixing portion 231. Next, as illustrated in FIG. 11A, the sample 10S is placed on five substantially cylindrical and rod-shaped support members 232. The sample 10S is placed on the five support members 232 such that the back surface thereof comes into contact with the support members 232. The five support members 232 (particularly surfaces thereof) all contain stainless steel SUS304, and have a surface roughness Rz (maximum height) of 0.15 μm to 0.3 μm.

Figure 11B:
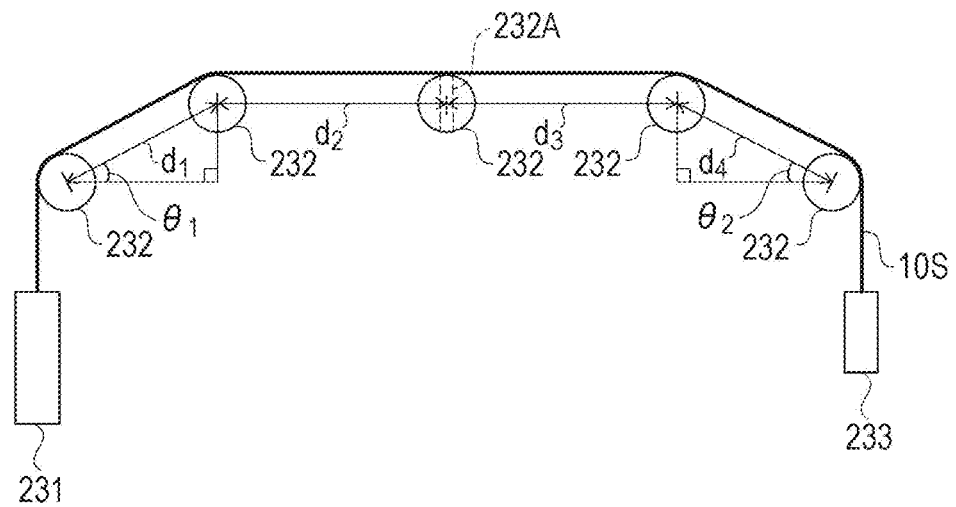
FIG. 11B is a perspective view illustrating details of a measuring device.

Disposition of the five rod-shaped support members 232 will be described with reference to FIG. 11B. As illustrated in FIG. 11B, the sample 10S is placed on the five support members 232. Hereinafter, the five support members 232 will be referred to as "first support member", "second support member", "third support member" (having a slit 232A), "fourth support member", and "fifth support member" (closest to a weight 233) from a side closest to the fixing portion 231. Each of these five support members has a diameter of 7 mm. A distance d1 between the first support member and the second support member (in particular, a distance between the centers of these support members) is 20 mm. A distance d2 between the second support member and the third support member is 30 mm. A distance d3 between the third support member and the fourth support member is 30 mm. A distance d4 between the fourth support member and the fifth support member is 20 mm. Furthermore, the three support members of the second to fourth support members are disposed such that portions of the sample 10S between the second support member and the third support member and between the third support member and the fourth support member form a plane substantially perpendicular to the direction of gravity. Furthermore, the first support member and the second support member are disposed such that the sample 10S forms an angle of θ1=30° with respect to the substantially perpendicular plane between the first support member and the second support member. Moreover, the fourth support member and the fifth support member are disposed such that the sample 10S forms an angle of θ2=30° with respect to the substantially perpendicular plane between the fourth support member and the fifth support member.

Furthermore, among the five support members 232, the third support member is fixed so as not to rotate, but the other four support members are all rotatable.

The sample 10S is held so as not to move in a width direction of the sample 10S on the support members 232. Note that among the support members 232, the support member 232 located between a light emitter 234 and a light receiver 235 and located substantially at the center between the fixing portion 231 and a portion to which a load is applied has the slit 232A. Light L is emitted from the light emitter 234 to the light receiver 235 through the slit 232A. The slit 232A has a slit width of 1 mm, and the light L can pass through the width without being blocked by a frame of the slit 232A.

Subsequently, the measuring device is housed in a chamber controlled under a constant environment in which the temperature is 25° C. and the relative humidity is 50%. Thereafter, the weight 233 for applying a load of 0.5 N is attached to the other end of the sample 10S, and the sample 10S is left in the above environment for two hours. After being left for two hours, the width Wa of the sample 10S is measured. Next, the weight for applying a load of 0.5 N is changed to a weight for applying a load of 1.0 N, and the width Wb of the sample 10S is measured five minutes after the change.

As described above, by adjusting the weight of the weight 233, a load applied to the sample 10S in a longitudinal direction thereof can be changed. With each load applied, the light L is emitted from the light emitter 234 toward the light receiver 235, and the width of the sample 10S to which the load is applied in a longitudinal direction thereof is measured. The measurement of the width is performed in a state where the sample 10S is not curled. The light emitter 234 and the light receiver 235 are included in the digital dimension measuring instrument LS-7000.

(Average Thickness $t_T$ of Magnetic Recording Medium)

The average thickness $t_T$ of the magnetic recording medium 10 satisfies $t_T \leq 5.6$ μm, and can be more preferably 5.3 μm or less, and still more preferably 5.2 μm or less, 5.0 μm or less, or 4.6 μm or less. When the average thickness $t_T$ of the magnetic recording medium 10 is within the above numerical range (for example, by satisfying $t_T \leq 5.6$ μm), the recording capacity that can be recorded in one data cartridge can be increased as compared with a conventional case. A lower limit value of the average thickness $t_T$ of the magnetic recording medium 10 is not particularly limited, but satisfies, for example, 3.5 μm $\leq t_T$.

The average thickness $t_T$ of the magnetic recording medium 10 is determined as follows. First, the magnetic recording medium 10 having a width of ½ inches is prepared and cut into a length of 250 mm to manufacture a sample. Next, the thickness of the sample is measured at five or more points using a laser hologage (LGH-110C) manufactured by Mitutoyo Corporation as a measuring device, and the measured values are simply averaged (arithmetically averaged) to calculate an average thickness $t_T$ [μm]. Note that the measurement points are randomly selected from the sample. Here, a value calculated by the measuring device is described to the first decimal place by rounding off the second decimal place.

(Young's Modulus of Magnetic Recording Medium in Longitudinal Direction)

The Young's modulus of the magnetic recording medium 10 in a longitudinal direction thereof is 7.90 GPa or less, more preferably 7.85 or less, and still more preferably 7.80 GPa or less. The above Young's modulus may be, for example, 3.00 GPa or more, preferably 4.00 Gpa or more, more preferably 5.00 Gpa or more, still more preferably 6.00 GPa or more, and further still more preferably 7.00 GPa or more. Since the Young's modulus is within the numerical range described above, the magnetic recording medium 10 is suitable for use in a recording/reproducing device that keeps the width of the magnetic recording medium constant or substantially constant by adjusting a tension of the magnetic recording medium 10 in a longitudinal direction thereof. The recording/reproducing device can detect, for example, dimensions or a dimensional change of the magnetic recording medium in a width direction thereof, and can adjust the tension in the longitudinal direction on the basis of a detection result.

The Young's modulus of the magnetic recording medium 10 in a longitudinal direction thereof can be measured as follows.

The above Young's modulus is measured using a tensile tester (manufactured by Shimadzu Corporation, AG-100D).

First, the magnetic recording medium 10 having a width of ½ inches is cut into a length of 180 mm to prepare a measurement sample. Two jigs that can fix the measurement sample so as to cover the entire width thereof are attached to the above tensile tester. Two ends in the length direction of the measurement sample are chucked by the two jigs, respectively. A distance between the chucks is set to 100 mm. After the measurement sample is chucked, a stress is gradually applied such that the measurement sample is pulled in the length direction. The pulling speed is set to 0.1 mm/min. From the change in stress and the amount of elongation at this time, the Young's modulus is calculated using the following formula.

$$E = \{(\Delta N/S)/(\Delta x/L)\} \times 10^6$$

In the formula described above, E represents Young's modulus (N/m²), ΔN represents a change in stress (N), S represents the cross-sectional area of a measurement sample (mm²) Δx represents the amount of elongation (mm), and L represents a distance between the two jigs (distance between chucks) (mm).

The stress when the measurement sample is pulled by the tensile tester described above is changed from 0.5 N to 1.0

N. The change in stress (ΔN) and the amount of elongation (Δx) when the stress is changed in this way are used for the calculation by the formula described above.

(Coating Film Thickness/Base Thickness)

In the magnetic recording medium 10, the ratio of the total thickness of the magnetic layer, the underlayer, and the back layer to the thickness of the base layer (hereinafter referred to as coating film thickness/base thickness) is preferably 0.38 or less, more preferably 0.34 or less, still more preferably 0.32 or less, and further still more preferably 0.30 or less.

The coating film thickness/base thickness is preferably 0.20 or more, more preferably 0.22 or more, and still more preferably 0.24 or more.

Since the coating film thickness/base thickness is within the numerical range described above, the magnetic recording medium 10 is more suitable for use in a recording/reproducing device that keeps the width of the magnetic recording medium constant or substantially constant by adjusting a tension of the magnetic recording medium in a longitudinal direction thereof.

In general, the Young's modulus of the coating film (magnetic layer, underlayer, and back layer) is higher than that of the base layer. By setting the coating film thickness/base thickness within the above numerical range, the Young's modulus of the magnetic recording medium 10 in a longitudinal direction thereof can be adjusted to be suitable for use in the recording/reproducing device. Note that the coating film thickness is a value obtained by adding the thickness of the magnetic layer, the thickness of the underlayer, and the thickness of the back layer.

Note that the present technology also provides a tape-shaped magnetic recording medium including: a magnetic layer; an underlayer; a base layer; and a back layer, in which the underlayer has a thickness of 0.5 μm or more and 0.9 μm or less, the magnetic recording medium has an average thickness $t_T$ of 5.6 μm or less, the magnetic recording medium includes a lubricant, the magnetic recording medium has pores, the pores have an average diameter of 6 nm or more and 11 nm or less, and the ratio of the total thickness of the magnetic layer, the underlayer, and the back layer to the thickness of the base layer is 0.38 or less.

(Average Diameter of Pores of Magnetic Recording Medium)

The average diameter of the pores of the magnetic recording medium 10 (pore diameter of maximum pore volume at the time of desorption) is 6 nm or more and 11 nm or less, preferably 6 nm or more and 10 nm or less, more preferably 6.5 nm or more and 10 nm or less, and still more preferably 7 nm or more and 9 nm or less in a state where the lubricant has been removed from the magnetic recording medium 10 and the magnetic recording medium 10 has been dried. The average pore volume within the numerical range described above can further improve the effect of suppressing the increase in the coefficient of dynamic friction after repeated recording or reproduction is performed.

The average diameter of the pores formed in the magnetic recording medium 10 (pore diameter of maximum pore volume at the time of desorption) is measured in a state where the lubricant has been removed from the magnetic recording medium and the magnetic recording medium has been dried. Specifically, the measurement is performed as follows.

First, the magnetic recording medium 10 having a size about 10% larger than the area 0.1265 m² is immersed in hexane (amount in which the tape can be sufficiently immersed, for example, 150 mL) for 24 hours, then naturally dried, and cut out so as to have an area of 0.1265 m² (for example, 50 cm at each end of the dried tape is cut off to prepare a tape having a width of 10 m) to manufacture a measurement sample. The lubricant is removed from the magnetic recording medium 10 by immersion in the hexane for 24 hours, and the magnetic recording medium 10 is dried by the natural drying.

Next, the average diameter of the pores is measured by a BJH method using a specific surface area/pore distribution measuring device. A measuring device and measuring conditions are indicated below. In this way, the average diameter of the pores is measured.

Measurement environment: room temperature
Measuring device: 3 FLEX manufactured by Micromeritics Instrument Corp.
Measurement adsorbate: N2 gas
Measurement pressure range ($P/P^O$): 0 to 0.995

For the measurement pressure range, the pressure is changed as illustrated in Table below. The pressure values in the following Table are relative pressures $P/P^O$. In the following Table, for example, in step 1, the pressure is changed so as to change by 0.001 per 10 seconds from a starting pressure 0.000 to an ultimate pressure 0.010. When the pressure reaches the ultimate pressure, pressure change in the next step is performed. The similar applies to steps 2 to 10. However, in each step, in a case where the pressure has not reached equilibrium, the device waits for the pressure to reach equilibrium and then proceeds to the next step.

| Step | Starting pressure | Pressure change | Ultimate pressure |
| --- | --- | --- | --- |
| 1 | 0.000 | 0.001/10 sec | 0.010 |
| 2 | 0.010 | 0.02/10 sec | 0.100 |
| 3 | 0.100 | 0.05/10 sec | 0.600 |
| 4 | 0.600 | 0.05/10 sec | 0.950 |
| 5 | 0.950 | 0.05/10 sec | 0.990 |
| 6 | 0.990 | 0.05/10 sec | 0.995 |
| 7 | 0.995 | 0.01/10 sec | 0.990 |
| 8 | 0.990 | 0.01/10 sec | 0.950 |
| 9 | 0.950 | 0.05/10 sec | 0.600 |
| 10 | 0.600 | 0.05/10 sec | 0.300 |

(Friction Coefficient Ratio ($\mu_B/\mu_A$))

The magnetic recording medium 10 has a friction coefficient ratio ($\mu_B/\mu_A$) of preferably 1.0 to 2.0, more preferably 1.0 to 1.8, still more preferably 1.0 to 1.6, in which A represents a coefficient of dynamic friction between a magnetic layer side surface of the magnetic recording medium and a magnetic head in a state where a tension of 0.4 N is applied in the longitudinal direction of the magnetic recording medium 10, and $\mu_B$ represents a coefficient of dynamic friction between the magnetic layer side surface of the magnetic recording medium and the magnetic head in a state where a tension of 1.2 N is applied in the longitudinal direction of the magnetic recording medium. The friction coefficient ratio ($\mu_B/\mu_A$) within the above numerical range can reduce a change in the coefficient of dynamic friction due to the tension fluctuation during traveling, and therefore can stabilize traveling of the magnetic recording medium 10.

The coefficients of dynamic friction μA and $\mu_B$ for calculating the friction coefficient ratio ($\mu_B/\mu_A$) are determined as follows.

Figure 7:
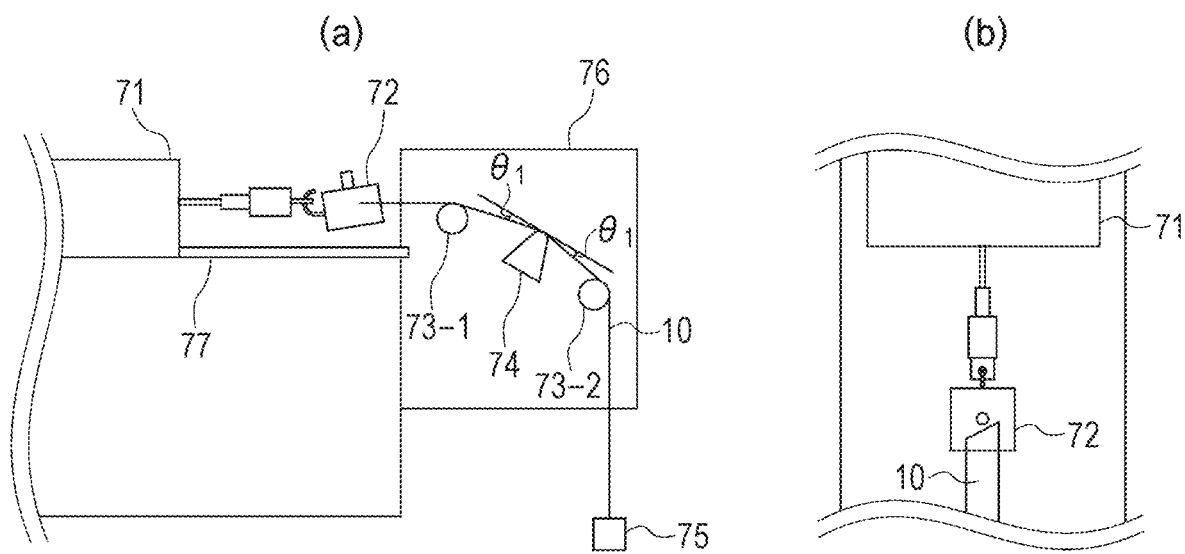
FIG. 7 is a diagram for explaining a method for measuring a friction coefficient between a magnetic surface and a magnetic head.

First, as illustrated in FIG. 7(*a*), the magnetic recording medium 10 having a width of ½ inches is placed on two cylindrical guide rolls 73-1 and 73-2 each having a diameter of one inch and disposed in parallel to and spaced apart from each other such that the magnetic surface is in contact with the guide rolls 73-1 and 73-2. The two guide rolls 73-1 and 73-2 are fixed to a hard plate-shaped member 76, and thereby have a fixed positional relationship with each other.

Subsequently, the magnetic recording medium 10 is brought into contact with a head block (for recording/reproducing) 74 mounted on an LTO5 drive such that the magnetic surface is in contact with the head block 74 and a holding angle $\theta_1(°)$ is 5.6°. The head block 74 is disposed substantially at the center of the guide rolls 73-1 and 73-2. The head block 74 is movably attached to the plate-shaped member 76 such that the holding angle $\theta 1$ can be changed. When the holding angle $\theta_1(°)$ becomes 5.6°, the position of the head block 74 is fixed to the plate-shaped member 76. As a result, a positional relationship between the guide rolls 73-1 and 73-2 and the head block 74 is also fixed.

One end of the magnetic recording medium 10 is connected to a movable strain gauge 71 via a jig 72. The magnetic recording medium 10 is fixed to the jig 72 as illustrated in FIG. 7(b).

A weight 75 is connected to the other end of the magnetic recording medium 10. The weight 75 applies a tension $T_0[N]$ of 0.4 N to the magnetic recording medium 10 in a longitudinal direction thereof. The movable strain gauge 71 is fixed onto a base 77. A positional relationship between the base 77 and the plate-shaped member 76 is also fixed. As a result, a positional relationship among the guide rolls 73-1 and 73-2, the head block 74, and the movable strain gauge 71 is fixed.

With the movable strain gauge 71, the magnetic recording medium 10 is slid on the head block 74 by 60 mm such that the magnetic recording medium 10 moves toward the movable strain gauge 71 at 10 mm/s. An output value (voltage) of the movable strain gauge 71 at the time of sliding is converted into T [N] on the basis of a linear relationship (as described later) between an output value acquired in advance and a load. T [N] is acquired 13 times from the start of sliding to the end of sliding for the 60 mm slide, and 11 values of T [N] excluding totally two times of the first and last times are simply averaged to obtain $T_{ave}$ [N].

Thereafter, the coefficient of dynamic friction $\mu_A$ is determined by the following formula.

$$\mu_A = \frac{1}{(\theta_1[°]) \times (\Pi/180)} \times \ln\left(\frac{T_{ave}[N]}{T_0[N]}\right)$$

The linear relationship is obtained as follows. That is, an output value (voltage) of the movable strain gauge 71 is obtained for each of cases where a load of 0.4 N is applied to the movable strain gauge 71 and a load of 1.5 N is applied thereto. From the obtained two output values and the two loads, a linear relationship between the output value and the load is obtained. Using the linear relationship, as described above, the output value (voltage) from the movable strain gauge 71 during sliding is converted into T [N].

The coefficient of dynamic friction s is measured by the same method as the method for measuring the coefficient of dynamic friction $\mu_A$ except that the tension $T_0[N]$ applied to the other end is set to 1.2 N.

The friction coefficient ratio $(\mu_B/\mu_A)$ is calculated from the coefficients of dynamic friction $\mu_A$ and $\mu_B$ measured as described above.

(Friction Coefficient Ratio $(\mu_{C(1000)}/\mu_{C(5)})$)

The magnetic recording medium 10 has the friction coefficient ratio $(\mu_{C(1000)}/\mu_{C(5)})$ of preferably 1.0 to 2.0, more preferably 1.0 to 1.8, still more preferably 1.0 to 1.6, in which $\mu_{C(5)}$ represents a coefficient of dynamic friction at the fifth reciprocation in a case where the magnetic recording medium in a state where a tension of 0.6 N is applied to the magnetic recording medium in a longitudinal direction thereof is reciprocatedly slid five times on a magnetic head, and $\mu_{C(1000)}$ represents a coefficient of dynamic friction at the 1000th reciprocation in a case where the magnetic recording medium is reciprocated 1000 times on the magnetic head. The friction coefficient ratio $(\mu_{C(1000)}/\mu_{C(5)})$ within the above numerical range can reduce a change in the coefficient of dynamic friction due to traveling many times, and therefore can stabilize traveling of the magnetic recording medium 10.

The coefficients of dynamic friction $\mu_{C(5)}$ and $\mu_{C(1000)}$ for calculating the friction coefficient ratio $(\mu_{C(1000)}/\mu_{C(5)})$ are determined as follows.

The magnetic recording medium 10 is connected to the movable strain gauge 71 in the same manner as the method for measuring the coefficient of dynamic friction $\mu A$ except that the tension $T_0[N]$ applied to the other end of the magnetic recording medium 10 is set to 0.6 N. Then, the magnetic recording medium 10 is slid 60 mm toward the movable strain gauge at 10 mm/s with respect to the head block 74 (forward path) and slid 60 mm away from the movable strain gauge (return path). This reciprocating operation is repeated 1000 times. Among the 1000 reciprocating operations, a strain gauge output value (voltage) is acquired 13 times from the start of sliding to the end of sliding for the 60 mm slide in the fifth forward path, and the output value is converted into T [N] on the basis of a linear relationship between an output value determined as described above for the coefficient of dynamic friction $\mu_A$ and a load. Eleven values of T [N] excluding totally two times of the first and last times are simply averaged to determine $T_{ave}$ [N]. The coefficient of dynamic friction $\mu_{C(5)}$ is determined by the following formula.

$$\mu_{C(5)} = \frac{1}{(\theta_1[°]) \times (\pi/180)} \times \ln\left(\frac{T_{ave}[N]}{T_0[N]}\right)$$

Moreover, the coefficient of dynamic friction $\mu_{C(1000)}$ is determined in a similar manner to the coefficient of dynamic friction $\mu_{C(5)}$ except that measurement is performed for the 1000th forward path.

The friction coefficient ratio $\mu_{C(1000)}/\mu_{C(5)}$ is calculated from the coefficients of dynamic friction $\mu_{C(5)}$ and $\mu_{C(1000)}$ measured as described above.

(Squareness Ratio S2 Measured in Perpendicular Direction)

The magnetic recording medium 10 has a squareness ratio S2 of preferably 65% or more, more preferably 70% or more, still more preferably 73% or more, further still more preferably 80% or more when the squareness ratio S2 is measured in a perpendicular direction (thickness direction) of the magnetic recording medium 10. When the squareness ratio S2 is 65% or more, perpendicular orientation of magnetic powder is sufficiently high. Therefore, better SNR can be obtained. Therefore, better electromagnetic conversion characteristics can be obtained. Furthermore, the shape of a servo signal is improved, and it is easier to control a drive side.

Here, the perpendicular orientation of the magnetic recording medium may mean that the squareness ratio S2 of the magnetic recording medium is within the numerical range described above (for example, 65% or more).

The squareness ratio S2 in the perpendicular direction is determined as follows. First, three magnetic recording media 10 are overlapped and bonded with a double-sided tape, and then punched with a φ6.39 mm punch to manufacture a measurement sample. At this time, marking is performed with an arbitrary ink having no magnetism such that the longitudinal direction (traveling direction) of the magnetic recording medium 10 be recognized. Then, using a VSM, an M-H loop of the measurement sample (the entire magnetic recording medium 10) corresponding to the perpendicular direction (thickness direction) of the magnetic recording medium 10 is measured. Next, the coating film (the underlayer 12, the magnetic layer 13, the back layer 14, and the like) is wiped off using acetone, ethanol, and the like, leaving only the base layer 11. Then, the three base layers 11 thus obtained are overlapped and bonded with a double-sided tape, and then punched with a φ6.39 mm punch to obtain a background correction sample (hereinafter simply referred to as "correction sample"). Thereafter, an M-H loop of the correction sample (base layer 11) corresponding to the perpendicular direction of the base layer 11 (perpendicular direction of the magnetic recording medium 10) is measured using a VSM.

In the measurement of the M-H loop of the measurement sample (the entire magnetic recording medium 10) and the M-H loop of the correction sample (base layer 11), a highly sensitive vibrating sample magnetometer "VSM-P7-15 type" manufactured by Toei Industry Co., Ltd. is used. The measurement conditions are set to measurement mode: full loop, maximum magnetic field: 15 kOe, magnetic field step: 40 bits, time constant of locking amp: 0.3 sec, waiting time: 1 sec, and MH average number: 20.

After the M-H loop of the measurement sample (the entire magnetic recording medium 10) and the M-H loop of the correction sample (base layer 11) are obtained, the M-H loop of the correction sample (base layer 11) is subtracted from the M-H loop of the measurement sample (the entire magnetic recording medium 10) to perform background correction, and an M-H loop after background correction is obtained. For the calculation of background correction, a measurement/analysis program attached to "VSM-P7-15 type" is used.

The squareness ratio S2 (%) is calculated by putting saturation magnetization Ms (emu) and residual magnetization Mr (emu) of the obtained M-H loop after background correction into the following formula. Note that each of the above measurements of the M-H loops is performed at 25° C. Furthermore, when the M-H loop is measured in the perpendicular direction of the magnetic recording medium 10, "demagnetizing field correction" is not performed. Note that for this calculation, the measurement/analysis program attached to "VSM-P7-15" is used.

Squareness ratio $S2(\%)=(Mr/Ms)\times 100$ (Squareness Ratio S1 Measured in Longitudinal Direction)

The squareness ratio S1 measured in the longitudinal direction (traveling direction) of the magnetic recording medium 10 is preferably 35% or less, more preferably 30% or less, 27% or less, or 25% or less, and still more preferably 20% or less. When the squareness ratio S1 is 35% or less, perpendicular orientation of magnetic powder is sufficiently high. Therefore, better SNR can be obtained. Therefore, better electromagnetic conversion characteristics can be obtained. Furthermore, the shape of a servo signal is improved, and it is easier to control a drive side.

Here, the perpendicular orientation of the magnetic recording medium can mean that the squareness ratio S1 of the magnetic recording medium is within the numerical range described above (for example, 35% or less). The magnetic recording medium according to the present technology is preferably perpendicularly oriented.

The squareness ratio S1 in the longitudinal direction is determined in a similar manner to the squareness ratio S2 except that the M-H loop is measured in the longitudinal direction (traveling direction) of the magnetic recording medium 10 and the base layer 11.

The squareness ratios S1 and S2 are set to desired values, for example, by adjusting the intensity of a magnetic field applied to a magnetic layer forming coating material, application time of the magnetic field to the magnetic layer forming coating material, a dispersed state of magnetic powder in the magnetic layer forming coating material, and the concentration of a solid content in the magnetic layer forming coating material. Specifically, for example, as the intensity of the magnetic field is increased, the squareness ratio S1 becomes smaller, whereas the squareness ratio S2 becomes larger. Furthermore, as the application time of the magnetic field is increased, the squareness ratio S1 becomes smaller, whereas the squareness ratio S2 becomes larger. Furthermore, as the dispersed state of the magnetic powder is improved, the squareness ratio S1 becomes smaller, whereas the squareness ratio S2 becomes larger. Furthermore, as the concentration of the solid content decreases, the squareness ratio S1 becomes smaller, whereas the squareness ratio S2 becomes larger. Note that the above adjustment methods may be used singly or in combination of two or more thereof.

(Arithmetic Average Roughness $R_a$)

The arithmetic average roughness $R_a$ of the magnetic layer side surface (hereinafter also referred to as "magnetic surface") of the magnetic recording medium 10 is preferably 2.5 nm or less, more preferably 2.0 nm or less, and still more preferably 1.9 nm or less. When $R_a$ is 2.5 nm or less, better SNR can be obtained.

The arithmetic average roughness $R_a$ is determined as follows. First, the surface of the magnetic layer 13 is observed by AFM, and an AFM image of 40 m×40 m is obtained. As the AFM, Dimension 3100 manufactured by Digital Instruments and an analysis software thereof are used. A cantilever including a silicon single crystal is used (Note 1). Measurement is performed by tuning at 200 to 400 Hz as a tapping frequency. Next, an AFM image is divided into 512×512 (=262,144) measurement points.

The height Z(i) (i: measurement point number, i=1 to 262,144) is measured at each measurement point. The measured heights Z(i) at the measurement points are simply averaged (arithmetically averaged) to determine average height (average plane) $Z_{ave}$ $(=Z(1)+Z(2)+ \ldots +Z(262,144))/262,144)$. Subsequently, a deviation Z"(i) $(=|Z(i)-Z_{ave}|)$ from an average center line at each measurement point is determined, and the arithmetic average roughness $R_a[nm](=(Z"(1)+Z"(2)+ \ldots +Z"(262,144))/262,144)$ is calculated. In this case, as image processing, data that has been subjected to filtering processing by Flatten order 2 and plane fit order 3 XY is used as data.

(Note 1) SPM probe NCH normal type Point Probe L (cantilever length)=125 μm manufactured by Nano World The arithmetic average roughness $R_a$ can be adjusted by changing drying temperature and drying time in a coating film drying step described later. The arithmetic average roughness $R_a$ tends to be larger as the drying temperature is higher and as the drying time is longer.

Furthermore, the arithmetic average roughness $R_a$ can be adjusted by changing a temperature condition and a pressure condition in a calendering step described later. The arithmetic average roughness $R_a$ tends to be larger as the pressure condition in the calendering step is lower and as the temperature condition is lower.

(Coercive Force Hc)

The coercive force He of the magnetic recording medium 10 in a longitudinal direction thereof is preferably 2000 Oe or less, more preferably 1900 Oe or less, and still more preferably 1800 Oe or less. When the coercive force He in the longitudinal direction is 2000 Oe or less, magnetization reacts with high sensitivity due to a magnetic field in a perpendicular direction from a recording head. Therefore, a good recording pattern can be formed.

The coercive force He measured in the longitudinal direction of the magnetic recording medium 10 is preferably 1000 Oe or more. When a lower limit value of the coercive force He in the longitudinal direction is 1000 Oe or more, demagnetization due to a leakage magnetic flux from a recording head can be suppressed.

The above coercive force He is determined as follows. First, three magnetic recording media 10 are overlapped and bonded with a double-sided tape, and then punched with a φ6.39 mm punch to manufacture a measurement sample. At this time, marking is performed with an arbitrary ink having no magnetism such that the longitudinal direction (traveling direction) of the magnetic recording medium 10 be recognized. Then, an M-H loop of the measurement sample (the entire magnetic recording medium 10) corresponding to the longitudinal direction (traveling direction) of the magnetic recording medium 10 is measured using a vibrating sample magnetometer (VSM). Next, the coating film (the underlayer 12, the magnetic layer 13, the back layer 14, and the like) is wiped off using acetone, ethanol, and the like, leaving only the base layer 11. Then, the three base layers 11 thus obtained are overlapped and bonded with a double-sided tape, and then punched with a φ6.39 mm punch to manufacture a background correction sample (hereinafter simply referred to as "correction sample"). Thereafter, an M-H loop of the correction sample (base layer 11) corresponding to the perpendicular direction of the base layer 11 (perpendicular direction of the magnetic recording medium 10) is measured using a VSM.

In the measurement of the M-H loop of the measurement sample (the entire magnetic recording medium 10) and the M-H loop of the correction sample (base layer 11), a highly sensitive vibrating sample magnetometer "VSM-P7-15 type" manufactured by Toei Industry Co., Ltd. is used. The measurement conditions are set to measurement mode: full loop, maximum magnetic field: 15 kOe, magnetic field step: 40 bits, time constant of locking amp: 0.3 sec, waiting time: 1 sec, and MH average number: 20.

After the M-H loop of the measurement sample (the entire magnetic recording medium 10) and the M-H loop of the correction sample (base layer 11) are obtained, the M-H loop of the correction sample (base layer 11) is subtracted from the M-H loop of the measurement sample (the entire magnetic recording medium 10) to perform background correction, and an M-H loop after background correction is obtained. For the calculation of background correction, a measurement/analysis program attached to "VSM-P7-15 type" is used.

The coercive force He is determined from the obtained M-H loop after background correction. Note that for this calculation, the measurement/analysis program attached to "VSM-P7-15" is used. Note that each of the above measurements of the M-H loops is performed at 25° C. Furthermore, when the M-H loop is measured in the longitudinal direction of the magnetic recording medium 10, "demagnetizing field correction" is not performed.

(4) Method for Manufacturing Magnetic Recording Medium

Next, a method for manufacturing the magnetic recording medium 10 having the above-described configuration will be described. First, by kneading and/or dispersing nonmagnetic powder, a binder, and the like in a solvent, an underlayer forming coating material is prepared. Next, by kneading and/or dispersing magnetic powder, a binder, and the like in a solvent, a magnetic layer forming coating material is prepared. Next, by kneading and/or dispersing a binder, nonmagnetic powder, and the like in a solvent, a back layer forming coating material is prepared. For the preparation of the magnetic layer forming coating material, the underlayer forming coating material, and the back layer forming coating material, for example, the following solvents, dispersing devices, and kneading devices can be used.

Examples of the solvent used for preparing the above-described coating material include: a ketone-based solvent such as acetone, methyl ethyl ketone, methyl isobutyl ketone, or cyclohexanone; an alcohol-based solvent such as methanol, ethanol, or propanol; an ester-based solvent such as methyl acetate, ethyl acetate, butyl acetate, propyl acetate, ethyl lactate, or ethylene glycol acetate; an ether-based solvent such as diethylene glycol dimethyl ether, 2-ethoxyethanol, tetrahydrofuran, or dioxane; an aromatic hydrocarbon-based solvent such as benzene, toluene, or xylene; and a halogenated hydrocarbon-based solvent such as methylene chloride, ethylene chloride, carbon tetrachloride, chloroform, or chlorobenzene. One of these solvents may be used, or a mixture of two or more thereof may be used.

Examples of a kneading device used for preparing the above-described coating materials include a kneading device such as a continuous twin-screw kneading machine, a continuous twin-screw kneading machine capable of performing dilution in multiple stages, a kneader, a pressure kneader, or a roll kneader, but are not particularly limited to these devices. Furthermore, examples of a dispersing device used for preparing the above-described coating materials include a dispersing device such as a roll mill, a ball mill, a horizontal sand mill, a vertical sand mill, a spike mill, a pin mill, a tower mill, a pearl mill (for example, "DCP mill" manufactured by Eirich Co., Ltd.), a homogenizer, or an ultrasonic wave dispersing machine, but are not particularly limited to these devices.

Next, the underlayer forming coating material is applied to one main surface of the base layer 11 and dried to form the underlayer 12. Subsequently, by applying the magnetic layer forming coating material onto the underlayer 12 and drying the magnetic layer forming coating material, the magnetic layer 13 is formed on the underlayer 12. Note that during drying, magnetic powder is subjected to magnetic field orientation in a thickness direction of the base layer 11 by, for example, a solenoid coil. Furthermore, during drying, the magnetic powder may be subjected to magnetic field orientation in a longitudinal direction (traveling direction) of the base layer 11 by, for example, a solenoid coil, and then may be subjected to magnetic field orientation in a thickness direction of the base layer 11. By such a magnetic field orientation treatment, the perpendicular orientation degree (that is, squareness ratio S1) of the magnetic powder can be improved. After the magnetic layer 13 is formed, by applying the back layer forming coating material to the other main surface of the base layer 11 and drying the back layer forming coating material, the back layer 14 is formed. As a result, the magnetic recording medium 10 is obtained.

The squareness ratios S1 and S2 can be set to desired values, for example, by adjusting the intensity of a magnetic field applied to a coating film of the magnetic layer forming coating material, adjusting the concentration of a solid content in the magnetic layer forming coating material, or adjusting drying conditions (for example, drying temperature and drying time) of a coating film of the magnetic layer forming coating material. The intensity of a magnetic field applied to the coating film is preferably 2 to 3 times the coercive force of the magnetic powder. In order to further increase the squareness ratio S1 (that is, to further reduce the squareness ratio S2), it is preferable to improve the dispersion state of the magnetic powder in the magnetic layer forming coating material. Furthermore, in order to further increase the squareness ratio S1, it is also effective to magnetize the magnetic powder before the magnetic layer forming coating material is put into an orientation device for magnetic field orientation of the magnetic powder. Note that the above methods for adjusting the squareness ratios S1 and S2 may be used singly or in combination of two or more thereof.

Thereafter, the obtained magnetic recording medium 10 is calendered to smooth the surface of the magnetic layer 13. Next, the magnetic recording medium 10 that has been calendered is wound into a roll shape. Thereafter, the magnetic recording medium 10 is heated in this state, and the large number of protrusions 14A on the surface of the back layer 14 are thereby transferred onto the surface of the magnetic layer 13. As a result, pores (a large number of holes 13A) are formed on the surface of the magnetic layer 13.

The temperature of the heat treatment is preferably 55° C. or higher and 75° C. or lower. By adopting a temperature within this numerical range as the temperature of the heat treatment, the shape of the protrusion is transferred onto the magnetic layer 13 satisfactorily. In a case where the temperature of the heat treatment is too low (for example, less than 55° C.), the shape of the protrusion is not be sufficiently transferred in some cases. In a case where the temperature of the heat treatment is too high (for example, higher than 75° C.), the amount of pores may be excessively increased, and the lubricant on the surface of the magnetic layer 13 may be excessive. Here, the temperature of the heat treatment is the temperature of an atmosphere holding the magnetic recording medium 10.

The time for the heat treatment is preferably 15 hours or more and 40 hours or less. By setting the time for the heat treatment within this numerical range, the shape of the protrusion is transferred onto the magnetic layer 13 satisfactorily. In a case where the time for the heat treatment is too short (for example, less than 15 hours), the shape of the protrusion is not be sufficiently transferred in some cases. In order to suppress a decrease in productivity, the time for the heat treatment is desirably set to 40 hours or less, for example.

Finally, the magnetic recording medium 10 is cut into a predetermined width (for example, a width of ½ inches). The target magnetic recording medium 10 is thereby obtained. A servo pattern is recorded on the magnetic recording medium 10. A servo pattern may be recorded, for example, by a servo writer known in the present technical field.

In the above manufacturing method, the large number of protrusions 14A formed on the surface of the back layer 14 are transferred onto the surface of the magnetic layer 13, and pores are thereby formed on the surface of the magnetic layer 13. However, the method for forming the pores is not limited thereto. For example, pores may be formed on the surface of the magnetic layer 13 by adjusting the type of a solvent included in the magnetic layer forming coating material and/or adjusting drying conditions of the magnetic layer forming coating material. Furthermore, for example, in the process of drying the solvent of the magnetic layer forming coating material, pores can be formed by an uneven distribution of the solid and the solvent included in the magnetic layer forming coating material. Furthermore, in the process of applying the magnetic layer forming coating material, the solvent included in the magnetic layer forming coating material can also be absorbed by the underlayer 12 through the pores of the underlayer 12 formed when the lower layer is applied and dried. In the drying step after the application, the solvent moves from the underlayer 12 through the magnetic layer 13, and pores connecting the magnetic layer 13 to the underlayer 12 can be thereby formed.

(5) Recording/Reproducing Device

[Configuration of Recording/Reproducing Device]

Next, an example of the configuration of the recording/reproducing device 30 for performing recording and reproduction for the magnetic recording medium 10 having the configuration described above will be described with reference to FIG. 8.

The recording/reproducing device 30 can adjust a tension applied to the magnetic recording medium 10 in a longitudinal direction thereof. Furthermore, the recording/reproducing device 30 can load the magnetic recording medium cartridge 10A thereon. Here, a case where the recording/reproducing device 30 can load one magnetic recording medium cartridge 10A thereon will be described in order to facilitate the description. However, the recording/reproducing device 30 can load a plurality of the magnetic recording medium cartridges 10A thereon.

The recording/reproducing device 30 is connected to information processing devices such as a server 41 and a personal computer (hereinafter referred to as "PC") 42 through a network 43, and data supplied from these information processing devices can be recorded in the magnetic recording medium cartridge 10A. The shortest recording wavelength of the recording/reproducing device 30 is preferably 100 nm or less, more preferably 75 nm or less, still more preferably 60 nm or less, and particularly preferably 50 nm or less.

Figure 8:
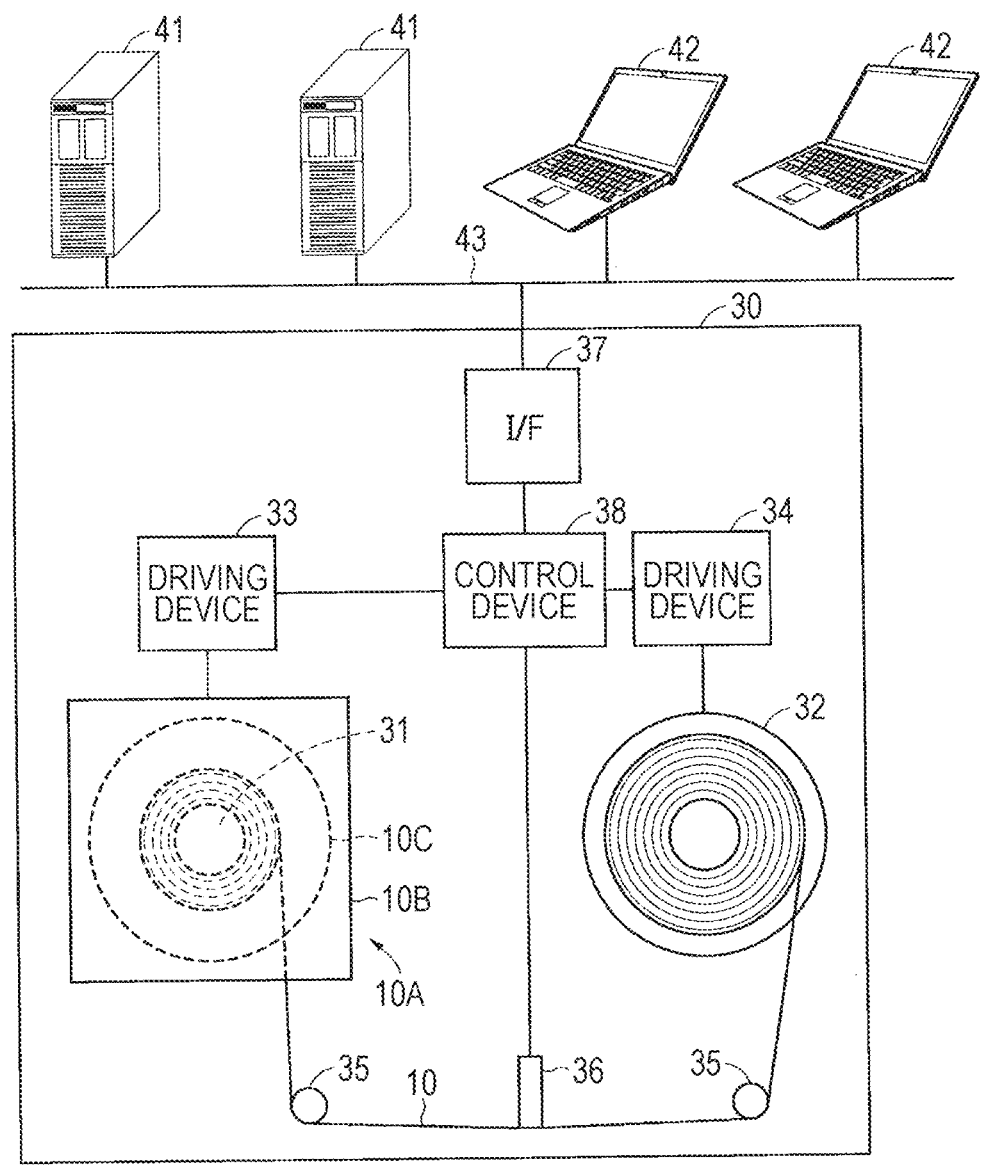
FIG. 8 is a schematic diagram illustrating a configuration of a recording/reproducing device.

As illustrated in FIG. 8, the recording/reproducing device 30 includes a spindle 31, a reel 32 on the recording/reproducing device side, a spindle driving device 33, a reel driving device 34, a plurality of guide rollers 35, a head unit 36, a communication interface (hereinafter, I/F) 37, and a control device 38.

The spindle 31 can mount the magnetic recording medium cartridge 10A thereon. The magnetic recording medium cartridge 10A conforms to the linear tape open (LTO) standard, and rotatably houses a single reel 10C around which the magnetic recording medium 10 is wound in a cartridge case 10B. A V-shaped servo pattern is recorded in advance as a servo signal on the magnetic recording medium 10. The reel 32 can fix a tip of the magnetic recording medium 10 pulled out from the magnetic recording medium cartridge 10A.

The spindle driving device 33 is a device that rotationally drives the spindle 31. The reel driving device 34 is a device that rotationally drives the reel 32. When data is recorded or reproduced on the magnetic recording medium 10, the spindle driving device 33 and the reel driving device 34 rotationally drive the spindle 31 and the reel 32 to cause the magnetic recording medium 10 to travel. The guide roller 35 is a roller for guiding travel of the magnetic recording medium 10.

The head unit 36 includes a plurality of recording heads for recording a data signal on the magnetic recording medium 10, a plurality of reproducing heads for reproducing a data signal recorded on the magnetic recording medium 10, and a plurality of servo heads for reproducing a servo signal recorded on the magnetic recording medium 10. For example, a ring type head can be used as the recording head, but the type of the recording head is not limited thereto.

The communication I/F 37 is for communicating with an information processing device such as the server 41 or the PC 42, and is connected to the network 43.

The control device 38 controls the entire recording/reproducing device 30. For example, the control device 38 causes the head unit 36 to record a data signal supplied from an information processing device such as the server 41 or the PC 42 on the magnetic recording medium 10 in response to a request from the information processing device. Furthermore, the control device 38 causes the head unit 36 to reproduce a data signal recorded on the magnetic recording medium 10 in response to a request from an information processing device such as the server 41 or the PC 42 and supplies the data signal to the information processing device.

The control device 38 controls the entire recording/reproducing device 30. For example, the control device 38 causes the head unit 36 to record a data signal supplied from an information processing device such as the server 41 or the PC 42 on the magnetic recording medium 10 in response to a request from the information processing device. Furthermore, the control device 38 causes the head unit 36 to reproduce a data signal recorded on the magnetic recording medium 10 in response to a request from an information processing device such as the server 41 or the PC 42 and supplies the data signal to the information processing device.

Furthermore, the control device 38 controls a rotational drive torque of at least one of the reel driving device 34 or the spindle driving device 33 on the basis of information stored in a cartridge memory 211 included in the cartridge 10A including the magnetic recording medium 10, described later, and thereby can adjust a tension applied to the magnetic recording medium 10 in a longitudinal direction thereof

[Operation of Recording/Reproducing Device]

Next, operation of the recording/reproducing device 30 having the configuration described above will be described.

First, the magnetic recording medium cartridge 10A is mounted on the recording/reproducing device 30. A tip of the magnetic recording medium 10 is pulled out, transferred to the reel 32 via the plurality of guide rollers 35 and the head unit 36, and attached to the reel 32.

Next, when an operation unit (not illustrated) is operated, the spindle driving device 33 and the reel driving device 34 are driven by control of the control device 38. As a result, the spindle 31 and the reel 32 are rotated in the same direction such that the magnetic recording medium 10 is wound around the reel 32 and the magnetic recording medium 10 travels from the reel 10C toward the reel 32 in the head unit 36. Therefore, information is recorded on the magnetic recording medium 10, or information recorded on the magnetic recording medium 10 is reproduced.

Furthermore, in a case where the magnetic recording medium 10 is rewound onto the reel 10C, the spindle 31 and the reel 32 are rotationally driven in the opposite direction to the direction described above, and the magnetic recording medium 10 thereby travels from the reel 32 to the reel 10C. Also during the rewinding, the head unit 36 records information on the magnetic recording medium 10 or reproduces information recorded on the magnetic recording medium 10.

(6) Cartridge

[Configuration of Cartridge]

The present technology also provides a magnetic recording cartridge (also referred to as a tape cartridge) including the magnetic recording medium according to the present technology. In the magnetic recording cartridge, the magnetic recording medium may be wound around a reel, for example. For example, the magnetic recording cartridge may include: a communication unit that communicates with a recording/reproducing device; a storage unit; and a control unit that stores information received from the recording/reproducing device through the communication unit in the storage unit, reads the information from the storage unit according to a request from the recording/reproducing device, and transmits the information to the recording/reproducing device through the communication unit. The information can include adjustment information for adjusting a tension applied to the magnetic recording medium in a longitudinal direction thereof. The adjustment information can include, for example, dimensional information in the width direction at a plurality of positions in the longitudinal direction of the magnetic recording medium. The dimensional information in the width direction may be dimensional information at the time of manufacturing a magnetic recording medium (initial stage after manufacture) described below in [Configuration of cartridge memory] and/or dimensional information acquired in the dimensional information acquiring step described in "(7) Data processing method" below.

An example of the configuration of the cartridge 10A including the magnetic recording medium 10 having the above-described configuration will be described with reference to FIG. 12.

Figure 12:
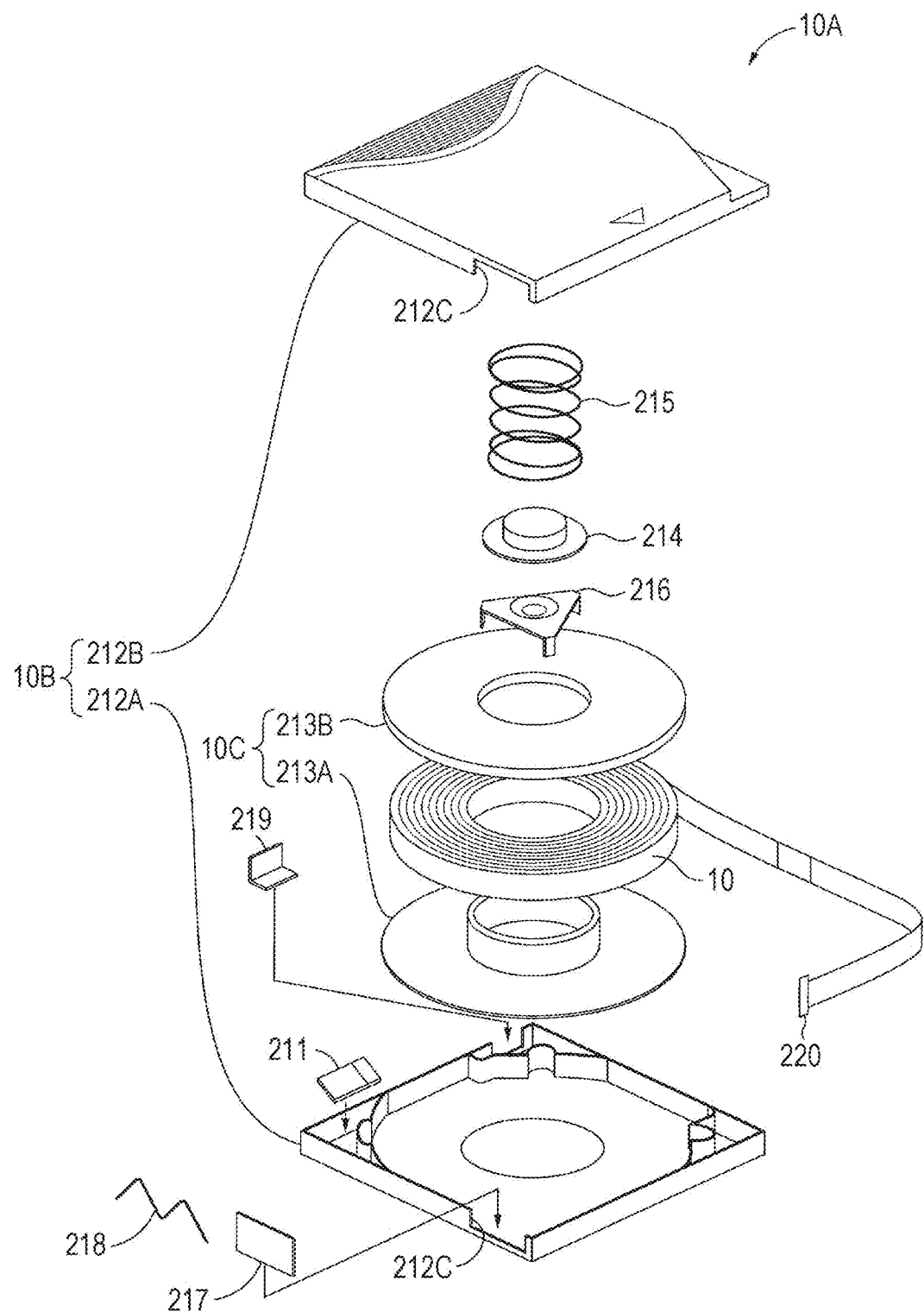
FIG. 12 is an exploded perspective view illustrating an example of a configuration of a cartridge.

FIG. 12 is an exploded perspective view illustrating an example of a configuration of the cartridge 10A. The cartridge 10A is a magnetic recording medium cartridge conforming to the linear tape-open (LTO) standard, and includes: in the cartridge case 10B including a lower shell 212A and an upper shell 212B, a reel 10C around which a magnetic tape (tape-shaped magnetic recording medium) 10 is wound; a reel lock 214 and a reel spring 215 for locking rotation of the reel 10C; a spider 216 for releasing a locked state of the reel 10C; a slide door 217 that opens and closes a tape outlet 212C formed in the cartridge case 10B so as to straddle the lower shell 212A and the upper shell 212B; a door spring 218 that urges the slide door 217 to a closed position of the tape outlet 212C; a write protect 219 for preventing erroneous erasure; and a cartridge memory 211. The reel 10C has a substantially disk shape with an opening at the center, and incudes a reel hub 213A and a flange 213B including a hard material such as plastic. A leader pin 220 is disposed at one end of the magnetic tape 10.

The cartridge memory 211 is disposed near one corner of the cartridge 10A. The cartridge memory 211 faces a reader/ writer (not illustrated) of the recording/reproducing device 30 in a state where the cartridge 10A is loaded on the recording/reproducing device 30. The cartridge memory 211 communicates with the recording/reproducing device 30, specifically, with a reader/writer (not illustrated) according to a wireless communication standard conforming to the LTO standard.

[Configuration of Cartridge Memory]

An example of the configuration of the cartridge memory 211 will be described with reference to FIG. 13.

Figure 13:
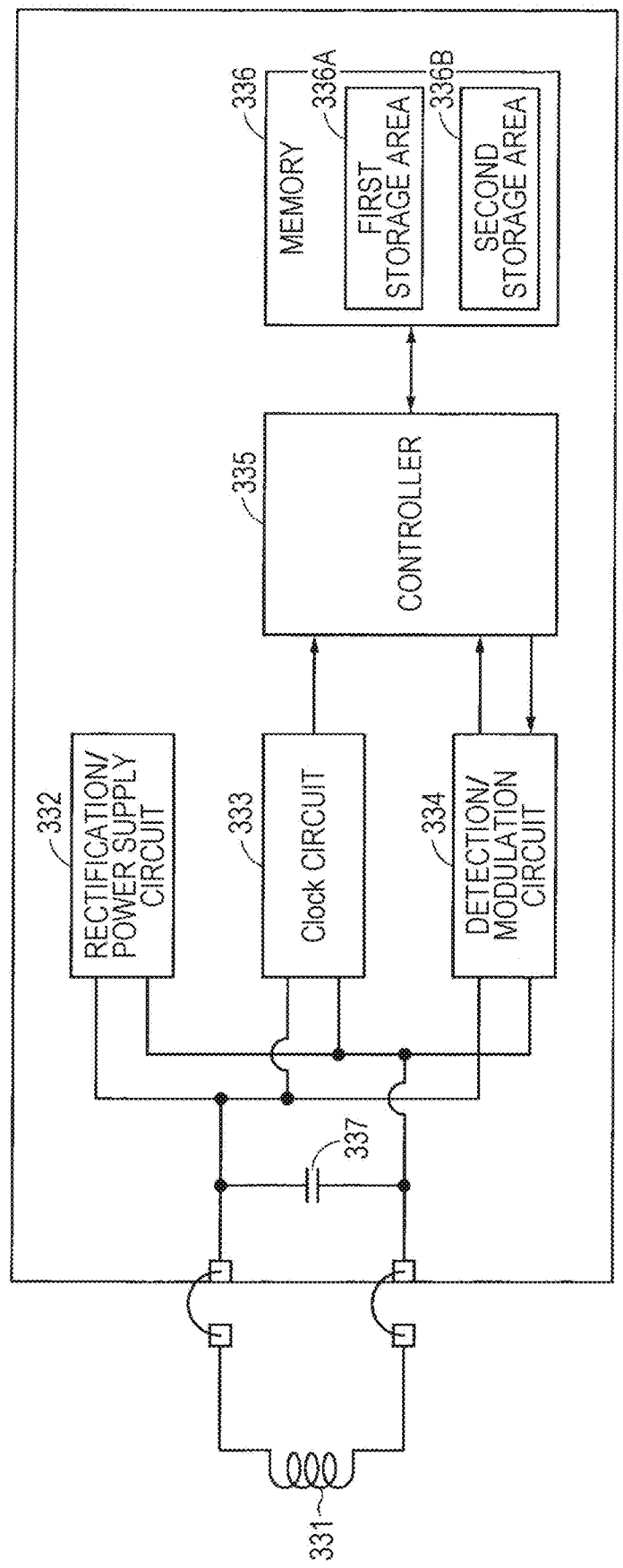
FIG. 13 is a block diagram illustrating an example of a configuration of a cartridge memory.

FIG. 13 is a block diagram illustrating an example of a configuration of the cartridge memory 211. The cartridge memory 211 includes: an antenna coil (communication unit) 331 that communicates with a reader/writer (not illustrated) according to a prescribed communication standard; a rectification/power supply circuit 332 that generates power using an induced electromotive force from a radio wave received by an antenna coil 331 and performs rectification to generate a power supply; a clock circuit 333 that generates a clock using an induced electromotive force similarly from the radio wave received by the antenna coil 331; a detection/modulation circuit 334 that performs detection of the radio wave received by the antenna coil 331 and modulation of a signal transmitted by the antenna coil 331; a controller (control unit) 335 including a logic circuit and the like for determining a command and data from a digital signal extracted from the detection/modulation circuit 334 and processing the command and data; and a memory (storage unit) 336 that stores information. Furthermore, the cartridge memory 211 includes a capacitor 337 connected in parallel to the antenna coil 331, and the antenna coil 331 and the capacitor 337 constitute a resonant circuit.

The memory 336 stores information and the like related to the cartridge 10A. The memory 336 is a non-volatile memory (NVM). The memory 336 preferably has a storage capacity of about 32 KB or more. For example, in a case where the cartridge 10A conforms to the LTO-9 standard or the LTO-10 standard, the memory 336 has a storage capacity of about 32 KB.

The memory 336 has a first storage area 336A and a second storage area 336B. The first storage area 336A corresponds to a storage area of a cartridge memory conforming to an LTO standard prior to LTO 8 (hereinafter referred to as "conventional cartridge memory") and is an area for storing information conforming to an LTO standard prior to LTO 8. The information conforming to an LTO standard prior to LTO 8 is, for example, manufacturing information (for example, a unique number of the cartridge 10) or a usage history (for example, the number of times of tape withdrawal (thread count)).

The second storage area 336B corresponds to an extended storage area for a storage area of the conventional cartridge memory. The second storage area 336B is an area for storing additional information. Here, the additional information means information related to the cartridge 10A, not prescribed by an LTO standard prior to LTO 8. Examples of the additional information include tension adjustment information, management ledger data, Index information, and thumbnail information of a moving image stored in the magnetic tape 10, but are not limited to the data. The tension adjustment information includes, as initial information, dimensional information in the width direction at the time of manufacturing the magnetic recording medium 10 (initial stage after manufacture). Note that the dimensional information in the width direction at the time of manufacturing the magnetic recording medium 10 is a constant value (specified value) at an arbitrary position in the longitudinal direction.

The memory 336 may have a plurality of banks. In this case, some of the plurality of banks may constitute the first storage area 336A, and the remaining banks may constitute the second storage area 336B. Specifically, for example, in a case where the cartridge 10A conforms to the LTO-9 standard or the LTO-10 standard, the memory 336 may have two banks each having a storage capacity of about 16 KB. One of the two banks may constitute the first storage area 336A, and the other bank may constitute the second storage area 336B.

The antenna coil 331 induces an induced voltage by electromagnetic induction. The controller 335 communicates with the recording/reproducing device 30 according to a prescribed communication standard through the antenna coil 331. Specifically, for example, mutual authentication, transmission and reception of commands, and exchange of data are performed.

The controller 335 stores information received from the recording/reproducing device 30 through the antenna coil 331 in the memory 336. The controller 335 reads out information from the memory 336 in response to a request from the recording/reproducing device 30, and transmits the information to the recording/reproducing device 30 through the antenna coil 331.

(7) Data Processing Method

The present technology also provides a data processing method using the magnetic recording medium according to the present technology. The data processing method may be, for example, a recording method for recording data on the magnetic recording medium according to the present technology, a reproduction method for reproducing data recorded on the magnetic recording medium according to the present technology, or a method for recording data on the magnetic recording medium according to the present technology and reproducing data recorded on the magnetic recording medium.

The data processing method includes: a dimensional information acquiring step of acquiring dimensional information in a width direction at a plurality of positions in a longitudinal direction of the tape-shaped magnetic recording medium according to the present technology while the magnetic recording medium is caused to travel with a tension applied in a longitudinal direction thereof; and a data processing step of recording data on the magnetic recording medium while the magnetic recording medium is caused to travel with a tension applied in a longitudinal direction thereof and/or reproducing the data recorded on the magnetic recording medium. In the data processing step, a tension applied to the magnetic recording medium in a longitudinal direction thereof is adjusted on the basis of the dimensional information.

The data processing method according to the present technology records and/or reproduces data while adjusting a tension as described above. The magnetic recording medium according to the present technology used in the method is suitable for use in a data processing method for performing recording and reproduction while adjusting the width of the magnetic recording medium by adjusting a tension of the magnetic recording medium in a longitudinal direction thereof. Therefore, the advantage of the magnetic recording medium according to the present technology is effectively exhibited by the data processing method according to the present technology.

According to a preferred embodiment of the present technology, in the data processing step, a tension applied to the magnetic recording medium in a longitudinal direction thereof may be adjusted on the basis of the dimensional information and initial dimensional information acquired in advance before the dimensional information acquiring step is performed.

The initial dimensional information may be, for example, dimensional information of the magnetic recording medium in a width direction thereof at any time before the dimension acquiring step is performed. For example, it is assumed that a magnetic recording cartridge including the magnetic recording medium is sold, and then the data processing method according to the present technology is performed using the magnetic recording medium included in the magnetic recording cartridge. In this case, the initial dimensional information may be acquired at any time before the magnetic recording cartridge is sold, or may be acquired at any time from the time when the magnetic recording cartridge is sold to the time when the data processing method according to the present technology is performed. In the former case, the initial dimensional information can correspond to, for example, dimensional information in the width direction at the time of manufacturing the magnetic recording medium 10 (initial stage after manufacture), described in the above "(6) Cartridge". In the latter case, the initial dimensional information may be acquired when data is recorded on the magnetic recording cartridge for the first time, for example. More specifically, the initial dimensional information may be acquired in a case where the magnetic recording cartridge is inserted into a drive in order to perform data recording on the magnetic recording cartridge for the first time.

Preferably, the initial dimensional information is dimensional information of the magnetic recording medium in a width direction thereof, acquired at the plurality of positions in the longitudinal direction from which the dimensional information has been acquired in the dimensional information acquiring step. That is, the position in the longitudinal direction from which the dimensional information has been acquired is preferably the same as the position in the longitudinal direction from which the initial dimensional information has been acquired. As a result, it is possible to more easily calculate a tension to be applied to the magnetic recording medium in a longitudinal direction thereof in the data processing step.

The acquisition of the initial dimensional information may be performed by the same method as the acquisition of the dimensional information in the dimensional information acquiring step or may be performed by a different method therefrom, but is preferably performed by the same method.

According to one preferred embodiment of the present technology, in the data processing step, a tension applied to the magnetic recording medium in a longitudinal direction thereof can be adjusted such that the dimensional information corresponds to the initial dimensional information. For example, the tension may be adjusted such that the dimensions at each of the plurality of positions recorded as the dimensional information approach the dimensions at each of the plurality of positions recorded as the initial dimensional information. More preferably, the tension may be adjusted such that the dimensions at each of the plurality of positions recorded as the initial dimensional information match the dimensions at each of the plurality of positions recorded as the dimensional information.

According to one preferred embodiment of the present technology, the data processing method may further include an information acquiring step of acquiring at least one of environmental information around the magnetic recording medium or traveling condition information. In the data processing step, the tension applied to the magnetic recording medium in the longitudinal direction can be adjusted on the basis of the dimensional information and at least one of the environmental information or the traveling condition information. In the adjustment of the tension, in consideration of at least one of the environmental information or the traveling condition information in addition to the dimensional information, a more appropriate tension can be applied to the magnetic recording medium.

The environmental information preferably includes one or both of temperature information and humidity information around the magnetic recording medium. The traveling condition information preferably includes tension information when the magnetic recording medium is wound. The temperature information and the humidity information can affect the dimensions of the magnetic recording medium, and the tension information when the magnetic recording medium is wound can affect width controllability of the magnetic recording medium. Therefore, use of the information makes it possible to apply a more appropriate tension to the magnetic recording medium.

Figure 14:
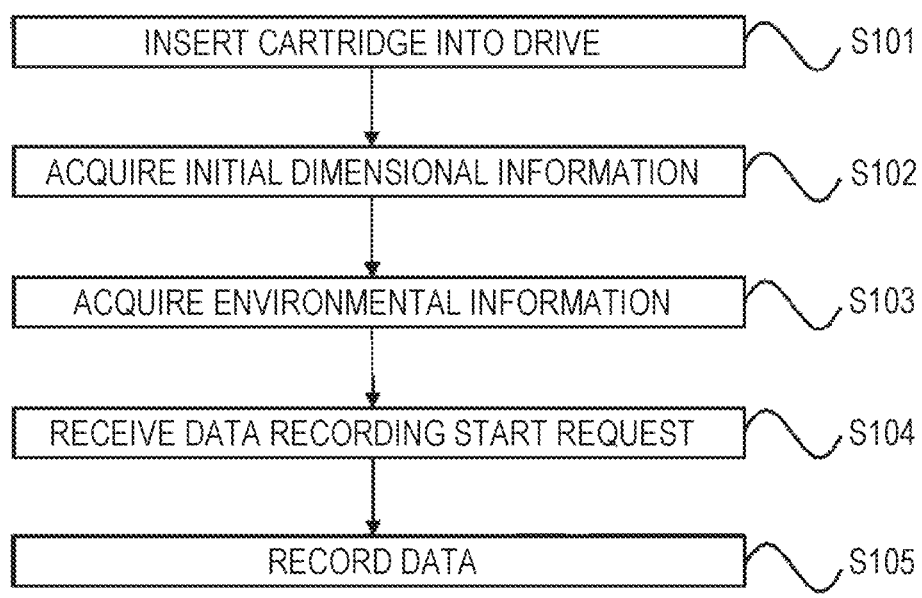
FIG. 14 is a flowchart for explaining an example of a recording/reproducing method.

An example of a procedure performed for recording data on a magnetic recording medium using the method according to the present technology will be described with reference to the flowchart of FIG. 14. In this example, it is assumed that data is recorded on the magnetic recording medium 10 using the recording/reproducing device 30 illustrated in FIG. 8. Furthermore, it is assumed that the recording/reproducing device 30 or the cartridge 10A includes a thermometer/hygrometer (not illustrated), and temperature information and/or humidity information around the magnetic recording medium 10 (for example, an environment in which the recording/reproducing device 30 is placed) is sent to the control device 38 from the thermometer/hygrometer.

In step S101, the cartridge 10A (tape cartridge) including the magnetic recording medium 10 (magnetic tape) is set in the recording/reproducing device 30 (drive). In response to the cartridge 10A being set, the control device 38 determines whether or not initial dimensional information is stored in the cartridge memory 211 (particularly memory 336) of the cartridge 10A. In response to the initial dimensional information not being stored, the control device 38 causes the process to proceed to step S102. In a case where the initial dimensional information is stored, step S104 may be performed without performing steps S102 and 103.

In step S102, the control device 38 drives the reel driving device 34 and the spindle driving device 33, and the spindle 31 and the reel 32 are rotated in the same direction such that the magnetic recording medium 10 travels from the reel 10C toward the reel 32. As a result, the magnetic recording medium 10 travels from the reel 10C toward the reel 32. After the travel is completed, the control device 38 drives the reel driving device 34 and the spindle driving device 33, and the spindle 31 and the reel 32 are rotated in the same direction such that the magnetic recording medium 10 travels from the reel 32 toward the reel 10C. As a result, the magnetic recording medium 10 travels from the reel 32 toward the reel 10C. In the course of traveling in this way, the control device 38 acquires dimensional information of the magnetic recording medium 10 in a width direction thereof at each of a plurality of positions of the magnetic recording medium 10 in a longitudinal direction thereof. In order to acquire the dimensional information, for example, a servo signal acquired by the head unit 36 may be used. For example, by using a servo signal recorded in advance on the magnetic recording medium 10, dimensional information in the width direction (for example, servo bandwidth) can be acquired. The control device 38 stores the acquired dimensional information in the cartridge memory 211 (particularly the memory 336). The dimensional information is recorded in the cartridge memory 211 in association with the position where the dimensional information has been acquired.

In step S102, a tension applied to the magnetic recording medium 10 may be constant, for example, 0.1 N to 2 N, particularly 0.2 N to 1 N, more particularly 0.3 N to 0.8 N, and still more particularly 0.4 N to 0.6 N.

In step S102, the plurality of positions from which the dimensional information in the width direction is acquired may be, for example, division positions when the total length of the magnetic recording medium 10, is equally divided into, for example, 10 to 500, particularly 20 to 200, more particularly 50 to 150, still more particularly 80 to 120.

In step S103, the control device 38 can acquire environmental information. For example, the control device 38 acquires temperature information and/or humidity information from the thermometer/hygrometer, and stores the acquired temperature information and/or humidity information in the cartridge memory 211. Furthermore, in step S103, the control device 38 may acquire traveling condition information in addition to the environmental information or instead of the environmental information. The traveling condition information can be, for example, the tension applied in step S102. Step S103 does not need to be performed, but step S103 makes it possible to apply a more appropriate tension to the magnetic recording medium.

In step S104, the control device 38 receives a data recording start request. The data recording start request can be transmitted to the control device 38 by operation of the recording/reproducing device 30 by a user of the magnetic recording medium 10, for example. When receiving the data recording start request, the control device 38 advances the process to step S105.

In step S105, the control device 38 causes the head unit 36 to record a data signal supplied from an information processing device such as the server 41 or the PC 42 on the magnetic recording medium 10 in response to a request from the information processing device. For example, in the recording, the magnetic recording medium 10 is caused to travel from the reel 10C toward the reel 32.

As described above, in steps S101 to S105, initial width information is recorded in a cartridge memory for a magnetic recording cartridge in which the initial width information is not recorded in the cartridge memory, and then data is recorded in the magnetic recording medium.

The above step S105 is performed, and the magnetic recording medium 10 is stored for a short time or for a long time. Thereafter, data is recorded and/or reproduced. The recording and/or reproduction are/is performed according to the data processing method according to the present technology. That is, at least the dimensional information acquiring step and the data processing step are performed.

(8) Effect

The magnetic recording medium 10 according to the present technology includes: a magnetic layer; an underlayer; a base layer; and a back layer, in which the underlayer has a thickness of 0.5 μm or more and 0.9 μm or less, the magnetic recording medium has an average thickness $t_T$ of 5.6 μm or less, the magnetic recording medium includes a lubricant, the magnetic recording medium has pores, and the pores have an average diameter of 6 nm or more and 11 nm or less when the diameters of the pores are measured in a state where the lubricant has been removed from the magnetic recording medium and the magnetic recording medium has been dried, and the Young's modulus in a longitudinal direction is 7.90 GPa or less. As a result, the magnetic recording medium 10 has excellent traveling stability in spite of having a thin total thickness and a thin thickness of an underlayer, and is suitable for use in a recording/reproducing device for suppressing a dimensional change of the magnetic recording medium 10 in a width direction thereof by adjusting a tension applied to the magnetic recording medium 10 in a longitudinal direction thereof.

In the data processing method according to the present technology, data is recorded and/or reproduced while the tension is adjusted as described above, and the magnetic recording medium according to the present technology used in the method is suitable for use in a data processing method for performing recording and reproduction while adjusting the width of the magnetic recording medium by adjusting a tension of the magnetic recording medium in a longitudinal direction thereof. Therefore, the advantage of the magnetic recording medium according to the present technology is effectively exhibited by the data processing method according to the present technology.

(9) Modification

Modification 1

Figure 9:
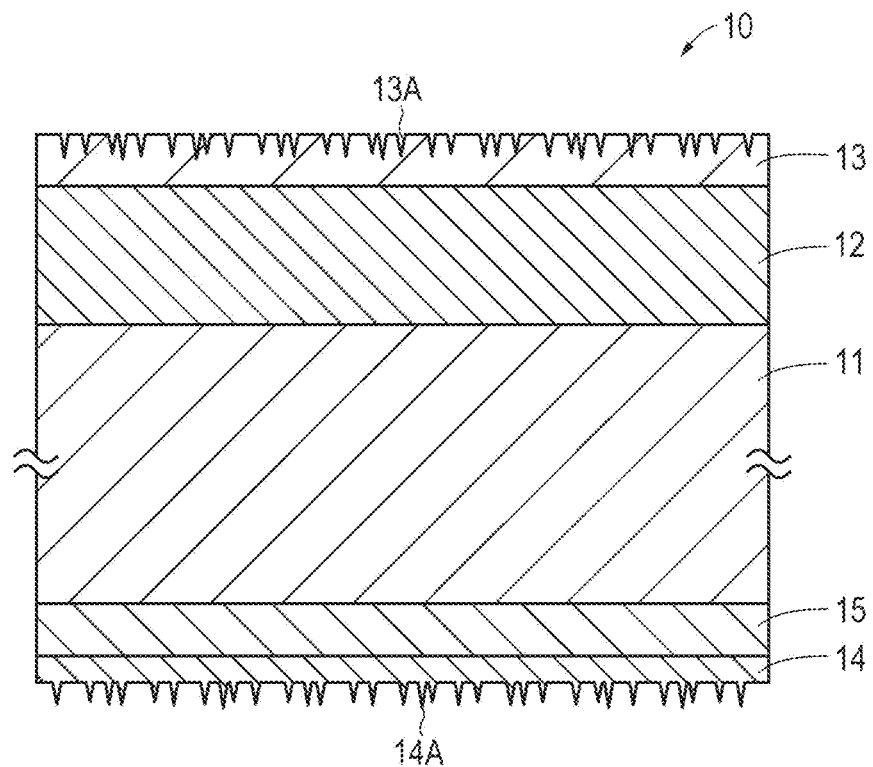
FIG. 9 is a schematic cross-sectional view of a magnetic recording medium in Modification.

The magnetic recording medium 10 may further include a barrier layer 15 disposed on at least one surface of the base layer 11, as illustrated in FIG. 9. The barrier layer 15 is a layer for suppressing a dimensional change of the base layer 11 according to an environment. Examples of a cause of the dimensional change include the hygroscopic property of the base layer 11. However, by disposing the barrier layer 15, a penetration rate of moisture into the base layer 11 can be reduced. The barrier layer 15 includes a metal or a metal oxide. As the metal, for example, at least one of Al, Cu, Co, Mg, S1, Ti, V, Cr, Mn, Fe, Ni, Zn, Ga, Ge, Y, Zr, Mo, Ru, Pd, Ag, Ba, Pt, Au, or Ta can be used. As the metal oxide, for example, at least one of $Al_2O_3$, CuO, CoO, $SiO_2$, $Cr_2O_3$, $TiO_2$, $Ta_2O_5$, or $ZrO_2$ can be used, and any one of oxides of the metals described above can also be used. Furthermore, diamond-like carbon (DLC), diamond, and the like can also be used.

The average thickness of the barrier layer 15 is preferably 20 nm or more and 1000 nm or less, and more preferably 50 nm or more and 1000 nm or less. The average thickness of the barrier layer 15 is determined in a similar manner to the average thickness $t_m$ of the magnetic layer 13. However, a magnification of a TEM image is appropriately adjusted according to the thickness of the barrier layer 15.

Modification 2

The magnetic recording medium 10 may be incorporated in a library device. That is, the present technology also provides a library device including at least one magnetic recording medium 10. The library device can adjust a tension applied to the magnetic recording medium 10 in a longitudinal direction thereof, and may include a plurality of the recording/reproducing devices 30 described above.

3. EXAMPLES

Hereinafter, the present technology will be described specifically with Examples, but the present technology is not limited only to these Examples.

In the following Examples and Comparative Examples, the average thickness $t_T$ of a magnetic tape, the surface roughness of a magnetic layer (arithmetic average roughness of a magnetic layer side surface) $R_a$, the squareness ratio S2, the average thickness $t_m$ of the magnetic layer, the average diameter of pores, SNR, the friction coefficient ratio ($\mu_B/\mu_A$), and the friction coefficient ratio ($\mu_{C(1000)}/\mu_{C(5)}$) are values determined by the measurement method described in "2. Embodiment of the present technology (example of application type magnetic recording medium)".

(1) Manufacture of Magnetic Tape

As described below, magnetic tapes of Examples 1 to 21 and Comparative Examples 1 to 7 were manufactured. Table 1 below illustrates the square ratios S2 and S1 of each of these magnetic tapes, the average diameter of pores, average thickness $t_m$ of a magnetic layer, the average thickness of an underlayer, the average thickness of a base layer, the average thickness of a back layer, the average thickness $t_T$ of each of the magnetic tapes, coating film thickness/base thickness, Young's modulus, surface roughness (magnetic surface roughness) $R_a$ of a magnetic layer, the type of magnetic powder, the shape thereof, the aspect ratio thereof, and the particle volume thereof.

Example 1

(Step of Preparing Magnetic Layer Forming Coating Material)

A magnetic layer forming coating material was prepared as follows. First, a first composition having the following formulation was kneaded with an extruder. Next, the kneaded first composition and a second composition having the following formulation were added to a stirring tank equipped with a disper, and were premixed. Subsequently, the mixture was further subjected to sand mill mixing, and was subjected to a filter treatment to prepare a magnetic layer forming coating material.

(First Composition)

Powder of barium ferrite ($BaFe_{12}O_{19}$) particles (hexagonal plate shape, average particle volume 1950 nm$^3$): 100 parts by mass Cyclohexanone solution of vinyl chloride-based resin: 65 parts by mass (The composition of the solution is 30% by mass of the resin and 70% by mass of cyclohexanone. Details of the vinyl chloride-based resin were as follows: (Degree of polymerization: 300, Mn=10000, $OSO_3K$=0.07 mmol/g and secondary OH=0.3 mmol/g were contained as polar groups.)

Aluminum oxide powder: 5 parts by mass ($\alpha$-Al2O3, average particle diameter: 0.2 μm)

Carbon black: 2 parts by mass (Manufactured by Tokai Carbon Co., Ltd., trade name: Seast TA)

(Second Composition)

Cyclohexanone solution of vinyl chloride-based resin: 3 parts by mass (The composition of the solution is 30% by mass of the resin and 70% by mass of cyclohexanone.

n-Butyl stearate: 2 parts by mass

Methyl ethyl ketone: 121.3 parts by mass

Toluene: 121.3 parts by mass

Cyclohexanone: 60.7 parts by mass

Finally, 4 parts by mass of polyisocyanate (trade name: Coronate L, manufactured by Tosoh Corporation) as a curing agent and 2 parts by mass of stearic acid as a lubricant were added to the magnetic layer forming coating material prepared as described above.

(Step of Preparing Underlayer Forming Coating Material)

An underlayer forming coating material was prepared as follows. First, a third composition having the following formulation was kneaded with an extruder. Next, the kneaded third composition and a fourth composition having the following formulation were added to a stirring tank equipped with a disper, and were premixed. Subsequently, the mixture was further subjected to sand mill mixing, and was subjected to a filter treatment to prepare an underlayer forming coating material.

(Third composition)

Acicular Iron Oxide Powder: 100 Parts by Mass ($\alpha$-$Fe_2O_3$, average long axis length 0.15 μm)

Cyclohexanone solution of vinyl chloride-based resin: 55.6 parts by mass (The composition of the solution is 30% by mass of the resin and 70% by mass of cyclohexanone.

Carbon black: 10 parts by mass (Average particle diameter 20 nm)

(Fourth Composition)

Polyurethane-based resin UR8200 (manufactured by Toyobo Co., Ltd.): 20.0 parts by mass n-Butyl stearate: 2 parts by mass Methyl ethyl ketone: 108.2 parts by mass Toluene: 108.2 parts by mass Cyclohexanone: 18.5 parts by mass Finally, 4 parts by mass of polyisocyanate (trade name: Coronate L, manufactured by Tosoh Corporation) as a curing agent and 2 parts by mass of stearic acid as a lubricant were added to the underlayer forming coating material prepared as described above.

(Step of preparing back layer forming coating material)

A back layer forming coating material was prepared as follows. The following raw materials were mixed in a stirring tank equipped with a disper, and were subjected to filter treatment to prepare a back layer forming coating material. Carbon black powder having a small particle diameter (average particle diameter (D50) 20 nm): 90 parts by mass Carbon black powder having a large particle diameter (average particle diameter (D50) 270 nm): 10 parts by mass Polyester polyurethane: 100 parts by mass (trade name: N-2304, manufactured by Tosoh Corporation)

Methyl ethyl ketone: 500 parts by mass

Toluene: 400 parts by mass

Cyclohexanone: 100 parts by mass (Application Step)

Using the magnetic layer forming coating material and the underlayer forming coating material prepared as described above, an underlayer and a magnetic layer were formed on one main surface of a long poleethylene naphthalate film (hereinafter referred to as "PEN film") having an average thickness of 4.00 μm as a nonmagnetic support (base layer) such that the average thickness of the underlayer was 0.60 μm and the average thickness of the magnetic layer was 0.08 μm after drying and calendering as follows. First, the underlayer forming coating material was applied onto one main surface of the PEN film and dried to form an underlayer. Next, the magnetic layer forming coating material was applied on the underlayer and dried to form a magnetic layer. Note that the magnetic powder was subjected to magnetic field orientation in a thickness direction of the film by a solenoid coil when the magnetic layer forming coating material was dried. Furthermore, drying conditions (drying temperature and drying time) of the magnetic layer forming coating material were adjusted, and the squareness ratio S1 of the magnetic tape in the thickness direction (perpendicular direction) and the squareness ratio S2 thereof in the longitudinal direction were set to the values illustrated in Table 1. Subsequently, the back layer forming coating material was applied onto the other main surface of the PEN film and dried to form a back layer having an average thickness of 0.30 μm. As a result, a magnetic tape was obtained. The magnetic tape had a magnetic surface roughness $R_a$ (arithmetic average roughness) of 1.80 μm.

(Calendering Step and Transfer Step)

Subsequently, a calendering treatment was performed under predetermined temperature condition and pressure condition to smooth the surface of the magnetic layer. Next, the magnetic tape thus obtained was wound into a roll shape, and then the magnetic tape was heated at 60° C. for 10 hours in this state. Then, the magnetic tape was rewound in a roll shape such that an end located on an inner circumferential side was located on an outer circumferential side oppositely, and then the magnetic tape was heated again at 60° C. for 10 hours in this state. As a result, a large number of protrusions on the surface of the back layer were transferred onto the surface of the magnetic layer to form a large number of holes on the surface of the magnetic layer.

(Cutting Step)

The magnetic tape obtained as described above was cut into a width of ½ inches (12.65 mm). As a result, the target long magnetic tape (average thickness 5.0 μm) was obtained.

Example 2

A magnetic tape was manufactured by the same method as in Example 1 except that the application time of the magnetic field to the magnetic layer forming coating material was adjusted to set the squareness ratio S1 of the magnetic tape in the longitudinal direction to 30% and to set the squareness ratio S2 thereof in the thickness direction (perpendicular direction) to 66%, and the thickness of the underlayer was changed to set the average thickness $t_T$ of the magnetic recording medium to 5.2 μm.

Example 3

A magnetic tape was manufactured by the same method as in Example 1 except that the application time of the magnetic field to the magnetic layer forming coating material was adjusted to set the squareness ratio S1 of the magnetic tape in the longitudinal direction to 27% and to set the squareness ratio S2 thereof in the thickness direction (perpendicular direction) to 71%

Example 4

A magnetic tape was manufactured by the same method as in Example 1 except that the application time of the magnetic field to the magnetic layer forming coating material was adjusted to set the squareness ratio S1 of the magnetic tape in the longitudinal direction to 29% and to set the squareness ratio S2 thereof in the thickness direction (perpendicular direction) to 70%, and the thicknesses of the underlayer and the back layer were changed to set the average thickness $t_T$ of the magnetic recording medium to 5.5 km.

Example 5

A magnetic tape was manufactured by the same method as in Example 1 except that the application time of the magnetic field to the magnetic layer forming coating material was adjusted to set the squareness ratio S1 of the magnetic tape in the longitudinal direction to 30% and to set the squareness ratio S2 thereof in the thickness direction (perpendicular direction) to 66%, the heating temperature in the heat treatment after the calendering treatment was lowered to change the average diameter of pores to 6 nm, and the drying temperature in the above coating film drying step was lowered to change the arithmetic average roughness $R_a$ of the magnetic layer side surface to 1.70 μm.

Example 6

A magnetic tape was manufactured by the same method as in Example 1 except that the application time of the magnetic field to the magnetic layer forming coating material was adjusted to set the squareness ratio S1 of the magnetic tape in the longitudinal direction to 30% and to set the squareness ratio S2 thereof in the thickness direction (perpendicular direction) to 66%, and the thickness of the underlayer was changed to set the average thickness $t_T$ of the magnetic recording medium to 5.3 μm.

Example 7

A magnetic tape was manufactured by the same method as in Example 6 except that the thicknesses of the underlayer and the base layer were changed to set the average thickness $t_T$ of the magnetic recording medium to 4.7 μm.

Example 8

A magnetic tape was manufactured by the same method as in Example 6 except that the magnetic powder contained in the magnetic layer was changed from powder of barium ferrite particles to powder of ε iron oxide particles, and the thickness of the underlayer was changed to set the average thickness $t_T$ to 5.0 μm.

Example 9

A magnetic tape was manufactured by the same method as in Example 6 except that the magnetic powder contained in the magnetic layer was changed from powder of barium ferrite particles to powder of Co iron oxide particles, and the thickness of the underlayer was changed to set the average thickness $t_T$ to 5.0 μm.

Example 10

A magnetic tape was manufactured by the same method as in Example 6 except that the thicknesses of the base layer and the back layer were changed to set the average thickness $t_T$ of the magnetic recording medium to 5.6 μm.

Example 11

A magnetic tape was manufactured by the same method as in Example 6 except that the heating temperature in the heat treatment after the calendering treatment was lowered to change the average diameter of pores to 10 nm, and the drying temperature was raised and the drying time was increased in the above coating film drying step to change the arithmetic average roughness $R_a$ of the magnetic layer side surface to 1.90 µm.

Example 12

A magnetic tape was manufactured by the same method as in Example 6 except that the heating temperature in the heat treatment after the calendering treatment was lowered and the average diameter of pores was changed to 6 nm. Note that in Example 12, the arithmetic average roughness $R_a$ of the magnetic layer side surface is the same value (1.80 µm) as that in Example 6 by lowering the drying temperature in the above coating film drying step and lowering the pressure condition in the calendering step.

Example 13

A magnetic tape was obtained by the same method as in Example 1 except that the application time of the magnetic field to the magnetic layer forming coating material was adjusted to set the squareness ratio S1 of the magnetic tape in the longitudinal direction to 23% and to set the squareness ratio S2 thereof in the thickness direction (perpendicular direction) to 75%

Example 14

A magnetic tape was obtained by the same method as in Example 1 except that the application time of the magnetic field to the magnetic layer forming coating material was adjusted to set the squareness ratio S1 of the magnetic tape in the longitudinal direction to 20% and to set the squareness ratio S2 thereof in the thickness direction (perpendicular direction) to 80%

Example 15

A magnetic tape was manufactured by the same method as in Example 1 except that the application time of the magnetic field to the magnetic layer forming coating material was adjusted to set the squareness ratio S1 of the magnetic tape in the longitudinal direction to 30% and to set the squareness ratio S2 thereof in the thickness direction (perpendicular direction) to 66%, the heating temperature in the heat treatment after the calendering treatment was lowered to change the average diameter of pores to 11 nm, and the drying temperature in the above coating film drying step was set to a very high temperature and the drying time was increased to set the arithmetic average roughness $R_a$ of the magnetic layer side surface to 1.90 µm.

Example 16

A magnetic tape was manufactured by the same method as in Example 1 except that the application time of the magnetic field to the magnetic layer forming coating material was adjusted to set the squareness ratio S1 of the magnetic tape in the longitudinal direction to 30% and to set the squareness ratio S2 thereof in the thickness direction (perpendicular direction) to 66%, and the thickness of the underlayer was changed to set the average thickness $t_T$ of the magnetic recording medium to 4.9 µm.

Example 17

A magnetic tape was manufactured by the same method as in Example 6 except that the thicknesses of the magnetic layer and the underlayer were changed to set the average thickness $t_T$ of the magnetic recording medium to 5.0 µm, and the pressure condition in the above calendering step was lowered to set the arithmetic average roughness $R_a$ of the magnetic layer side surface to 1.90 µm.

Example 18

A magnetic tape was manufactured by the same method as in Example 6 except that the thicknesses of the magnetic layer and the underlayer were changed to set the average thickness $t_T$ of the magnetic recording medium to 4.9 µm, and the pressure condition in the above calendering step was lowered to set the arithmetic average roughness $R_a$ of the magnetic layer side surface to 1.90 µm.

Example 19

A magnetic tape was manufactured by the same method as in Example 6 except that as the nonmagnetic support (base layer), a polyethylene terephthalate (PET) film (hereinafter referred to as PET film) was used instead of the PEN film, the thicknesses of the magnetic layer, the underlayer, and the base layer were changed to set the average thickness $t_T$ of the magnetic recording medium to 5.1 µm, and the pressure condition in the above calendering step was lowered to set the arithmetic average roughness $R_a$ of the magnetic layer side surface to 1.90 µm.

Example 20

A magnetic tape was manufactured by the same method as in Example 1 except that the application time of the magnetic field to the magnetic layer forming coating material was adjusted to set the squareness ratio S1 of the magnetic tape in the longitudinal direction to 42% and to set the squareness ratio S2 thereof in the thickness direction (perpendicular direction) to 60%

Example 21

A magnetic tape was manufactured by the same method as in Example 1 except that the thicknesses of the magnetic layer and the underlayer were changed to set the average thickness $t_T$ of the magnetic recording medium to 5.2 µm.

Comparative Example 1

A magnetic tape was manufactured by the same method as in Example 1 except that the application time of the magnetic field to the magnetic layer forming coating material was adjusted to set the squareness ratio S1 of the magnetic tape in the longitudinal direction to 31% and to set the squareness ratio S2 thereof in the thickness direction (perpendicular direction) to 66%, the heating temperature in the heat treatment after the calendering treatment was lowered to change the average diameter of pores to 5 nm, and the drying temperature in the above coating film drying step was lowered and the drying time was increased to set the arithmetic average roughness $R_a$ of the magnetic layer side surface to 1.60 µm.

Comparative Example 2

A magnetic tape was manufactured by the same method as in Example 1 except that the application time of the magnetic field to the magnetic layer forming coating material was adjusted to set the squareness ratio S1 of the magnetic tape in the longitudinal direction to 31% and to set the squareness ratio S2 thereof in the thickness direction (perpendicular direction) to 66%, the heating temperature in the heat treatment after the calendering treatment was lowered to change the average diameter of pores to 10 nm, the thickness of the underlayer was changed to set the average thickness $t_T$ of the magnetic recording medium to 5.4 µm, and the drying temperature was raised and the drying time was increased in the above coating film drying step to set the arithmetic average roughness $R_a$ of the magnetic layer side surface to 1.90 µm.

Comparative Example 3

A magnetic tape was manufactured by the same method as in Example 1 except that the thickness of the underlayer was changed to set the average thickness $t_T$ of the magnetic recording medium to 4.8 µm, and the temperature condition and pressure condition in the above calendering step were raised to set the arithmetic average roughness $R_a$ of the magnetic layer side surface to 1.70 µm.

Comparative Example 4

A magnetic tape was manufactured by the same method as in Example 1 except that the application time of the magnetic field to the magnetic layer forming coating material was adjusted to set the squareness ratio S1 of the magnetic tape in the longitudinal direction to 31% and to set the squareness ratio S2 thereof in the thickness direction (perpendicular direction) to 66%, the heating temperature in the heat treatment after the calendering treatment was lowered to change the average diameter of pores to 12 nm, the thickness of the underlayer was changed to set the average thickness $t_T$ of the magnetic recording medium to 5.2 µm, and the drying temperature was raised and the drying time was increased in the above coating film drying step and the pressure condition in the calendering step was lowered to set the arithmetic average roughness $R_a$ of the magnetic layer side surface to 2.00 µm.

Comparative Example 5

A magnetic tape was manufactured by the same method as in Example 1 except that the application time of the magnetic field to the magnetic layer forming coating material was adjusted to set the squareness ratio S1 of the magnetic tape in the longitudinal direction to 31% and to set the squareness ratio S2 thereof in the thickness direction (perpendicular direction) to 66%, the thickness of the underlayer was changed to set the average thickness $t_T$ of the magnetic recording medium to 5.6 µm, and the pressure condition in the calendering step was lowered to set the arithmetic average roughness $R_a$ of the magnetic layer side surface to 1.90 µm.

Comparative Example 6

A magnetic tape was manufactured by the same method as in Example 1 except that the application time of the magnetic field to the magnetic layer forming coating material was adjusted to set the squareness ratio S1 of the magnetic tape in the longitudinal direction to 31% and to set the squareness ratio S2 thereof in the thickness direction (perpendicular direction) to 66%, the thicknesses of the underlayer, the base layer, and the back layer were changed to set the average thickness $t_T$ of the magnetic recording medium to 5.7 µm, and the pressure condition in the calendering step was lowered to set the arithmetic average roughness $R_a$ of the magnetic layer side surface to 1.90 µm.

Comparative Example 7

A magnetic tape was manufactured by the same method as in Example 1 except that the application time of the magnetic field to the magnetic layer forming coating material was adjusted to set the squareness ratio S1 of the magnetic tape in the longitudinal direction to 31% and to set the squareness ratio S2 thereof in the thickness direction (perpendicular direction) to 66%, the thicknesses of the magnetic layer, the underlayer, and the back layer were changed to set the average thickness $t_T$ of the magnetic recording medium to 5.7 µm, and the pressure condition in the calendering step was lowered to set the arithmetic average roughness $R_a$ of the magnetic layer side surface to 1.90 µm.

(2) Evaluation

For each of the magnetic tapes of Examples 1 to 21 and Comparative Examples 1 to 7 manufactured in (1) described above, the friction coefficient ratios ($\mu_B/\mu_A$) and ($\mu_{C(1000)}/\mu_{C(5)}$) and the amount of width change were measured. These measurements were performed by the measurement method described in "2. Embodiment of the present technology (example of application type magnetic recording medium)". The measurement results are illustrated in Table 1 below.

Moreover, the SNR was evaluated for each of the magnetic tapes of Examples 1 to 21 and Comparative Examples 1 to 7. The evaluation results are illustrated in Table 1 below. A method for evaluating SNR was as follows.

(SNR)

First, using a ½ inch tape traveling device (manufactured by Mountain Engineering II, MTS Transport) equipped with a recording/reproducing head and a recording/reproducing amplifier, the electromagnetic conversion characteristics (SNR) of each of the magnetic tapes were measured in an environment of 25° C. A ring head having a gap length of 0.2 µm was used as the recording head, and a GMR head having a shield-to-shield distance of 0.1 µm was used as the reproducing head. A relative speed, a recording clock frequency, and a recording track width were set to 6 m/s, 160 MHz, and 2.0 µm, respectively. Furthermore, the SNR was calculated on the basis of a method described in the following document. The results are illustrated in Table 1 as relative values when the SNR of Example 1 is 0 dB.

Y Okazaki: "An Error Rate Emulation System.", IEEE Trans. Man., 31, pp. 3093-3095 (1995)

TABLE 1

| | Squareness ratio S2 in perpendicular direction (without demagnetizing field correction) [%] | Squareness ratio S1 in longitudinal direction [%] | Average diameter of pores [nm] | Average thickness of magnetic layer (µm) | Average thickness of underlayer (µm) | Average thickness of base layer (µm) | Average thickness of back layer (µm) | Average thickness $t_T$ (µm) | Coating film thickness/ base thickness |
|---|---|---|---|---|---|---|---|---|---|
| Example 1 | 65 | 35 | 8 | 0.08 | 0.6 | 4.0 | 0.3 | 5.0 | 0.25 |
| Example 2 | 66 | 30 | 8 | 0.08 | 0.8 | 4.0 | 0.3 | 5.2 | 0.30 |
| Example 3 | 71 | 27 | 8 | 0.08 | 0.6 | 4.0 | 0.3 | 5.0 | 0.25 |
| Example 4 | 70 | 29 | 8 | 0.08 | 0.9 | 4.0 | 0.5 | 5.5 | 0.37 |
| Example 5 | 66 | 30 | 6 | 0.08 | 0.6 | 4.0 | 0.3 | 5.0 | 0.25 |
| Example 6 | 66 | 30 | 8 | 0.08 | 0.9 | 4.0 | 0.3 | 5.3 | 0.32 |

TABLE 1-continued

| | | | | | | | | | |
|---|---|---|---|---|---|---|---|---|---|
| Example 7 | 66 | 30 | 8 | 0.08 | 0.7 | 3.6 | 0.3 | 4.7 | 0.30 |
| Example 8 | 66 | 30 | 8 | 0.08 | 0.6 | 4.0 | 0.3 | 5.0 | 0.25 |
| Example 9 | 66 | 30 | 8 | 0.08 | 0.6 | 4.0 | 0.3 | 5.0 | 0.25 |
| Example 10 | 66 | 30 | 8 | 0.08 | 0.9 | 4.2 | 0.4 | 5.6 | 0.33 |
| Example 11 | 66 | 30 | 10 | 0.08 | 0.9 | 4.0 | 0.3 | 5.3 | 0.32 |
| Example 12 | 66 | 30 | 6 | 0.08 | 0.9 | 4.0 | 0.3 | 5.3 | 0.32 |
| Example 13 | 75 | 23 | 8 | 0.08 | 0.6 | 4.0 | 0.3 | 5.0 | 0.25 |
| Example 14 | 80 | 20 | 8 | 0.08 | 0.6 | 4.0 | 0.3 | 5.0 | 0.25 |
| Example 15 | 66 | 30 | 11 | 0.08 | 0.6 | 4.0 | 0.3 | 5.0 | 0.25 |
| Example 16 | 66 | 30 | 8 | 0.08 | 0.5 | 4.0 | 0.3 | 4.9 | 0.22 |
| Example 17 | 66 | 30 | 8 | 0.06 | 0.6 | 4.0 | 0.3 | 5.0 | 0.24 |
| Example 18 | 66 | 30 | 8 | 0.04 | 0.6 | 4.0 | 0.3 | 4.9 | 0.24 |
| Example 19 | 66 | 30 | 8 | 0.04 | 0.6 | 4.2 | 0.3 | 5.1 | 0.22 |
| Example 20 | 60 | 42 | 8 | 0.08 | 0.6 | 4.0 | 0.3 | 5.0 | 0.25 |
| Example 21 | 65 | 35 | 8 | 0.10 | 0.8 | 4.0 | 0.3 | 5.2 | 0.30 |
| Comparative Example 1 | 66 | 31 | 5 | 0.08 | 0.6 | 4.0 | 0.3 | 5.0 | 0.25 |
| Comparative Example 2 | 66 | 31 | 10 | 0.08 | 1.0 | 4.0 | 0.3 | 5.4 | 0.35 |
| Comparative Example 3 | 65 | 35 | 8 | 0.08 | 0.4 | 4.0 | 0.3 | 4.8 | 0.20 |
| Comparative Example 4 | 66 | 31 | 12 | 0.08 | 0.8 | 4.0 | 0.3 | 5.2 | 0.30 |
| Comparative Example 5 | 66 | 31 | 8 | 0.08 | 1.2 | 4.0 | 0.3 | 5.6 | 0.40 |
| Comparative Example 6 | 66 | 31 | 8 | 0.08 | 0.9 | 4.1 | 0.6 | 5.7 | 0.39 |
| Comparative Example 7 | 66 | 31 | 8 | 0.10 | 1.0 | 4.0 | 0.6 | 5.7 | 0.43 |

| | Young's modulus [Gpa] | Magnetic surface roughness $R_a$ [nm] | Magnetic powder Type | Shape | Aspect ratio | Particle volume [nm$^3$] | Friction coefficient ratio ($\mu_B/\mu_A$) | Friction coefficient ratio ($\mu_{C(1000)}/\mu_{C(5)}$) | Amount of width change (μm) | SNR |
|---|---|---|---|---|---|---|---|---|---|---|
| Example 1 | 7.48 | 1.8 | BaFe$_{12}$O$_{19}$ | Plate shape | 2.8 | 1950 | 1.2 | 1.2 | 4.3 | 0 |
| Example 2 | 7.65 | 1.8 | BaFe$_{12}$O$_{19}$ | Plate shape | 2.8 | 1950 | 1.2 | 1.2 | 4.6 | 0.1 |
| Example 3 | 7.48 | 1.8 | BaFe$_{12}$O$_{19}$ | Plate shape | 2.8 | 1950 | 1.2 | 1.3 | 4.3 | 0.4 |
| Example 4 | 7.89 | 1.8 | BaFe$_{12}$O$_{19}$ | Plate shape | 2.8 | 1950 | 1.2 | 1.2 | 5.0 | 0.3 |
| Example 5 | 7.48 | 1.7 | BaFe$_{12}$O$_{19}$ | Plate shape | 2.3 | 1300 | 1.5 | 1.6 | 4.3 | 0.1 |
| Example 6 | 7.73 | 1.8 | BaFe$_{12}$O$_{19}$ | Plate shape | 2.8 | 1950 | 1.3 | 1.3 | 4.7 | 0.7 |
| Example 7 | 7.67 | 1.8 | BaFe$_{12}$O$_{19}$ | Plate shape | 3.1 | 2000 | 1.2 | 1.2 | 4.2 | 0 |
| Example 8 | 7.48 | 1.8 | ε iron oxide | Spherical shape | 1.1 | 2150 | 1.2 | 1.3 | 4.3 | 0.1 |
| Example 9 | 7.48 | 1.8 | Co iron oxide | Cubic shape | 1.7 | 2200 | 1.2 | 1.2 | 4.3 | 0.2 |
| Example 10 | 7.76 | 1.8 | BaFe$_{12}$O$_{19}$ | Plate shape | 2.8 | 1950 | 1.2 | 1.1 | 5.0 | 0.1 |
| Example 11 | 7.73 | 1.9 | BaFe$_{12}$O$_{19}$ | Plate shape | 2.8 | 1950 | 1.6 | 1.8 | 4.7 | 0.1 |
| Example 12 | 7.73 | 1.8 | BaFe$_{12}$O$_{19}$ | Plate shape | 2.8 | 1950 | 1.2 | 1.2 | 4.7 | 0.6 |
| Example 13 | 7.48 | 1.8 | BaFe$_{12}$O$_{19}$ | Plate shape | 2.8 | 1950 | 1.4 | 1.5 | 4.3 | 0.5 |
| Example 14 | 7.48 | 1.8 | BaFe$_{12}$O$_{19}$ | Plate shape | 2.8 | 1950 | 1.6 | 1.6 | 4.3 | 0.7 |
| Example 15 | 7.48 | 1.9 | BaFe$_{12}$O$_{19}$ | Plate shape | 2.8 | 1950 | 1.8 | 1.8 | 4.3 | 0.1 |
| Example 16 | 7.39 | 1.8 | BaFe$_{12}$O$_{19}$ | Plate shape | 2.8 | 1950 | 1.6 | 1.6 | 4.2 | 0.0 |
| Example 17 | 7.46 | 1.9 | BaFe$_{12}$O$_{19}$ | Plate shape | 2.8 | 1950 | 1.2 | 1.2 | 4.3 | 0.4 |
| Example 18 | 7.45 | 1.9 | BaFe$_{12}$O$_{19}$ | Plate shape | 2.8 | 1950 | 1.2 | 1.2 | 4.3 | 0.6 |
| Example 19 | 6.43 | 1.9 | BaFe$_{12}$O$_{19}$ | Plate shape | 2.8 | 1950 | 1.2 | 1.2 | 4.7 | 0.6 |
| Example 20 | 7.48 | 1.8 | BaFe$_{12}$O$_{19}$ | Plate shape | 2.8 | 1950 | 1.2 | 1.3 | 4.3 | −0.5 |
| Example 21 | 7.67 | 1.8 | BaFe$_{12}$O$_{19}$ | Plate shape | 2.8 | 1950 | 1.2 | 1.3 | 4.6 | −0.6 |
| Comparative Example 1 | 7.48 | 1.6 | BaFe$_{12}$O$_{19}$ | Plate shape | 2.8 | 1950 | 2.2 | 2.3 | 4.3 | 0.1 |
| Comparative Example 2 | 7.81 | 1.9 | BaFe$_{12}$O$_{19}$ | Plate shape | 2.8 | 1950 | 2.3 | 1.8 | 4.9 | 0.7 |
| Comparative Example 3 | 7.30 | 1.7 | BaFe$_{12}$O$_{19}$ | Plate shape | 2.8 | 1950 | 1.4 | 2.3 | 4.0 | −0.5 |
| Comparative Example 4 | 7.65 | 2.0 | BaFe$_{12}$O$_{19}$ | Plate shape | 2.8 | 1950 | 2.1 | 2.0 | 4.6 | 0 |
| Comparative Example 5 | 7.96 | 1.9 | BaFe$_{12}$O$_{19}$ | Plate shape | 2.8 | 1950 | 1.2 | 1.2 | 5.1 | 0 |
| Comparative Example 6 | 7.93 | 1.9 | BaFe$_{12}$O$_{19}$ | Plate shape | 2.8 | 1950 | 1.2 | 1.2 | 5.2 | 0 |
| Comparative Example 7 | 8.04 | 1.9 | BaFe$_{12}$O$_{19}$ | Plate shape | 2.8 | 1950 | 1.2 | 1.2 | 5.3 | 0 |

The results illustrated in Table 1 indicate the following.

It is found that each of the magnetic tapes of Examples 1 to 21 has friction coefficient ratios ($\mu_B/\mu_A$) and ($\mu_{C(1000)}/\mu_{C(5)}$) of 1.0 or more and 2.0 or less in spite of having a tape total thickness $t_T$ of 5.6 μm or less and an underlayer thickness of 0.5 m or more and 0.9 μm or less, and has high traveling stability. Moreover, it is found that each of the magnetic tapes of Examples 1 to 20 has an amount of width change of 4.0 μm or more and 5.0 μm or less and has good width controllability. Therefore, it is found that the magnetic recording medium according to the present technology has excellent traveling stability and excellent width controllability in spite of having a thin total thickness thereof and a thin underlayer.

Furthermore, comparison between the results of Examples 1 to 21 and the results of Comparative Examples 5 to 7 indicates that width controllability is improved by setting the Young's modulus of a magnetic tape in the longitudinal direction to, for example, 7.90 Gpa or less.

Furthermore, by comparing the results of Examples 1 to 21 with the result of Comparative Example 7, it is considered that the coating film thickness/base thickness of, for example, 0.38 or less, contributes to improvement in width controllability.

Furthermore, comparison between the results of Examples 1 to 21 and the results of Comparative Examples 1 and 4 indicates that the friction coefficient ratios ($\mu_B/\mu_A$) and ($\mu_{C(1000)}/\mu_{C(5)}$) are well controlled by setting the average diameter of the pores to 6 nm to 11 nm, and traveling stability is improved.

Furthermore, comparison between the results of Examples 1 to 20 and the results of Comparative Examples 2 and 3 indicates that the thickness of the underlayer of 0.5 am or more and 0.9 μm or less contributes to improvement in traveling stability and SNR.

Furthermore, when Example 1 is compared with Example 20, in the former, the squareness ratio S2 was 65% and SNR was 0, whereas in the latter, the squareness ratio S2 was 60% and the SNR was −0.5. From this result, it is found that by setting the squareness ratio S2 to, for example, 65% or more, the SNR is further improved, that is, the recording/reproducing characteristics are improved.

Furthermore, comparison between Example 1 and Example 21 indicates that the SNR is further improved, that is, the recording/reproducing characteristics are improved by setting the thickness of the magnetic layer to, for example, 0.09 m or less, preferably 0.08 m or less.

The magnetic tapes of Examples 8 and 9 have about the same traveling stability and recording/reproducing characteristics as Example 1, although the type of magnetic powder is different from that of Example 1. Therefore, it is found that the effect of the present technology is exhibited even if the type of magnetic powder is changed.

Hereinabove, the embodiment and Examples of the present technology have been described specifically. However, the present technology is not limited to the above-described embodiment and Examples, but various modifications based on the technical idea of the present technology can be made.

For example, the configurations, the methods, the steps, the shapes, the materials, the numerical values, and the like exemplified in the above-described embodiment and Examples are only examples, and a configuration, a method, a step, a shape, a material, a numerical value, and the like different therefrom may be used as necessary. Furthermore, the chemical formulas of the compounds and the like are representative and are not limited to the described valences and the like as long as the compounds have common names of the same compound.

Furthermore, the configurations, the methods, the steps, the shapes, the materials, the numerical values, and the like in the above-described embodiment and Examples can be combined with one another as long as not departing from the gist of the present technology.

Furthermore, here, the numerical range indicated using "to" indicates a range including the numerical values described before and after "to" as the minimum value and the maximum value, respectively. Within the numerical range described step by step here, an upper limit value or a lower limit value of a numerical range in one stage may be replaced with an upper limit value or a lower limit value of a numerical range in another stage. The materials exemplified here can be used singly or in combination of two or more thereof unless otherwise specified.

Note that the present technology may have the following configurations.

[1] A tape-shaped magnetic recording medium including:
a magnetic layer; an underlayer; a base layer; and a back layer, in which
the underlayer has a thickness of 0.5 m or more and 0.9 μm or less,
the magnetic recording medium has an average thickness $t_T$ of 5.6 μm or less,
the magnetic recording medium includes a lubricant,
the magnetic recording medium has pores, and the pores have an average diameter of 6 nm or more and 11 nm or less when the diameters of the pores are measured in a state where the lubricant has been removed from the magnetic recording medium and the magnetic recording medium has been dried, and
the magnetic recording medium has Young's modulus of 7.90 GPa or less in a longitudinal direction thereof.

[2] The magnetic recording medium according to [1], having a squareness ratio of 65% or more in a perpendicular direction thereof.

[3] The magnetic recording medium according to [1] or [2], in which a magnetic layer side surface of the magnetic recording medium has arithmetic average roughness $R_a$ of 2.5 nm or less.

[4] The magnetic recording medium according to any one of [1] to [3], in which the magnetic layer has an average thickness $t_m$ of 80 nm or less.

[5] The magnetic recording medium according to any one of [1] to [4], in which the base layer includes a polyester-based resin.

[6] The magnetic recording medium according to any one of [1] to [5], in which the ratio of the total thickness of the magnetic layer, the underlayer, and the back layer to the thickness of the base layer is 0.38 or less.

[7] The tape-shaped magnetic recording medium according to any one of [1] to [6], in which the amount of dimensional change of the magnetic recording medium in a width direction thereof between a state in which a tension of 0.5 N is applied to the magnetic recording medium in a longitudinal direction thereof and a state in which a tension of 1.0 N is applied to the magnetic recording medium in the longitudinal direction is 4.0 μm or more and 5.0 μm or less.

[8] The magnetic recording medium according to any one of [1] to [7], in which the magnetic layer includes magnetic powder, and the magnetic powder contains hexagonal ferrite, ε iron oxide, or Co iron oxide.

[9] The magnetic recording medium according to [8], in which the hexagonal ferrite contains at least one of Ba or Sr, and the ε iron oxide contains at least one of Al or Ga.

[10] The magnetic recording medium according to any one of [1] to [9], having a friction coefficient ratio ($\mu_B/\mu_A$) of 1.0 to 2.0, in which $\mu_A$ represents a coefficient of dynamic friction between a magnetic layer side surface of the magnetic recording medium and a magnetic head in a state where a tension of 0.4 N is applied to the magnetic recording medium in a longitudinal direction thereof, and $\mu_B$ represents a coefficient of dynamic friction between the magnetic layer side surface of the magnetic recording medium and the magnetic head in a state where a tension of 1.2 N is applied to the magnetic recording medium in the longitudinal direction.

[11] The magnetic recording medium according to any one of [1] to [10], having a friction coefficient ratio ($\mu_{C(1000)}/\mu_{C(5)}$) of 1.0 to 2.0, in which $\mu_{C(5)}$ represents a coefficient of dynamic friction at fifth reciprocation in a case where the magnetic recording medium in a state where a tension of 0.6 N is applied to the magnetic recording medium in a longitudinal direction thereof is reciprocatedly slid five times on a magnetic head, and $\mu_{C(1000)}$ represents a coefficient of dynamic friction at 1000th reciprocation in a case where the magnetic recording medium is reciprocated 1000 times on the magnetic head.

[12] The magnetic recording medium according to any one of [1] to [11], in which the pores have an average diameter of 6 nm or more and 10 nm or less.

[13] The magnetic recording medium according to any one of [1] to [12], in which the pores have an average diameter of 7 nm or more and 9 nm or less.

[14] The magnetic recording medium according to any one of [1] to [13], in which the base layer has an average thickness of 4.2 µm or less.

[15] The magnetic recording medium according to any one of [1] to [14], in which the back layer has an average thickness of 0.5 m or less.

[16] The magnetic recording medium according to any one of [1] to [15], in which the magnetic layer includes magnetic powder, and the magnetic powder has an average aspect ratio of 1.0 or more and 3.5 or less.

[17] A tape cartridge including:
the tape-shaped magnetic recording medium according to [1];
a communication unit that communicates with a recording/reproducing device;
a storage unit; and
a control unit that stores information received from the recording/reproducing device through the communication unit in the storage unit, reads the information from the storage unit according to a request from the recording/reproducing device, and transmits the information to the recording/reproducing device through the communication unit, in which
the information includes adjustment information for adjusting a tension applied to the magnetic recording medium in a longitudinal direction thereof.

[18] The tape cartridge according to [17], in which the adjustment information includes dimensional information in a width direction at a plurality of positions in the longitudinal direction of the magnetic recording medium.

[19] A data processing method including:
a dimensional information acquiring step of acquiring dimensional information in a width direction at a plurality of positions in a longitudinal direction of the tape-shaped magnetic recording medium according to [1] while the magnetic recording medium is caused to travel with a tension applied in the longitudinal direction; and
a data processing step of recording data on the magnetic recording medium and/or reproducing the data recorded on the magnetic recording medium while the magnetic recording medium is caused to travel with a tension applied in the longitudinal direction, in which
in the data processing step, the tension applied to the magnetic recording medium in the longitudinal direction is adjusted on the basis of the dimensional information.

[20] The data processing method according to [19], in which in the data processing step, the tension applied to the magnetic recording medium in the longitudinal direction is adjusted on the basis of the dimensional information and initial dimensional information acquired in advance before the dimensional information acquiring step is performed.

[21] The data processing method according to [20], in which in the data processing step, the tension applied to the magnetic recording medium in the longitudinal direction is adjusted such that the dimensional information corresponds to the initial dimensional information.

[22] The data processing method according to any one of [19] to [21], further including an information acquiring step of acquiring at least one of environmental information around the magnetic recording medium or traveling condition information, in which
in the data processing step, the tension applied to the magnetic recording medium in the longitudinal direction is adjusted on the basis of the dimensional information and at least one of the environmental information or the traveling condition information.

[23] A tape-shaped magnetic recording medium including:
a magnetic layer; an underlayer; a base layer; and a back layer, in which
the underlayer has a thickness of 0.5 µm or more and 0.9 µm or less,
the magnetic recording medium has an average thickness $t_T$ of 5.6 µm or less,
the magnetic recording medium includes a lubricant,
the magnetic recording medium has pores, and the pores have an average diameter of 6 nm or more and 11 nm or less when the diameters of the pores are measured in a state where the lubricant has been removed from the magnetic recording medium and the magnetic recording medium has been dried, and
the ratio of the total thickness of the magnetic layer, the underlayer, and the back layer to the thickness of the base layer is 0.38 or less.

REFERENCE SIGNS LIST

10 Magnetic recording medium
11 Base layer
12 Underlayer
13 Magnetic layer
14 Back layer

The invention claimed is:
1. A tape-shaped magnetic recording medium comprising:
a magnetic layer; an underlayer; a base layer; and a back layer, wherein
the underlayer has a thickness of 0.5 µm or more and 0.9 µm or less,
the magnetic recording medium has an average thickness $t_T$ of 5.6 µm or less,
the magnetic recording medium includes a lubricant,
the magnetic recording medium has pores, and the pores have an average diameter of 6 nm or more and 11 nm or less when the diameters of the pores are measured in a state where the lubricant has been removed from the magnetic recording medium and the magnetic recording medium has been dried, and
the magnetic recording medium has Young's modulus of 7.90 GPa or less in a longitudinal direction thereof;
having a friction coefficient ratio $(\mu_B/\mu_A)$ of 1.0 to 2.0, wherein $\mu_A$ represents a coefficient of dynamic friction between a magnetic layer side surface of the magnetic recording medium and a magnetic head in a state where a tension of 0.4 N is applied to the magnetic recording medium in a longitudinal direction thereof, and $\mu_B$ represents a coefficient of dynamic friction between the magnetic layer side surface of the magnetic recording medium and the magnetic head in a state where a tension of 1.2 N is applied to the magnetic recording medium in the longitudinal direction,
wherein an amount of dimensional change of the magnetic recording medium in a width direction thereof between a state in which a tension of 0.5 N is applied to the magnetic recording medium in a longitudinal direction thereof and a state in which a tension of 1.0 N is applied to the magnetic recording medium in the longitudinal direction is 4.0 µm or more and 5.0 µm or less.

2. The magnetic recording medium according to claim 1, having a squareness ratio of 65% or more in a perpendicular direction thereof.

3. The magnetic recording medium according to claim 1, wherein a magnetic layer side surface of the magnetic recording medium has arithmetic average roughness $R_a$ of 2.5 nm or less.

4. The magnetic recording medium according to claim 1, wherein the magnetic layer has an average thickness $t_m$ of 80 nm or less.

5. The magnetic recording medium according to claim 1, wherein the base layer includes a polyester as a main component.

6. The magnetic recording medium according to claim 1, wherein a ratio of a total thickness of the magnetic layer, the underlayer, and the back layer to a thickness of the base layer is 0.38 or less.

7. The magnetic recording medium according to claim 1, wherein the magnetic layer includes magnetic powder, and the magnetic powder contains hexagonal ferrite, iron oxide, or Co iron oxide.

8. The magnetic recording medium according to claim 7, wherein the hexagonal ferrite contains at least one of Ba or Sr, and the ε iron oxide contains at least one of Al or Ga.

9. The magnetic recording medium according to claim 1, having a friction coefficient ratio ($\mu_{C(1000)}/\mu_{C(5)}$) of 1.0 to 2.0, wherein $\mu_{C(5)}$ represents a coefficient of dynamic friction at fifth reciprocation in a case where the magnetic recording medium in a state where a tension of 0.6 N is applied to the magnetic recording medium in a longitudinal direction thereof is reciprocatedly slid five times on a magnetic head, and $\mu_{C(1000)}$ represents a coefficient of dynamic friction at 1000th reciprocation in a case where the magnetic recording medium is reciprocated 1000 times on the magnetic head.

10. The magnetic recording medium according to claim 1, wherein the pores have an average diameter of 6 nm or more and 10 nm or less.

11. The magnetic recording medium according to claim 1, wherein the pores have an average diameter of 7 nm or more and 9 nm or less.

12. The magnetic recording medium according to claim 1, wherein the base layer has an average thickness of 4.2 μm or less.

13. The magnetic recording medium according to claim 1, wherein the back layer has an average thickness of 0.5 μm or less.

14. The magnetic recording medium according to claim 1, wherein the magnetic layer includes magnetic powder, and the magnetic powder has an average aspect ratio of 1.0 or more and 3.5 or less.

* * * * *